(12) United States Patent
Wedig

(10) Patent No.: US 12,154,295 B2
(45) Date of Patent: *Nov. 26, 2024

(54) METHODS AND SYSTEMS FOR INTERPOLATION OF DISPARATE INPUTS

(71) Applicant: Magic Leap, Inc., Plantation, FL (US)

(72) Inventor: Geoffrey Wedig, Torrance, CA (US)

(73) Assignee: MAGIC LEAP, INC., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/306,461

(22) Filed: Apr. 25, 2023

(65) Prior Publication Data

US 2023/0260156 A1  Aug. 17, 2023

Related U.S. Application Data

(63) Continuation of application No. 16/446,236, filed on Jun. 19, 2019, now Pat. No. 11,669,726.

(Continued)

(51) Int. Cl.
*G06T 7/73* (2017.01)
*G06N 3/048* (2023.01)
(Continued)

(52) U.S. Cl.
CPC ............... *G06T 7/75* (2017.01); *G06T 13/40* (2013.01); *G06N 3/048* (2023.01); *G06N 3/09* (2023.01); *G06T 2207/20084* (2013.01)

(58) Field of Classification Search
CPC . G06T 7/75; G06T 13/40; G06T 2207/20084; G06N 3/09; G06N 3/048
See application file for complete search history.

(56) References Cited

U.S. PATENT DOCUMENTS 6,850,221 B1  2/2005 Tickle
9,014,481 B1 *  4/2015 Luqman ............... G06V 30/245
382/185

(Continued)

FOREIGN PATENT DOCUMENTS

JP  2010-528716 A  8/2012
WO  2019204164 A1  10/2019
WO  2020009800 A1  1/2020

OTHER PUBLICATIONS

Bataineh et al, Using Artificial Neural Networks for Prediction of Dynamic Human Motion, 2012, University of Iowa (Year: 2012).*

(Continued)

*Primary Examiner* — YuJang Tswei
(74) *Attorney, Agent, or Firm* — KLINTWORTH & ROZENBLAT IP LLP

(57) ABSTRACT

Systems and methods are provided for interpolation of disparate inputs. A radial basis function neural network (RBFNN) may be used to interpolate the pose of a digital character. Input parameters to the RBFNN may be separated by data type (e.g. angular vs. linear) and manipulated within the RBFNN by distance functions specific to the data type (e.g. use an angular distance function for the angular input data). A weight may be applied to each distance to compensate for input data representing different variables (e.g. clavicle vs. shoulder). The output parameters of the RBFNN may be a set of independent values, which may be combined into combination values (e.g. representing x, y, z, w angular value in SO(3) space).

20 Claims, 23 Drawing Sheets

Related U.S. Application Data

(60) Provisional application No. 62/693,237, filed on Jul. 2, 2018.

(51) Int. Cl.
   G06N 3/09 (2023.01)
   G06T 13/40 (2011.01)

(56) References Cited

U.S. PATENT DOCUMENTS

| | | | |
|---|---|---|---|
| 9,081,426 | B2 | 7/2015 | Armstrong |
| 9,215,293 | B2 | 12/2015 | Miller |
| 9,348,143 | B2 | 5/2016 | Gao et al. |
| 9,417,452 | B2 | 8/2016 | Schowengerdt et al. |
| 9,470,906 | B2 | 10/2016 | Kaji et al. |
| 9,547,174 | B2 | 1/2017 | Gao et al. |
| 9,671,566 | B2 | 6/2017 | Abovitz et al. |
| 9,740,006 | B2 | 8/2017 | Gao |
| 9,791,700 | B2 | 10/2017 | Schowengerdt |
| 9,851,563 | B2 | 12/2017 | Gao et al. |
| 9,857,591 | B2 | 1/2018 | Welch et al. |
| 9,874,749 | B2 | 1/2018 | Bradski et al. |
| 10,535,174 | B1 | 1/2020 | Rigiroli et al. |
| 10,592,822 | B1 | 3/2020 | Cosic |
| 2003/0227539 | A1* | 12/2003 | Bonnery ............... H04N 19/94 375/E7.137 |
| 2005/0011959 | A1 | 1/2005 | Grosvenor |
| 2006/0028436 | A1 | 2/2006 | Armstrong |
| 2007/0081123 | A1 | 4/2007 | Lewis |
| 2008/0300055 | A1 | 12/2008 | Lutnick et al. |
| 2010/0245604 | A1 | 9/2010 | Ohmiya et al. |
| 2012/0127062 | A1 | 5/2012 | Bar-Zeev et al. |
| 2012/0162549 | A1 | 6/2012 | Gao et al. |
| 2012/0240185 | A1 | 9/2012 | Kapoor et al. |
| 2013/0082922 | A1 | 4/2013 | Miller |
| 2013/0117377 | A1 | 5/2013 | Miller |
| 2013/0125027 | A1 | 5/2013 | Abovitz |
| 2013/0208234 | A1 | 8/2013 | Lewis |
| 2013/0242262 | A1 | 9/2013 | Lewis |
| 2014/0071539 | A1 | 3/2014 | Gao |
| 2014/0177023 | A1 | 6/2014 | Gao et al. |
| 2014/0218468 | A1 | 8/2014 | Gao et al. |
| 2014/0267420 | A1 | 9/2014 | Schowengerdt et al. |
| 2014/0306866 | A1 | 10/2014 | Miller et al. |
| 2015/0016777 | A1 | 1/2015 | Abovitz et al. |
| 2015/0103306 | A1 | 4/2015 | Kaji et al. |
| 2015/0178939 | A1 | 6/2015 | Bradski et al. |
| 2015/0205126 | A1 | 7/2015 | Schowengerdt |
| 2015/0222883 | A1 | 8/2015 | Welch |
| 2015/0222884 | A1 | 8/2015 | Cheng |
| 2015/0268415 | A1 | 9/2015 | Schowengerdt et al. |
| 2015/0302652 | A1 | 10/2015 | Miller et al. |
| 2015/0309263 | A2 | 10/2015 | Abovitz et al. |
| 2015/0326570 | A1 | 11/2015 | Publicover et al. |
| 2015/0346490 | A1 | 12/2015 | Tekolste et al. |
| 2015/0346495 | A1 | 12/2015 | Welch et al. |
| 2016/0011419 | A1 | 1/2016 | Gao |
| 2016/0026253 | A1 | 1/2016 | Bradski et al. |
| 2016/0270656 | A1 | 9/2016 | Samec et al. |
| 2018/0025257 | A1 | 1/2018 | Van Den Oord et al. |
| 2018/0089553 | A1 | 3/2018 | Liu et al. |
| 2018/0204111 | A1 | 7/2018 | Zadeh et al. |
| 2018/0330810 | A1* | 11/2018 | Gamarnik ............... G16H 10/20 |

OTHER PUBLICATIONS

Deng et al, CN103544527B, 2013, Wuhan University (Year: 2013).*
DomÁ-nguez, Methodology and Techniques for designing control systems of autonomous helicopters, 2009, Universidad De Sevilla (Year: 2009).*
Etemad, Perceptually Guided Processing of Style and Affect in Human Motion for Multimedia Applications, 2014, Carleton University (Year: 2014).*
Lintas et al, Artificial Neural Networks and Machine Learning, 2017, ICANN (Year: 2017).*
Wang et al, Video analysis of human dynamicsaa survey, 2003, Elsevier (Year: 2003).*
Wheatland et al, State of the Art in Hand and Finger Modeling and Animation, 2015, Eurographics (Year: 2015).*
Yang et al, Neural Learning enhanced Teleoperation Control of Baxter Robot using IMU based Motion Capture, 2016, IEEE (Year: 2016).*
Zhmakin, Mathematics of Human Motion-from Animation towards Simulation (A View form the Outside), 20180529, arXiv (Year: 2018).*
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC-Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Holden, et al., "Fast Neural Style Transfer for Motion Data," IEEE Computer Graphics and Applications, vol. 37, No. 4, Aug. 21, 2017.
Holden, et al., "Learning Motion Manifolds With Convolutional Autoencoders," SA '15 Technical Briefs, Nov. 2-6, 2015, Kobe, Japan. 2015 ACM.
International Preliminary Report on Patentability for PCT Application No. PCT/US19/37952, issued Jan. 5, 2021.
International Search Report and Written Opinion for PCT Application No. PCT/US19/37952, mailed Sep. 10, 2019.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Piekarski, Wayne; "Interactive 3d modelling in outdoor augmented reality worlds", Research Thesis for the Degree of Doctor of Philosophy, Feb. 2004, http://www.tinmith.net/wayne/thesis/piekarski-ch0-start.htm.
Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

* cited by examiner

EXAMPLE USER INTERACTIONS WITH A WEARABLE DEVICE

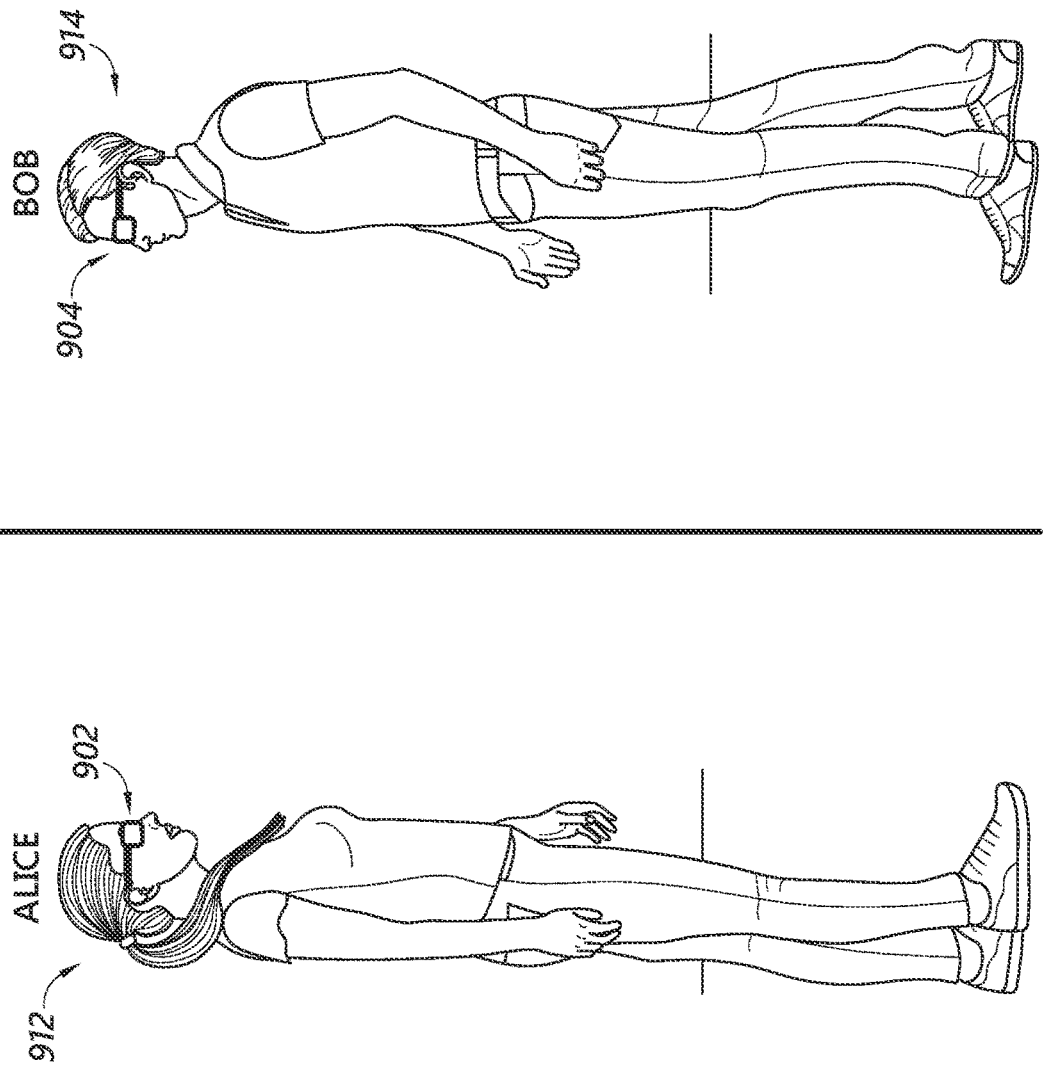

METHODS AND SYSTEMS FOR INTERPOLATION OF DISPARATE INPUTS

CROSS-REFERENCE TO RELATED APPLICATION(S)

This application is a continuation of U.S. application Ser. No. 16/446,236, filed May Jun. 19, 2019, and entitled "METHODS AND SYSTEMS FOR INTERPOLATION OF DISPARATE INPUTS," which claims the benefit of priority to U.S. Patent Application No. 62/693,237, filed Jul. 2, 2018, and bearing the same title. The aforementioned applications are hereby incorporated by reference herein in their entirety.

FIELD OF THE DISCLOSURE

The present disclosure relates to virtual reality and augmented reality, including mixed reality, imaging and visualization systems and more particularly to rigging systems and methods for animating virtual characters, such as avatars or other digital characters.

BACKGROUND OF THE DISCLOSURE

Modern computing and display technologies have facilitated the development of systems for so called "virtual reality," "augmented reality," and "mixed reality" experiences, wherein digitally reproduced images are presented to a user in a manner such that they seem to be, or may be perceived as, real. A virtual reality (VR) scenario typically involves presentation of computer-generated virtual image information without transparency to other actual real-world visual input. An augmented reality (AR) scenario typically involves presentation of virtual image information as an augmentation to visualization of the actual world around the user. Mixed reality (MR) is a type of augmented reality in which physical and virtual objects may co-exist and interact in real time. Systems and methods disclosed herein address various challenges related to VR, AR and MR technology.

SUMMARY

Imaging scans of a subject performing a variety of poses can be used to create a lifelike, three-dimensional (3D), virtual representation (e.g., an avatar, or digital character) of the subject. The scans are typically taken while the subject performs training poses (e.g. that show different facial expressions and/or snapshots of actions of the subject, such as smiling, frowning, winking, raising an arm, walking, etc., where each pose is represented by a set of digital character rig parameters). The scans can be used to animate a virtual avatar for the subject. A virtual avatar is just one example of a digital character. These terms may be used interchangeably throughout this disclosure, but should in no way limit the scope of this invention. Each scan of a pose requires time and effort to set up and capture the image, and is represented by data. Due to resource constraints (e.g., time, human, model, etc.) or data storage constraints, it is typically not possible to capture every possible pose that the digital character could perform. Instead, a set of sample, or training, poses that represent the overall pose space (e.g., the volume that contains all possible poses a digital character could assume) are captured and interpolation is used to determine the exact character pose.

Various embodiments of methods and systems for interpolating the pose of a digital character can be based on separating linear and angular parameters that represent the pose of a digital character. This separation may start when the input pose data for the interpolation engine is separated into linear parameters and angular parameters. In some embodiments, the separation continues when, within the interpolation engine, the linear parameters are manipulated with treatments (e.g., mathematical manipulations) more suitable for linear space, and the angular parameters are manipulated with treatments more suitable for angular space. In some embodiments, a weight may be applied within the interpolation engine that enables more accurate combinations of data of different types (e.g., clavicle type, shoulder type, etc.). The interpolation engine may output a plurality of independent parameters that represent both linear and angular values. The angular values may then be combined to fully represent unique angular values of a pose, which may be used to animate a digital character rig.

Embodiments of the methods and system may use a radial basis function neural network (RBFNN) to interpolate a digital character's pose. The RBFNN implementation uses multiple distance metrics on a space comprised of both independent linear components, which are amenable to Euclidean distance metrics, together with 3D angles, whose distances are calculated directly in SO(3). Linear and angular distances are calculated separately and then combined into a single overall distance, utilizing a set of weights, that is then used for interpolation. Similarly, embodiments of the RBFNN disclosed herein utilizes a method of calculating outputs by specifying all outputs as independent values, and then combining the angular values into sets of fully defined angular values. In various embodiments, the methods and systems described herein may be used to interpolate any data set that comprises data of different types (e.g. clavicle data or shoulder data) by utilizing a neural network, such as a RBFNN, feed forward neural network (FFNN), or any other suitable neural network (NN). In some embodiments, the output of the interpolation engine is such that it can easily be transferred from an authoring engine into a real-time engine.

In some embodiments, a method comprises receiving input parameters into a RBFNN is disclosed, wherein the input parameters comprise a first data type and a second data type, wherein the RBFNN comprises: a first distance function corresponding to the first data type, and a second distance function corresponding to the second data type.

In some embodiments, a method comprises separating training data that represents a first input type from training data that represents a second input type, defining a first distance function for the first input type, defining a second distance function for the second input type, and inputting training data that represents the first input type and training data that represents the second input type into a RBFNN is disclosed, wherein the RBFNN comprises the first distance function and the second distance function.

In some embodiments, a method comprises receiving, as output from a RBFNN, data representing a set of independent output values, separating data representing angular values from the data representing a set of independent output values, combining the data representing angular values into quaternion vectors comprising x, y, z, and w values, and providing the set of quaternion vectors to a system configured to drive a rotation, is disclosed.

In some embodiments, a system comprising one or more computers and one or more storage devices storing instructions that are operable, when executed by the one or more computers, to cause the one or more computers to perform operations comprising: receiving a pose from a low-order digital character rig, providing the pose as input to a RBFNN, receiving, as output from the RBFNN, a data set of independent values representing a high-order digital character rig, and defining one or more four-component quaternion vectors from a data subset representing angular values from the data set of independent values, is disclosed.

In some embodiments, any suitable neural network (NN) may be used as an interpolation engine as long as the angular and linear components are separated. In some embodiments, a feed forward neural network (FFNN) may be used, such as a fully connected network with a single hidden layer, using rectified linear unit (ReLU) activation functions. In some embodiments, the hidden layer may be incorporated as a residual neural network (resnet) block.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims.

FIG. 9B illustrates an example telepresence session.

Figure 1:
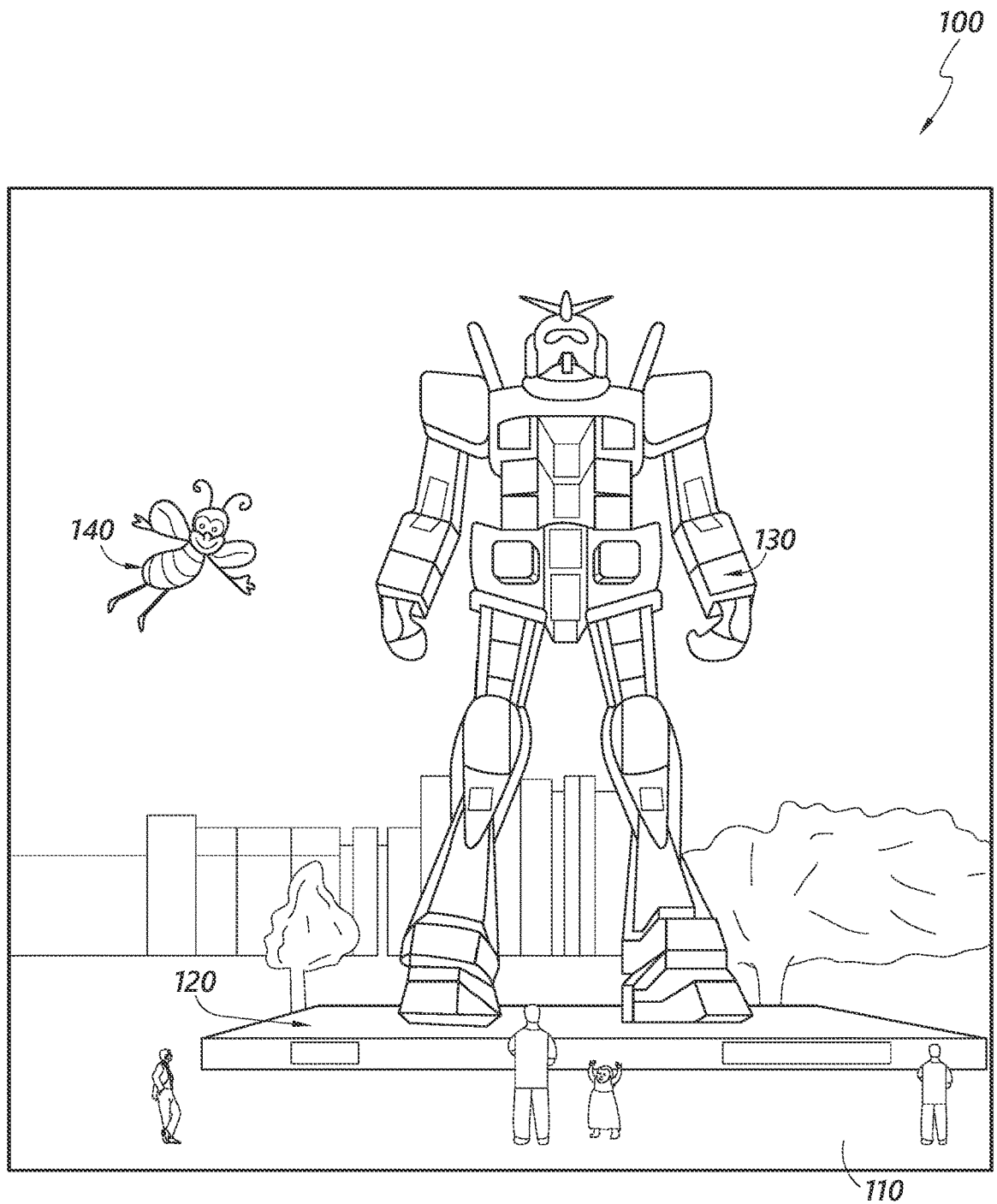
FIG. 1 depicts an illustration of a mixed reality scenario with certain virtual reality objects, and certain physical objects viewed by a person.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

A virtual avatar may be a virtual representation of a real or fictional person (or creature or personified object) in an AR/VR/MR environment. For example, during a telepresence session in which two AR/VR/MR users are interacting with each other, a viewer can perceive an avatar of another user in the viewer's environment and thereby create a tangible sense of the other user's presence in the viewer's environment. The avatar can also provide a way for users to interact with each other and do things together in a shared virtual environment. For example, a student attending an online class can perceive and interact with avatars of other students or the teacher in a virtual classroom. As another example, a user playing a game in an AR/VR/MR environment may view and interact with avatars of other players in the game.

Embodiments of the disclosed systems and methods may provide for improved avatars and a more realistic interaction between a user of the wearable system and avatars in the user's environment. Although the examples in this disclosure describe animating a human-shaped avatar, similar techniques can also be applied to other digital characters, such as animals, fictitious creatures, objects, etc. Accordingly, the subject of the imaging scans and the alignment or stabilization techniques described herein can be a human person, an animal, or other deformable object or character. In many of the examples described herein, the subject is a person (e.g., to create a human-looking avatar or digital character), but that is for illustration and is not a limitation on the disclosed methods and systems. Further, many of the techniques described herein may be particularly advantageous for animal subjects, because animals may have a limited attention span where only a relatively small number of poses can be captured to represent an entire pose space, relative to the number of potential poses the animal could assume.

To create a convincing digital avatar of a person can require scanning the person's three-dimensional (3D) likeness to create digital geometry. The imaging scans can, for example, be taken by placing the subject in a photogrammetry capture stage comprising multiple cameras (e.g., two or more) surrounding and pointed at the subject. The cameras can be synchronized to each other to capture images that can be converted into a 3D scan of the subject performing a pose.

From static bursts (multiple images captured at substantially the same time), a single 3D scan can be generated. For an avatar which can move and emote, however, scans can be taken while the subject performs training poses that include basic expressions units (e.g., smiling, frowning, etc.) and pre-defined static poses, some of which may represent static poses within an animation sequence (e.g. arm raise represented by five static poses—arm straight down, arm up 45 degrees, arm straight out 90 degrees, arm raised up 135 degrees, arm raised up 180 degrees). These scans can be used to create a training set that is used to construct an animation rig (described below) which can be used to create a convincing digital avatar of the person in action.

One difficulty that may be encountered in this process is the problem of large quantities of data required to accurately describe an entire pose space of the digital character. Large quantities of data may require substantial computing resources to analyze the data in a practicable amount of time (e.g., in real time for some applications). This problem may be solved, in some embodiments, by utilizing a smaller sub-set of poses (e.g., training poses, or sample poses) that span the entire pose space, but comprise representative poses, and then interpolate between the representative training poses when the digital character needs to assume an intermediate pose. Neural networks may be utilized in order to execute the interpolation, such as FFNNs or RBFNNs. Thus various such embodiments may advantageously improve computing speed or utilize fewer computing resources to compute the pose of the digital character.

Radial basis function neural networks (RBFNNs) are a common way to interpolate. RBFNNs are used widely across many disciplines (geology, oceanography, etc.) and thus are well understood and many optimizations have been developed to make them perform even faster and more accurately. RBFNNs are a relatively simple way of solving complex systems, such as high-order digital character poses.

Interpolating a new pose for a digital character utilizing one or more NNs, such as RBFNNs, however, presents its own set of challenges. For example, when a RBFNN is used to interpolate the pose of a digital character, the RBFNN will periodically calculate a pose incorrectly. For example, the RBFNN may introduce jitter (e.g., small and frequent changes in the location or position of a single or set of vertices in the digital character mesh), popping of body parts in the wrong place (e.g., sudden large changes in the location or position of a single or set of vertices in the digital character mesh), blendshapes rapidly turning on/off, etc. In other words, the RBFNN works well most of the time, but will periodically and very noticeably output incorrect poses, giving the appearance of an unstable and unpredictable system. Fixing these periodic errors requires human intervention, thus decreasing the overall efficiency of the system.

These periodic errors are, at least in part, due to three main reasons. First, RBFNNs typically calculate distances as Euclidean distances. However, animating a digital character is largely about rotating bones—translating and rotating the skeleton of a digital character to determine the correct corresponding deformation of the mesh covering the skeleton and other high-order parameters. Second, outputs from an RBFNN are single-valued. Angular values from skeleton movement, however, may need to be represented by four elements (e.g. x, y, z, w). Third, an RBFNN may treat all inputs the same. Although the input data represents a single digital character, there may be several different types of data to the digital character rig. Embodiments of the disclosed systems and techniques can be used to automatically determine stable and predictable intermediate poses for a digital character by addressing these problems.

The first problem, treatment of angular values in linear space, can lead to incorrect RBFNN distance calculations because the angular value would be defined as a function of linear analysis. Behaviors such as gimbal locking, rapid flipping, change of sign, and/or areas where a single angular rotation can be represented in multiple ways, could occur. This is because, not only is location/position important, but so is orientation. Consider the following example. An avatar has the goal of starting with its arm by its side and ending with its arm straight in front of it. The avatar starts in a standing position with its right arm down by its side with its palm flat on its hip. The avatar raises its arm straight out to the side, then rotates the entire arm in front of its body, palm down (e.g., palm facing the ground the entire rotation). Now, still standing up, the avatar starts with its left arm down by its side with its palm flat on its hip (e.g., same starting position). The avatar raises its arm straight in front of it. Notice how both of the avatar's arms are straight in front of it (e.g., has the same target end pose) but the avatar's right hand is palm facing down vs. the avatar's left hand is palm facing to the right. Digital character rigs that describe rotations (such as an arm rotation as described above) in linear space could end up with either of the two arm orientation vs. rotations described in angular space can only have one orientation.

A rotation can be properly (e.g., fully) described in many different ways. For example, Euler, special orthogonal group in 3 dimensions (SO(3), also known as rotation group SO3), rotation matrices, axis-angle, and quaternion representations are several examples of angular spaces. For ease of description, subsequent discussion of rotations will be described in SO(3) space, but any suitable method may be used. SO(3) space is defined by four values—an axis defined by x, y, and z, and a rotation, w, about the axis. The axis can be located anywhere in space with a rotation about the axis (e.g., "w"), thus enabling a unique, or single-valued, solution for all transformations or manipulations of the digital character in SO(3) space.

The second problem, a single value output for an angular value, is ill-defined and could have several solutions/outputs/orientations calculated for a single desired end pose. To solve this problem, four independent values may be calculated for each output rotation needed to move the digital character rig. The four independent output values are then combined into a combination value (x, y, z, w) which can be directly fed to the digital character rig as a rotation.

The third problem, combining rotational parameters of different types, may result in smaller motions becoming negligible when compared to larger motions. Rotational parameters of different types could be clavicle type, shoulder joint type, phalanges type, metatarsal type, etc. The list of example parameter types are merely for illustration, and other types or groups could be used. Each group could comprise one rigging bone or more than one rigging bone. Each group is assigned a weight that represents its relative contribution to the overall movement of the digital character, and enables balancing the importance of individual parameters. For example, the clavicle may be weighted more so its small movement is not dwarfed compared to the relatively large movement of the shoulder. Balancing the weights between rotations can reduce the overall number of samples needed for smooth interpolation, by ensuring all parts of the rig are considered, even if it has a relatively smaller impact to the movement of the digital character. These weights may be user defined, or at least partially user defined. The weights may be re-used across several different rigs, or changed as needed depending on the how the rig will be used or the type of character. For example, the exact same set of weights may be used for all human avatars, but may be slightly adjusted for a various animals, or personified objects.

An additional benefit of the systems and methods described herein, is abstracting complex systems into serializable data which can be transferred from an authoring (e.g. direct content creation (DCC)) application into a real-time engine. During the training stage of a NN, a particular set of parameters are used to describe the pose of a digital character. The linear outputs are defined by a single value and the rotational outputs are defined by a set of four values (e.g., SO(3) space). The same rig set-up may be used across all characters, thus creating a standardized output set that could be used to drive a wide range of digital characters. Typical rigging systems are built in an authoring application which comes with its own unique set of programs and systems that are used to build a digital character rig. If the rig needs to be transferred, say to a real-time run engine, some of the DCC application functionality gets lost in translation and the transferred rig does not perform the exact same as it originally did.

Examples of 3D Display of a Wearable System

A wearable system (also referred to herein as an "augmented reality (AR) system") can be configured to present 2D or 3D virtual images to a user. The images may be still images, frames of a video, or a video, in combination or the like. At least a portion of the wearable system can be implemented on a wearable device that can present a VR, AR, or MR environment, alone or in combination, for user interaction. The wearable device can be used interchangeably as an AR device (ARD). Further, for the purpose of the present disclosure, the term "AR" is used interchangeably with the term "MR".

FIG. 1 depicts an illustration of a mixed reality scenario with certain virtual reality objects, and certain physical objects viewed by a person. In FIG. 1, an MR scene 100 is depicted wherein a user of an MR technology sees a real-world park-like setting 110 featuring people, trees, buildings in the background, and a concrete platform 120. In addition to these items, the user of the MR technology also perceives that he "sees" a robot statue 130 standing upon the real-world platform 120, and a cartoon-like avatar character 140 flying by which seems to be a personification of a bumble bee, even though these elements do not exist in the real world.

In order for the 3D display to produce a true sensation of depth, and more specifically, a simulated sensation of surface depth, it may be desirable for each point in the display's visual field to generate an accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

Figure 2:
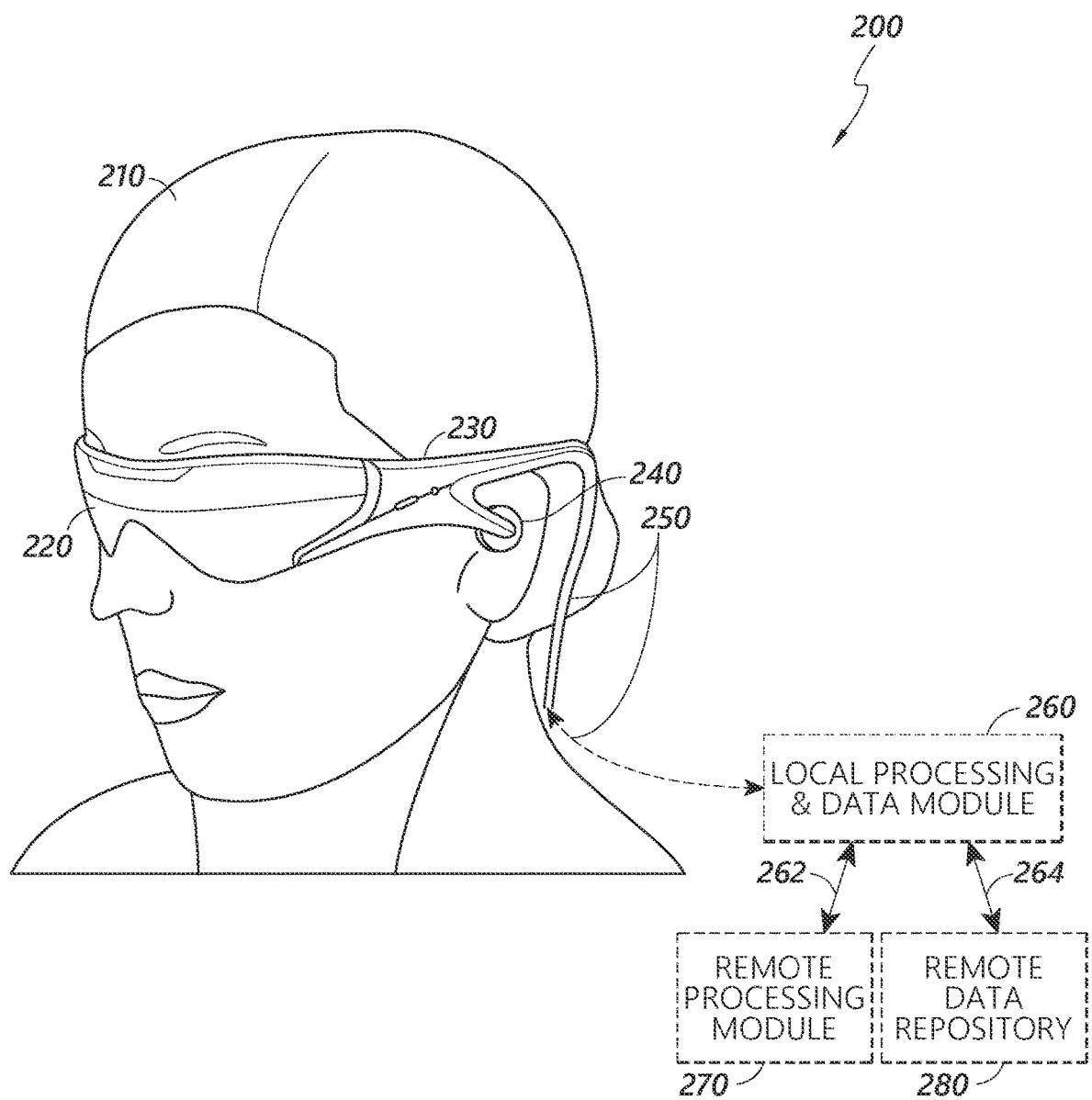
FIG. 2 schematically illustrates an example of a wearable system.

VR, AR, and MR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane or based on observing different image features on different depth planes being out of focus. As discussed elsewhere herein, such depth cues provide credible perceptions of depth. [0056] FIG. 2 illustrates an example of wearable system 200 which can be configured to provide an AR/VR/MR scene. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user.

FIG. 2 illustrates an example of wearable system 200 which can be configured to provide an AR/VR/MR scene. The wearable system 200 can also be referred to as the AR system 200. The wearable system 200 includes a display 220, and various mechanical and electronic modules and systems to support the functioning of display 220. The display 220 may be coupled to a frame 230, which is wearable by a user, wearer, or viewer 210. The display 220 can be positioned in front of the eyes of the user 210. The display 220 can present AR/VR/MR content to a user. The display 220 can comprise a head mounted display (HMD) that is worn on the head of the user.

In some embodiments, a speaker 240 is coupled to the frame 230 and positioned adjacent the ear canal of the user (in some embodiments, another speaker, not shown, is positioned adjacent the other ear canal of the user to provide for stereo/shapeable sound control). The display 220 can include an audio sensor (e.g., a microphone) 232 for detecting an audio stream from the environment and capture ambient sound. In some embodiments, one or more other audio sensors, not shown, are positioned to provide stereo sound reception. Stereo sound reception can be used to determine the location of a sound source. The wearable system 200 can perform voice or speech recognition on the audio stream.

The wearable system 200 can include an outward-facing imaging system 464 (shown in FIG. 4) which observes the world in the environment around the user. The wearable system 200 can also include an inward-facing imaging system 462 (shown in FIG. 4) which can track the eye movements of the user. The inward-facing imaging system may track either one eye's movements or both eyes' movements. The inward-facing imaging system 462 may be attached to the frame 230 and may be in electrical communication with the processing modules 260 or 270, which may process image information acquired by the inward-facing imaging system to determine, e.g., the pupil diameters or orientations of the eyes, eye movements or eye pose of the user 210. The inward-facing imaging system 462 may include one or more cameras. For example, at least one camera may be used to image each eye. The images acquired by the cameras may be used to determine pupil size or eye pose for each eye separately, thereby allowing presentation of image information to each eye to be dynamically tailored to that eye.

As an example, the wearable system 200 can use the outward-facing imaging system 464 or the inward-facing imaging system 462 to acquire images of a pose of the user. The images may be still images, frames of a video, or a video.

The display 220 can be operatively coupled 250, such as by a wired lead or wireless connectivity, to a local data processing module 260 which may be mounted in a variety of configurations, such as fixedly attached to the frame 230, fixedly attached to a helmet or hat worn by the user, embedded in headphones, or otherwise removably attached to the user 210 (e.g., in a backpack-style configuration, in a belt-coupling style configuration).

The local processing and data module 260 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 230 or otherwise attached to the user 210), such as image capture devices (e.g., cameras in the inward-facing imaging system or the outward-facing imaging system), audio sensors (e.g., microphones), inertial measurement units (IMUs), accelerometers, compasses, global positioning system (GPS) units, radio devices, or gyroscopes; or b) acquired or processed using remote processing module 270 or remote data repository 280, possibly for passage to the display 220 after such processing or retrieval. The local processing and data module 260 may be operatively coupled by communication links 262 or 264, such as via wired or wireless communication links, to the remote processing module 270 or remote data repository 280 such that these remote modules are available as resources to the local processing and data module 260. In addition, remote processing module 280 and remote data repository 280 may be operatively coupled to each other.

In some embodiments, the remote processing module 270 may comprise one or more processors configured to analyze and process data or image information. In some embodiments, the remote data repository 280 may comprise a digital data storage facility, which may be available through the internet or other networking configuration in a "cloud" resource configuration. In some embodiments, all data is stored and all computations are performed in the local processing and data module, allowing fully autonomous use from a remote module.

Example Components of a Wearable System

Figure 3:
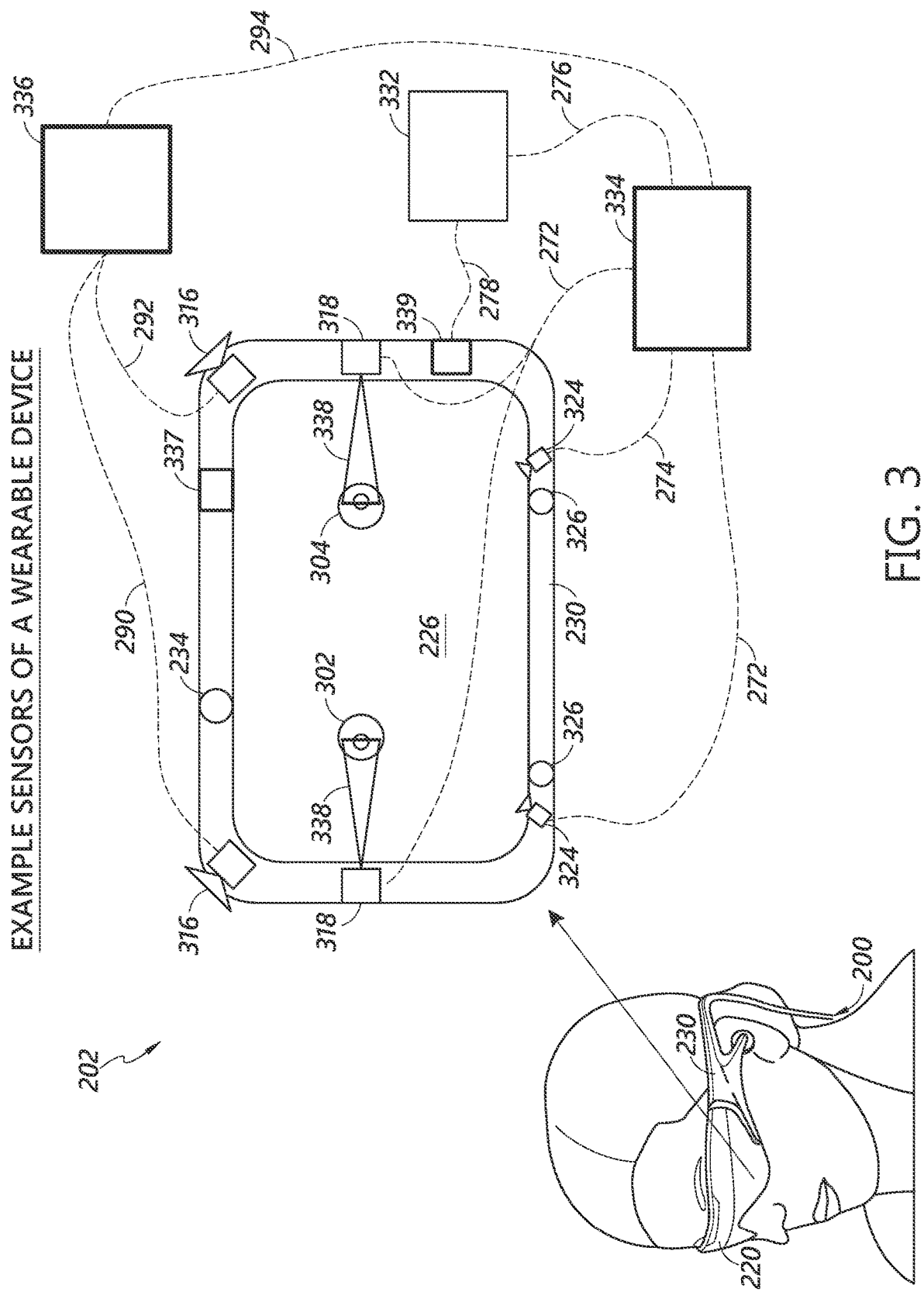
FIG. 3 schematically illustrates example components of a wearable system.

FIG. 3 schematically illustrates example components of a wearable system. FIG. 3 shows a wearable system 200 which can include a display 220 and a frame 230. A blown-up view 202 schematically illustrates various components of the wearable system 200. In certain implements, one or more of the components illustrated in FIG. 3 can be part of the display 220. The various components alone or in combination can collect a variety of data (such as e.g., audio or visual data) associated with the user of the wearable system 200 or the user's environment. It should be appreciated that other embodiments may have additional or fewer components depending on the application for which the wearable system is used. Nevertheless, FIG. 3 provides a basic idea of some of the various components and types of data that may be collected, analyzed, and stored through the wearable system.

FIG. 3 shows an example wearable system 200 which can include the display 220. The display 220 can comprise a display lens 226 that may be mounted to a user's head or a housing or frame 230, which corresponds to the frame 230. The display lens 226 may comprise one or more transparent mirrors or diffractive optical elements positioned by the housing 230 in front of the user's eyes 302, 304 and may be configured to direct projected light 338 into the eyes 302, 304 and facilitate beam shaping, while also allowing for transmission of at least some light from the local environment. The wavefront of the projected light beam 338 may diverge to coincide with a desired focal distance of the projected light. As illustrated, two wide-field-of-view machine vision cameras 316 (also referred to as world cameras) can be coupled to the housing 230 to image the environment around the user. These cameras 316 can be dual capture visible light/non-visible (e.g., infrared) light cameras. The cameras 316 may be part of the outward-facing imaging system 464 shown in FIG. 4. Image acquired by the world cameras 316 can be processed by the pose processor 336. For example, the pose processor 336 can implement one or more object recognizers 708 (e.g., shown in FIG. 7) to identify a pose of a user or another person in the user's environment or to identify a physical object in the user's environment.

With continued reference to FIG. 3, a pair of light projector modules with display optics and lens configured to direct light 338 into the eyes 302, 304 are shown. The depicted view also shows two miniature infrared cameras 324 paired with infrared light (such as light emitting diodes "LED"s), which are configured to be able to track the eyes 302, 304 of the user to support rendering and user input. The cameras 324 may be part of the inward-facing imaging system 462 shown in FIG. 4 The wearable system 200 can further feature a sensor assembly 339, which may comprise X, Y, and Z axis accelerometer capability as well as a magnetic compass and X, Y, and Z axis gyro capability, preferably providing data at a relatively high frequency, such as 200 Hz. The sensor assembly 339 may be part of the IMU described with reference to FIG. 2A The depicted system 200 can also comprise a head pose processor 336, such as an ASIC (application specific integrated circuit), FPGA (field programmable gate array), or ARM processor (advanced reduced-instruction-set machine), which may be configured to calculate real or near-real time user head pose from wide field of view image information output from the capture devices 316. The head pose processor 336 can be a hardware processor and can be implemented as part of the local processing and data module 260 shown in FIG. 2A.

The wearable system can also include one or more depth sensors 234. The depth sensor 234 can be configured to measure the distance between an object in an environment to a wearable device. The depth sensor 234 may include a laser scanner (e.g., a lidar), an ultrasonic depth sensor, or a depth sensing camera. In certain implementations, where the cameras 316 have depth sensing ability, the cameras 316 may also be considered as depth sensors 234.

[Also shown is a processor 332 configured to execute digital or analog processing to derive pose from the gyro, compass, or accelerometer data from the sensor assembly 339. The processor 332 may be part of the local processing and data module 260 shown in FIG. 2. The wearable system 200 as shown in FIG. 3 can also include a position system such as, e.g., a GPS 337 (global positioning system) to assist with pose and positioning analyses. In addition, the GPS may further provide remotely-based (e.g., cloud-based) information about the user's environment. This information may be used for recognizing objects or information in user's environment.

The wearable system may combine data acquired by the GPS 337 and a remote computing system (such as, e.g., the remote processing module 270, another user's ARD, etc.) which can provide more information about the user's environment. As one example, the wearable system can determine the user's location based on GPS data and retrieve a world map (e.g., by communicating with a remote processing module 270) including virtual objects associated with the user's location. As another example, the wearable system 200 can monitor the environment using the world cameras 316 (which may be part of the outward-facing imaging system 464 shown in FIG. 4). Based on the images acquired by the world cameras 316, the wearable system 200 can detect objects in the environment (e.g., by using one or more object recognizers 708 shown in FIG. 7). The wearable system can further use data acquired by the GPS 337 to interpret the characters.

The wearable system 200 may also comprise a rendering engine 334 which can be configured to provide rendering information that is local to the user to facilitate operation of the scanners and imaging into the eyes of the user, for the user's view of the world. The rendering engine 334 may be implemented by a hardware processor (such as, e.g., a central processing unit or a graphics processing unit). In some embodiments, the rendering engine is part of the local processing and data module 260. The rendering engine 334 can be communicatively coupled (e.g., via wired or wireless links) to other components of the wearable system 200. For example, the rendering engine 334, can be coupled to the eye cameras 324 via communication link 274, and be coupled to a projecting subsystem 318 (which can project light into user's eyes 302, 304 via a scanned laser arrangement in a manner similar to a retinal scanning display) via the communication link 272. The rendering engine 334 can also be in communication with other processing units such as, e.g., the sensor pose processor 332 and the image pose processor 336 via links 276 and 294 respectively.

The cameras 324 (e.g., mini infrared cameras) may be utilized to track the eye pose to support rendering and user input. Some example eye poses may include where the user is looking or at what depth he or she is focusing (which may be estimated with eye vergence). The GPS 337, gyros, compass, and accelerometers 339 may be utilized to provide coarse or fast pose estimates. One or more of the cameras 316 can acquire images and pose, which in conjunction with data from an associated cloud computing resource, may be utilized to map the local environment and share user views with others.

The example components depicted in FIG. 3 are for illustration purposes only. Multiple sensors and other functional modules are shown together for ease of illustration and description. Some embodiments may include only one or a subset of these sensors or modules. Further, the locations of these components are not limited to the positions depicted in FIG. 3. Some components may be mounted to or housed within other components, such as a belt-mounted component, a hand-held component, or a helmet component. As one example, the image pose processor 336, sensor pose processor 332, and rendering engine 334 may be positioned in a beltpack and configured to communicate with other components of the wearable system via wireless communication, such as ultra-wideband, Wi-Fi, Bluetooth, etc., or via wired communication. The depicted housing 230 preferably is head-mountable and wearable by the user. However, some components of the wearable system 200 may be worn to other portions of the user's body. For example, the speaker 240 may be inserted into the ears of a user to provide sound to the user.

Regarding the projection of light 338 into the eyes 302, 304 of the user, in some embodiments, the cameras 324 may be utilized to measure where the centers of a user's eyes are geometrically verged to, which, in general, coincides with a position of focus, or "depth of focus", of the eyes. A 3-dimensional surface of all points the eyes verge to can be referred to as the "horopter". The focal distance may take on a finite number of depths, or may be infinitely varying. Light projected from the vergence distance appears to be focused to the subject eye 302, 304, while light in front of or behind the vergence distance is blurred. Examples of wearable devices and other display systems of the present disclosure are also described in U.S. Patent Publication No. 2016/0270656, which is incorporated by reference herein in its entirety.

The human visual system is complicated and providing a realistic perception of depth is challenging. Viewers of an object may perceive the object as being three-dimensional due to a combination of vergence and accommodation. Vergence movements (e.g., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic and comfortable simulations of three-dimensional imagery.

Further spatially coherent light with a beam diameter of less than about 0.7 millimeters can be correctly resolved by the human eye regardless of where the eye focuses. Thus, to create an illusion of proper focal depth, the eye vergence may be tracked with the cameras 324, and the rendering engine 334 and projection subsystem 318 may be utilized to render all objects on or close to the vergence in focus, and all other objects at varying degrees of resolution. Preferably, the system 220 renders to the user at a frame rate of about 60 frames per second or greater. As described above, preferably, the cameras 324 may be utilized for eye tracking, and software may be configured to pick up not only vergence geometry but also focus location cues to serve as user inputs. Preferably, such a display system is configured with brightness and contrast suitable for day or night use.

In some embodiments, the display system preferably has latency of less than about 20 milliseconds for visual object alignment, less than about 0.1 degree of angular alignment, and about 1 arc minute of resolution, which, without being limited by theory, is believed to be approximately the limit of the human eye. The display system 220 may be integrated with a localization system, which may involve GPS elements, optical tracking, compass, accelerometers, or other data sources, to assist with position and pose determination; localization information may be utilized to facilitate accurate rendering in the user's view of the pertinent world (e.g., such information would facilitate the glasses to know where they are with respect to the real world).

In some embodiments, the wearable system 200 is configured to display one or more virtual images based on the accommodation of the user's eyes. Unlike prior 3D display approaches that force the user to focus where the images are being projected, in some embodiments, the wearable system is configured to automatically vary the focus of projected virtual content to allow for a more comfortable viewing of one or more images presented to the user. For example, if the user's eyes have a current focus of 1 m, the image may be projected to coincide with the user's focus. If the user shifts focus to 3 m, the image is projected to coincide with the new focus. Thus, rather than forcing the user to a predetermined focus, the wearable system 200 of some embodiments allows the user's eye to a function in a more natural manner.

Such a wearable system 200 may eliminate or reduce the incidences of eye strain, headaches, and other physiological symptoms typically observed with respect to virtual reality devices. To achieve this, various embodiments of the wearable system 200 are configured to project virtual images at varying focal distances, through one or more variable focus elements (VFEs). In one or more embodiments, 3D perception may be achieved through a multi-plane focus system that projects images at fixed focal planes away from the user. Other embodiments employ variable plane focus, wherein the focal plane is moved back and forth in the z-direction to coincide with the user's present state of focus.

In both the multi-plane focus systems and variable plane focus systems, wearable system 200 may employ eye tracking to determine a vergence of the user's eyes, determine the user's current focus, and project the virtual image at the determined focus. In other embodiments, wearable system 200 comprises a light modulator that variably projects, through a fiber scanner, or other light generating source, light beams of varying focus in a raster pattern across the retina. Thus, the ability of the display of the wearable system 200 to project images at varying focal distances not only eases accommodation for the user to view objects in 3D, but may also be used to compensate for user ocular anomalies, as further described in U.S. Patent Publication No. 2016/0270656, which is incorporated by reference herein in its entirety. In some other embodiments, a spatial light modulator may project the images to the user through various optical components. For example, as described further below, the spatial light modulator may project the images onto one or more waveguides, which then transmit the images to the user.

Waveguide Stack Assembly

Figure 4:
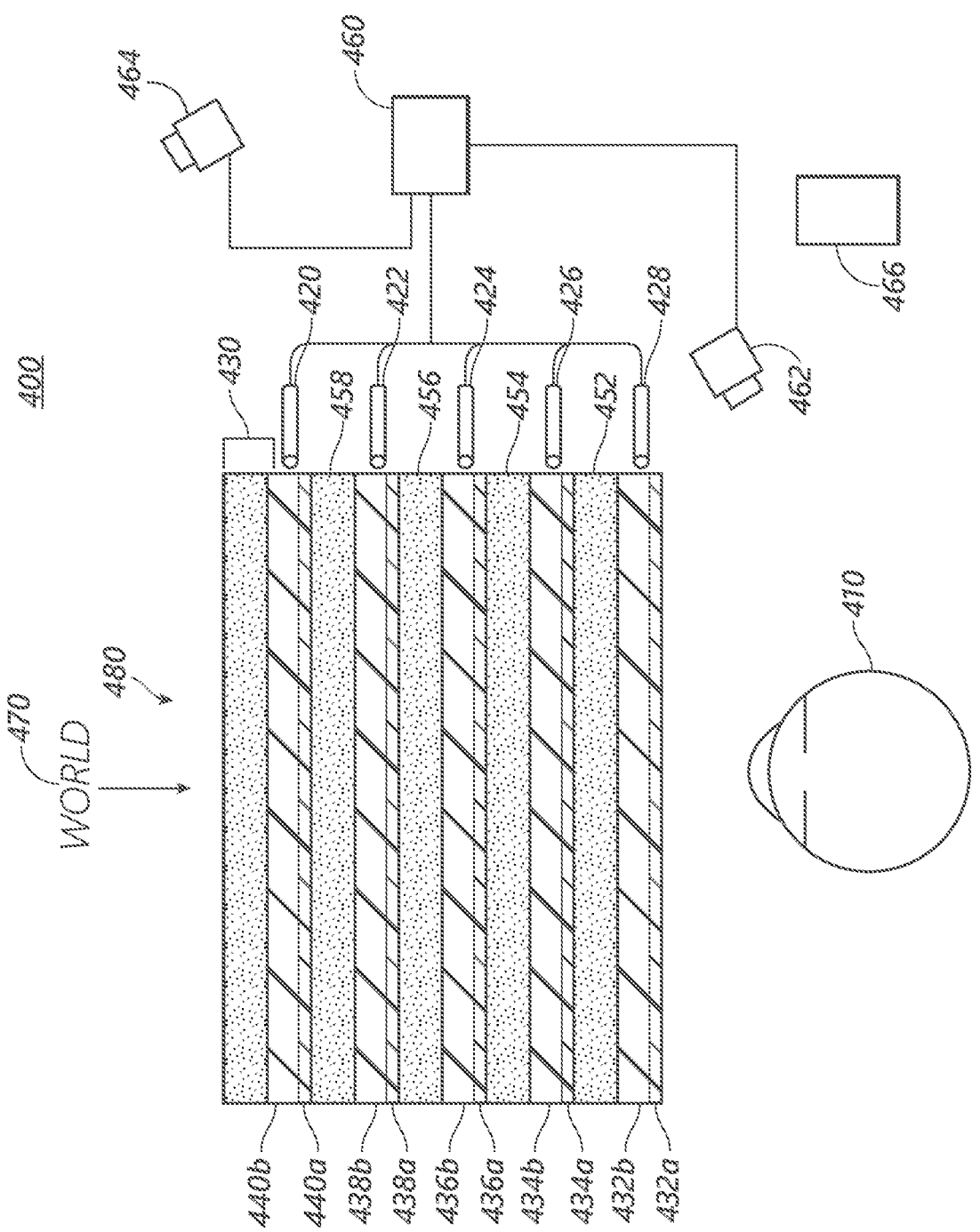
FIG. 4 schematically illustrates an example of a waveguide stack of a wearable device for outputting image information to a user.

FIG. 4 illustrates an example of a waveguide stack for outputting image information to a user. A wearable system 400 includes a stack of waveguides, or stacked waveguide assembly 480 that may be utilized to provide three-dimensional perception to the eye/brain using a plurality of waveguides 432b, 434b, 436b, 438b, 4400b. In some embodiments, the wearable system 400 may correspond to wearable system 200 of FIG. 2, with FIG. 4 schematically showing some parts of that wearable system 200 in greater detail. For example, in some embodiments, the waveguide assembly 480 may be integrated into the display 220 of FIG. 2.

With continued reference to FIG. 4, the waveguide assembly 480 may also include a plurality of features 458, 456, 454, 452 between the waveguides. In some embodiments, the features 458, 456, 454, 452 may be lenses. In other embodiments, the features 458, 456, 454, 452 may not be lenses. Rather, they may simply be spacers (e.g., cladding layers or structures for forming air gaps).

The waveguides 432b, 434b, 436b, 438b, 440b or the plurality of lenses 458, 456, 454, 452 may be configured to send image information to the eye with various levels of wavefront curvature or light ray divergence. Each waveguide level may be associated with a particular depth plane and may be configured to output image information corresponding to that depth plane. Image injection devices 420, 422, 424, 426, 428 may be utilized to inject image information into the waveguides 440b, 438b, 436b, 434b, 432b, each of which may be configured to distribute incoming light across each respective waveguide, for output toward the eye 410. Light exits an output surface of the image injection devices 420, 422, 424, 426, 428 and is injected into a corresponding input edge of the waveguides 440b, 438b, 436b, 434b, 432b. In some embodiments, a single beam of light (e.g., a collimated beam) may be injected into each waveguide to output an entire field of sample exit pupil beams that are directed toward the eye 410 at particular angles (and amounts of divergence) corresponding to the depth plane associated with a particular waveguide.

In some embodiments, the image injection devices 420, 422, 424, 426, 428 are discrete displays that each produce image information for injection into a corresponding waveguide 440b, 438b, 436b, 434b, 432b, respectively. In some other embodiments, the image injection devices 420, 422, 424, 426, 428 are the output ends of a single multiplexed display which may, e.g., pipe image information via one or more optical conduits (such as fiber optic cables) to each of the image injection devices 420, 422, 424, 426, 428.

A controller 460 controls the operation of the display and the image injection devices 420, 422, 424, 426, 428. The controller 460 includes programming (e.g., instructions in a non-transitory computer-readable medium) that regulates the timing and provision of image information to the waveguides 440b, 438b, 436b, 434b, 432b. In some embodiments, the controller 460 may be a single integral device, or a distributed system connected by wired or wireless communication channels. The controller 460 may be part of the processing modules 260 or 270 (illustrated in FIG. 2) in some embodiments.

The waveguides 440b, 438b, 436b, 434b, 432b may be configured to propagate light within each respective waveguide by total internal reflection (TIR). The waveguides 440b, 438b, 436b, 434b, 432b may each be planar or have another shape (e.g., curved), with major top and bottom surfaces and edges extending between those major top and bottom surfaces. In the illustrated configuration, the waveguides 440b, 438b, 436b, 434b, 432b may each include optical elements 440a, 438a, 436a, 434a, 432a that are configured to outcouple light out of a waveguide by diffracting or otherwise redirecting the light propagating within each respective waveguide. Outcoupled light is outputted by the waveguide at locations at which the light propagating in the waveguide strikes a light redirecting element, such as a diffractive grating, for example. The optical elements (440a, 438a, 436a, 434a, 432a) may, for example, be reflective or diffractive optical features. While illustrated disposed at the bottom major surfaces of the waveguides 440b, 438b, 436b, 434b, 432b for ease of description and drawing clarity, in some embodiments, the optical elements 440a, 438a, 436a, 434a, 432a may be disposed at the top or bottom major surfaces, or may be disposed directly in the volume of the waveguides 440b, 438b, 436b, 434b, 432b. In some embodiments, the optical elements 440a, 438a, 436a, 434a, 432a may be formed in a layer of material that is attached to a transparent substrate to form the waveguides 440b, 438b, 436b, 434b, 432b. In some other embodiments, the waveguides 440b, 438b, 436b, 434b, 432b may be a monolithic piece of material and the optical elements 440a, 438a, 436a, 434a, 432a may be formed on a surface or in the interior of that piece of material.

With continued reference to FIG. 4, as discussed herein, in some embodiments, each waveguide 440b, 438b, 436b, 434b, 432b is configured to output light to form an image corresponding to a particular depth plane. For example, the waveguide 432b nearest the eye may be configured to deliver collimated light, as injected into such waveguide 432b, to the eye 410. The collimated light may be representative of the optical infinity focal plane. The next waveguide up 434b may be configured to send out collimated light which passes through the first lens 452 (e.g., a negative lens) before it can reach the eye 410. First lens 452 may be configured to create a slight convex wavefront curvature so that the eye/brain interprets light coming from that next waveguide up 434b as coming from a first focal plane closer inward toward the eye 410 from optical infinity. Similarly, the third up waveguide 436b passes its output light through both the first lens 452 and second lens 454 before reaching the eye 410. The combined optical power of the first and second lenses 452 and 454 may be configured to create another incremental amount of wavefront curvature so that the eye/brain interprets light coming from the third waveguide 436b as coming from a second focal plane that is even closer inward toward the person from optical infinity than was light from the next waveguide up 434b.

The other waveguide layers (e.g., waveguides 438b, 440b) and lenses (e.g., lenses 456, 458) are similarly configured, with the highest waveguide 440b in the stack sending its output through all of the lenses between it and the eye for an aggregate focal power representative of the closest focal plane to the person. To compensate for the stack of lenses 458, 456, 454, 452 when viewing/interpreting light coming from the world 470 on the other side of the stacked waveguide assembly 480, a compensating lens layer 430 may be disposed at the top of the stack to compensate for the aggregate power of the lens stack 458, 456, 454, 452 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both may be dynamic using electro-active features.

With continued reference to FIG. 4, the light extracting optical elements 440a, 438a, 436a, 434a, 432a may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 440a, 438a, 436a, 434a, 432a may be volumetric or surface features, which may be configured to output light at specific angles. For example, the light extracting optical elements 440a, 438a, 436a, 434a, 432a may be volume holograms, surface holograms, and/or diffraction gratings. Light extracting optical elements, such as diffraction gratings, are described in U.S. Patent Publication No. 2015/ 0178939, published Jun. 25, 2015, which is incorporated by reference herein in its entirety.

In some embodiments, the light extracting optical elements 440a, 438a, 436a, 434a, 432a are diffractive features that form a diffraction pattern, or "diffractive optical element" (also referred to herein as a "DOE"). Preferably, the DOE has a relatively low diffraction efficiency so that only a portion of the light of the beam is deflected away toward the eye 410 with each intersection of the DOE, while the rest continues to move through a waveguide via total internal reflection. The light carrying the image information can thus be divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs may be switchable between "on" state in which they actively diffract, and "off" state in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes or depth of field may be varied dynamically based on the pupil sizes or orientations of the eyes of the viewer. Depth of field may change inversely with a viewer's pupil size. As a result, as the sizes of the pupils of the viewer's eyes decrease, the depth of field increases such that one plane that is not discernible because the location of that plane is beyond the depth of focus of the eye may become discernible and appear more in focus with reduction of pupil size and commensurate with the increase in depth of field. Likewise, the number of spaced apart depth planes used to present different images to the viewer may be decreased with the decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size or orientation, or upon receiving electrical signals indicative of particular pupil size or orientation. For example, if the user's eyes are unable to distinguish between two depth planes associated with two waveguides, then the controller 460 (which may be an embodiment of the local processing and data module 260) can be configured or programmed to cease providing image information to one of these waveguides. Advantageously, this may reduce the processing burden on the system, thereby increasing the responsiveness of the system. In embodiments in which the DOEs for a waveguide are switchable between the on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

The wearable system 400 can include an outward-facing imaging system 464 (e.g., a digital camera) that images a portion of the world 470. This portion of the world 470 may be referred to as the field of view (FOV) of a world camera and the imaging system 464 is sometimes referred to as an FOV camera. The FOV of the world camera may or may not be the same as the FOV of a viewer 210 which encompasses a portion of the world 470 the viewer 210 perceives at a given time. For example, in some situations, the FOV of the world camera may be larger than the viewer 210 of the viewer 210 of the wearable system 400. The entire region available for viewing or imaging by a viewer may be referred to as the field of regard (FOR). The FOR may include 4π steradians of solid angle surrounding the wearable system 400 because the wearer can move his body, head, or eyes to perceive substantially any direction in space. In other contexts, the wearer's movements may be more constricted, and accordingly the wearer's FOR may subtend a smaller solid angle. Images obtained from the outward-facing imaging system 464 can be used to track gestures made by the user (e.g., hand or finger gestures), detect objects in the world 470 in front of the user, and so forth.

The wearable system 400 can include an audio sensor 232, e.g., a microphone, to capture ambient sound. As described above, in some embodiments, one or more other audio sensors can be positioned to provide stereo sound reception useful to the determination of location of a speech source. The audio sensor 232 can comprise a directional microphone, as another example, which can also provide such useful directional information as to where the audio source is located. The wearable system 400 can use information from both the outward-facing imaging system 464 and the audio sensor 230 in locating a source of speech, or to determine an active speaker at a particular moment in time, etc. For example, the wearable system 400 can use the voice recognition alone or in combination with a reflected image of the speaker (e.g., as seen in a mirror) to determine the identity of the speaker. As another example, the wearable system 400 can determine a position of the speaker in an environment based on sound acquired from directional microphones. The wearable system 400 can parse the sound coming from the speaker's position with speech recognition algorithms to determine the content of the speech and use voice recognition techniques to determine the identity (e.g., name or other demographic information) of the speaker.

The wearable system 400 can also include an inward-facing imaging system 466 (e.g., a digital camera), which observes the movements of the user, such as the eye movements and the facial movements. The inward-facing imaging system 466 may be used to capture images of the eye 410 to determine the size and/or orientation of the pupil of the eye 304. The inward-facing imaging system 466 can be used to obtain images for use in determining the direction the user is looking (e.g., eye pose) or for biometric identification of the user (e.g., via iris identification). In some embodiments, at least one camera may be utilized for each eye, to separately determine the pupil size or eye pose of each eye independently, thereby allowing the presentation of image information to each eye to be dynamically tailored to that eye. In some other embodiments, the pupil diameter or orientation of only a single eye 410 (e.g., using only a single camera per pair of eyes) is determined and assumed to be similar for both eyes of the user. The images obtained by the inward-facing imaging system 466 may be analyzed to determine the user's eye pose or mood, which can be used by the wearable system 400 to decide which audio or visual content should be presented to the user. The wearable system 400 may also determine head pose (e.g., head position or head orientation) using sensors such as IMUs, accelerometers, gyroscopes, etc.

The wearable system 400 can include a user input device 466 by which the user can input commands to the controller 460 to interact with the wearable system 400. For example, the user input device 466 can include a trackpad, a touchscreen, a joystick, a multiple degree-of-freedom (DOF) controller, a capacitive sensing device, a game controller, a keyboard, a mouse, a directional pad (D-pad), a wand, a haptic device, a totem (e.g., functioning as a virtual user input device), and so forth. A multi-DOF controller can sense user input in some or all possible translations (e.g., left/right, forward/backward, or up/down) or rotations (e.g., yaw, pitch, or roll) of the controller. A multi-DOF controller which supports the translation movements may be referred to as a 3DOF while a multi-DOF controller which supports the translations and rotations may be referred to as 6DOF. In some cases, the user may use a finger (e.g., a thumb) to press or swipe on a touch-sensitive input device to provide input to the wearable system 400 (e.g., to provide user input to a user interface provided by the wearable system 400). The user input device 466 may be held by the user's hand during the use of the wearable system 400. The user input device 466 can be in wired or wireless communication with the wearable system 400.

Other Components of the Wearable System

In many implementations, the wearable system may include other components in addition or in alternative to the components of the wearable system described above. The wearable system may, for example, include one or more haptic devices or components. The haptic devices or components may be operable to provide a tactile sensation to a user. For example, the haptic devices or components may provide a tactile sensation of pressure or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The wearable system may, for example, include one or more physical objects which are manipulable by the user to allow input or interaction with the wearable system. These physical objects may be referred to herein as totems. Some totems may take the form of inanimate objects, such as for example, a piece of metal or plastic, a wall, a surface of table. In certain implementations, the totems may not actually have any physical input structures (e.g., keys, triggers, joystick, trackball, rocker switch). Instead, the totem may simply provide a physical surface, and the wearable system may render a user interface so as to appear to a user to be on one or more surfaces of the totem. For example, the wearable system may render an image of a computer keyboard and trackpad to appear to reside on one or more surfaces of a totem. For example, the wearable system may render a virtual computer keyboard and virtual trackpad to appear on a surface of a thin rectangular plate of aluminum which serves as a totem. The rectangular plate does not itself have any physical keys or trackpad or sensors. However, the wearable system may detect user manipulation or interaction or touches with the rectangular plate as selections or inputs made via the virtual keyboard or virtual trackpad. The user input device 466 (shown in FIG. 4) may be an embodiment of a totem, which may include a trackpad, a touchpad, a trigger, a joystick, a trackball, a rocker or virtual switch, a mouse, a keyboard, a multi-degree-of-freedom controller, or another physical input device. A user may use the totem, alone or in combination with poses, to interact with the wearable system or other users.

Examples of haptic devices and totems usable with the wearable devices, HMD, and display systems of the present disclosure are described in U.S. Patent Publication No. 2015/0016777, which is incorporated by reference herein in its entirety.

Example Processes of User Interactions with a Wearable System

Figure 5:
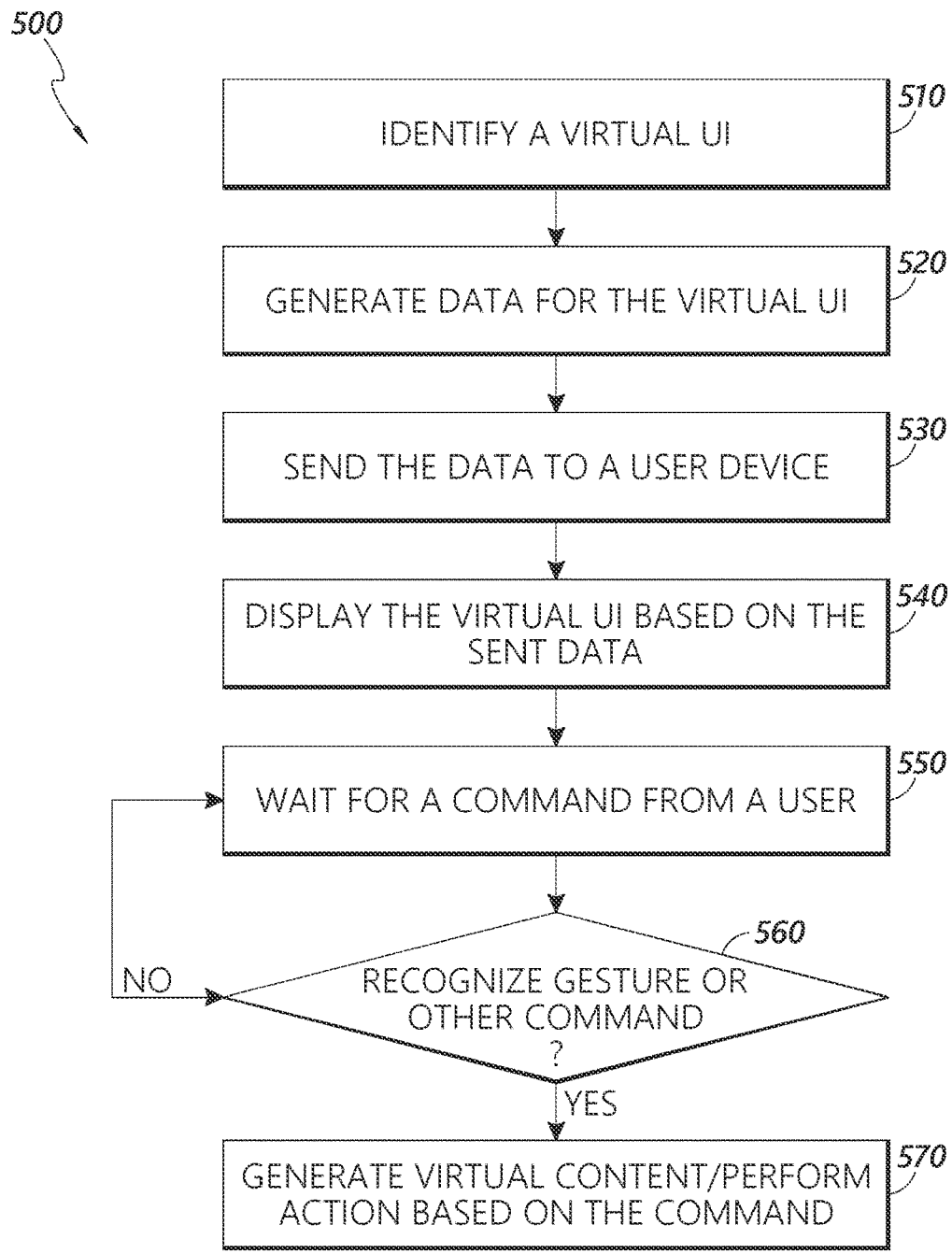
FIG. 5 is a process flow diagram of an example of a method for interacting with a virtual user interface.

FIG. 5 is a process flow diagram of an example of a method 500 for interacting with a virtual user interface. The method 500 may be performed by the wearable system described herein. Embodiments of the method 500 can be used by the wearable system to detect persons or documents in the FOV of the wearable system.

At block 510, the wearable system may identify a particular UI. The type of UI may be predetermined by the user. The wearable system may identify that a particular UI needs to be populated based on a user input (e.g., gesture, visual data, audio data, sensory data, direct command, etc.). The UI can be specific to a security scenario where the wearer of the system is observing users who present documents to the wearer (e.g., at a travel checkpoint). At block 520, the wearable system may generate data for the virtual UI. For example, data associated with the confines, general structure, shape of the UI etc., may be generated. In addition, the wearable system may determine map coordinates of the user's physical location so that the wearable system can display the UI in relation to the user's physical location. For example, if the UI is body centric, the wearable system may determine the coordinates of the user's physical stance, head pose, or eye pose such that a ring UI can be displayed around the user or a planar UI can be displayed on a wall or in front of the user. In the security context described herein, the UI may be displayed as if the UI were surrounding the traveler who is presenting documents to the wearer of the system, so that the wearer can readily view the UI while looking at the traveler and the traveler's documents. If the UI is hand centric, the map coordinates of the user's hands may be determined. These map points may be derived through data received through the FOV cameras, sensory input, or any other type of collected data.

At block 530, the wearable system may send the data to the display from the cloud or the data may be sent from a local database to the display components. At block 540, the UI is displayed to the user based on the sent data. For example, a light field display can project the virtual UI into one or both of the user's eyes. Once the virtual UI has been created, the wearable system may simply wait for a command from the user to generate more virtual content on the virtual UI at block 550. For example, the UI may be a body centric ring around the user's body or the body of a person in the user's environment (e.g., a traveler). The wearable system may then wait for the command (a gesture, a head or eye movement, voice command, input from a user input device, etc.), and if it is recognized (block 560), virtual content associated with the command may be displayed to the user (block 570).

Examples of Avatar Rendering in Mixed Reality

A wearable system may employ various mapping related techniques in order to achieve high depth of field in the rendered light fields. In mapping out the virtual world, it is advantageous to know all the features and points in the real world to accurately portray virtual objects in relation to the real world. To this end, FOV images captured from users of the wearable system can be added to a world model by including new pictures that convey information about various points and features of the real world. For example, the wearable system can collect a set of map points (such as 2D points or 3D points) and find new map points to render a more accurate version of the world model. The world model of a first user can be communicated (e.g., over a network such as a cloud network) to a second user so that the second user can experience the world surrounding the first user.

Figure 6A:
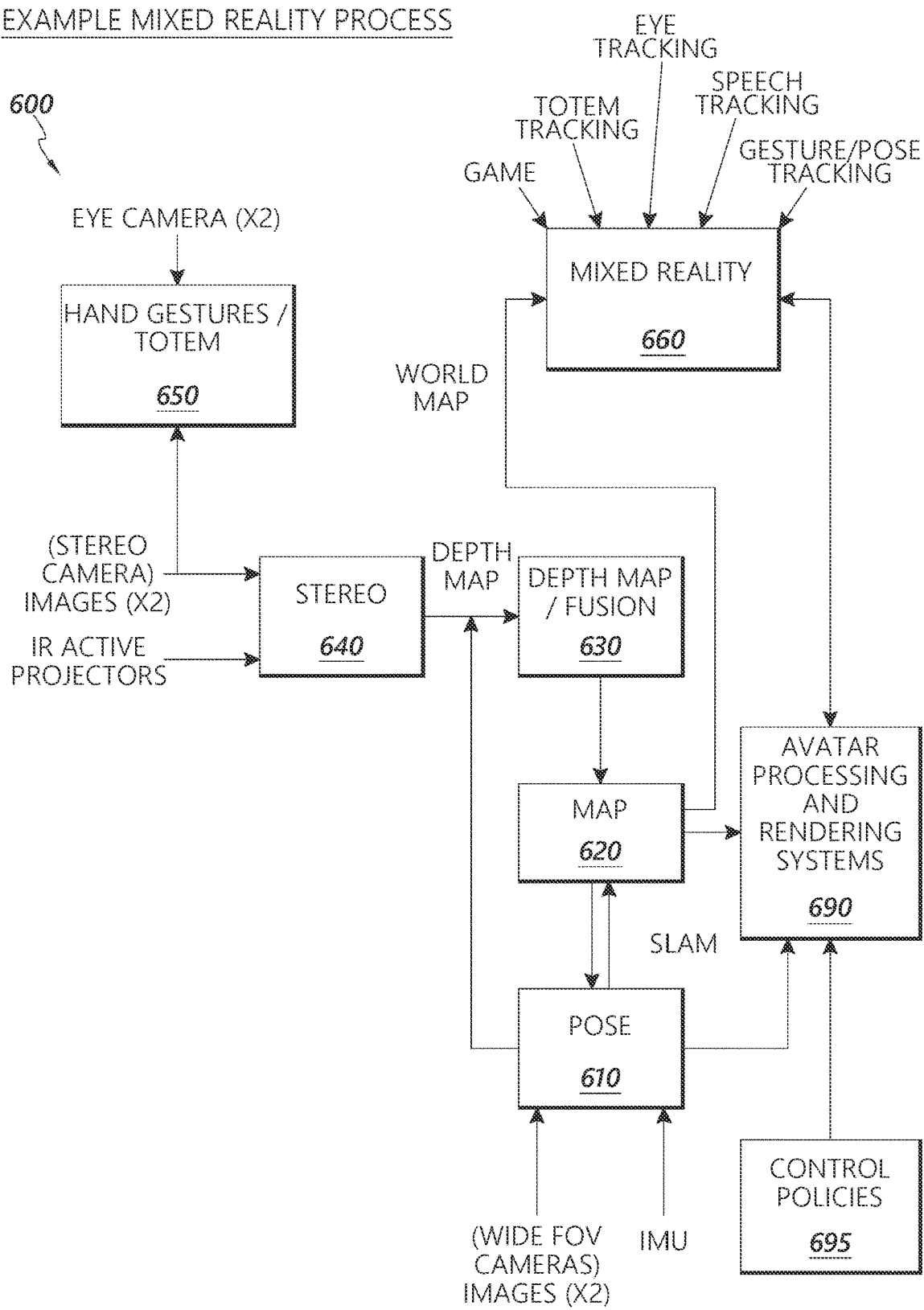
FIG. 6A is a block diagram of another example of a wearable system which can comprise an avatar processing and rendering system.

FIG. 6A is a block diagram of another example of a wearable system which can comprise an avatar processing and rendering system 690 in a mixed reality environment. The wearable system 600 may be part of the wearable system 200 shown in FIG. 2. In this example, the wearable system 600 can comprise a map 620, which may include at least a portion of the data in the map database 710 (shown in FIG. 7). The map may partly reside locally on the wearable system, and may partly reside at networked storage locations accessible by wired or wireless network (e.g., in a cloud system). A pose process 610 may be executed on the wearable computing architecture (e.g., processing module 260 or controller 460) and utilize data from the map 620 to determine position and orientation of the wearable computing hardware or user. Pose data may be computed from data collected on the fly as the user is experiencing the system and operating in the world. The data may comprise images, data from sensors (such as inertial measurement units, which generally comprise accelerometer and gyroscope components) and surface information pertinent to objects in the real or virtual environment.

A sparse point representation may be the output of a simultaneous localization and mapping (e.g., SLAM or vSLAM, referring to a configuration wherein the input is images/visual only) process. The system can be configured to not only find out where in the world the various components are, but what the world is made of. Pose may be a building block that achieves many goals, including populating the map and using the data from the map.

In one embodiment, a sparse point position may not be completely adequate on its own, and further information may be needed to produce a multifocal AR, VR, or MR experience. Dense representations, generally referring to depth map information, may be utilized to fill this gap at least in part. Such information may be computed from a process referred to as Stereo 640, wherein depth information is determined using a technique such as triangulation or time-of-flight sensing. Image information and active patterns (such as infrared patterns created using active projectors), images acquired from image cameras, or hand gestures/totem 650 may serve as input to the Stereo process 640. A significant amount of depth map information may be fused together, and some of this may be summarized with a surface representation. For example, mathematically definable surfaces may be efficient (e.g., relative to a large point cloud) and digestible inputs to other processing devices like game engines. Thus, the output of the stereo process (e.g., a depth map) 640 may be combined in the fusion process 630.

Pose 610 may be an input to this fusion process 630 as well, and the output of fusion 630 becomes an input to populating the map process 620. Sub-surfaces may connect with each other, such as in topographical mapping, to form larger surfaces, and the map becomes a large hybrid of points and surfaces.

To resolve various aspects in a mixed reality process 660, various inputs may be utilized. For example, in the embodiment depicted in FIG. 6A, Game parameters may be inputs to determine that the user of the system is playing a monster battling game with one or more monsters at various locations, monsters dying or running away under various conditions (such as if the user shoots the monster), walls or other objects at various locations, and the like. The world map may include information regarding the location of the objects or semantic information of the objects (e.g., classifications such as whether the object is flat or round, horizontal or vertical, a table or a lamp, etc.) and the world map can be another valuable input to mixed reality. Pose relative to the world becomes an input as well and plays a key role to almost any interactive system.

Controls or inputs from the user are another input to the wearable system 600. As described herein, user inputs can include visual input, gestures, totems, audio input, sensory input, etc. In order to move around or play a game, for example, the user may need to instruct the wearable system 600 regarding what he or she wants to do. Beyond just moving oneself in space, there are various forms of user controls that may be utilized. In one embodiment, a totem (e.g. a user input device), or an object such as a toy gun may be held by the user and tracked by the system. The system preferably will be configured to know that the user is holding the item and understand what kind of interaction the user is having with the item (e.g., if the totem or object is a gun, the system may be configured to understand location and orientation, as well as whether the user is clicking a trigger or other sensed button or element which may be equipped with a sensor, such as an IMU, which may assist in determining what is going on, even when such activity is not within the field of view of any of the cameras.)

Hand gesture tracking or recognition may also provide input information. The wearable system 600 may be configured to track and interpret hand gestures for button presses, for gesturing left or right, stop, grab, hold, etc. For example, in one configuration, the user may want to flip through emails or a calendar in a non-gaming environment, or do a "fist bump" with another person or player. The wearable system 600 may be configured to leverage a minimum amount of hand gesture, which may or may not be dynamic. For example, the gestures may be simple static gestures like open hand for stop, thumbs up for ok, thumbs down for not ok; or a hand flip right, or left, or up/down for directional commands.

Eye tracking is another input (e.g., tracking where the user is looking to control the display technology to render at a specific depth or range). In one embodiment, vergence of the eyes may be determined using triangulation, and then using a vergence/accommodation model developed for that particular person, accommodation may be determined. Eye tracking can be performed by the eye camera(s) to determine eye gaze (e.g., direction or orientation of one or both eyes). Other techniques can be used for eye tracking such as, e.g., measurement of electrical potentials by electrodes placed near the eye(s) (e.g., electrooculography).

Speech tracking can be another input and can be used alone or in combination with other inputs (e.g., totem tracking, eye tracking, gesture tracking, etc.). Speech tracking may include speech recognition, voice recognition, alone or in combination. The system 600 can include an audio sensor (e.g., a microphone) that receives an audio stream from the environment. The system 600 can incorporate voice recognition technology to determine who is speaking (e.g., whether the speech is from the wearer of the ARD or another person or voice (e.g., a recorded voice transmitted by a loudspeaker in the environment)) as well as speech recognition technology to determine what is being said. The local data & processing module 260 or the remote processing module 270 can process the audio data from the microphone (or audio data in another stream such as, e.g., a video stream being watched by the user) to identify content of the speech by applying various speech recognition algorithms, such as, e.g., hidden Markov models, dynamic time warping (DTW)—based speech recognitions, neural networks, deep learning algorithms such as deep feedforward and recurrent neural networks, end-to-end automatic speech recognitions, machine learning algorithms (described with reference to FIG. 7), or other algorithms that uses acoustic modeling or language modeling, etc.

The local data & processing module 260 or the remote processing module 270 can also apply voice recognition algorithms which can identify the identity of the speaker, such as whether the speaker is the user 210 of the wearable system 600 or another person with whom the user is conversing. Some example voice recognition algorithms can include frequency estimation, hidden Markov models, Gaussian mixture models, pattern matching algorithms, neural networks, matrix representation, Vector Quantization, speaker diarisation, decision trees, and dynamic time warping (DTW) technique. Voice recognition techniques can also include anti-speaker techniques, such as cohort models, and world models. Spectral features may be used in representing speaker characteristics. The local data & processing module or the remote data processing module 270 can use various machine learning algorithms described with reference to FIG. 7 to perform the voice recognition.

An implementation of a wearable system can use these user controls or inputs via a UI. UI elements (e.g., controls, popup windows, bubbles, data entry fields, etc.) can be used, for example, to dismiss a display of information, e.g., graphics or semantic information of an object.

With regard to the camera systems, the example wearable system 600 shown in FIG. 6A can include three pairs of cameras: a relative wide FOV or passive SLAM pair of cameras arranged to the sides of the user's face, a different pair of cameras oriented in front of the user to handle the stereo imaging process 640 and also to capture hand gestures and totem/object tracking in front of the user's face. The FOV cameras and the pair of cameras for the stereo process 640 may be a part of the outward-facing imaging system 464 (shown in FIG. 4). The wearable system 600 can include eye tracking cameras (which may be a part of an inward-facing imaging system 462 shown in FIG. 4) oriented toward the eyes of the user in order to triangulate eye vectors and other information. The wearable system 600 may also comprise one or more textured light projectors (such as infrared (IR) projectors) to inject texture into a scene.

The wearable system 600 can comprise an avatar processing and rendering system 690. The avatar processing and rendering system 690 can be configured to generate, update, animate, and render an avatar based on contextual information. Some or all of the avatar processing and rendering system 690 can be implemented as part of the local processing and data module 260 or the remote processing module 262, 264 alone or in combination. In various embodiments, multiple avatar processing and rendering systems 690 (e.g., as implemented on different wearable devices) can be used for rendering the virtual avatar 670. For example, a first user's wearable device may be used to determine the first user's intent, while a second user's wearable device can determine an avatar's characteristics and render the avatar of the first user based on the intent received from the first user's wearable device. The first user's wearable device and the second user's wearable device (or other such wearable devices) can communicate via a network, for example, as will be described with reference to FIGS. 9A-9B.

Figure 6B:
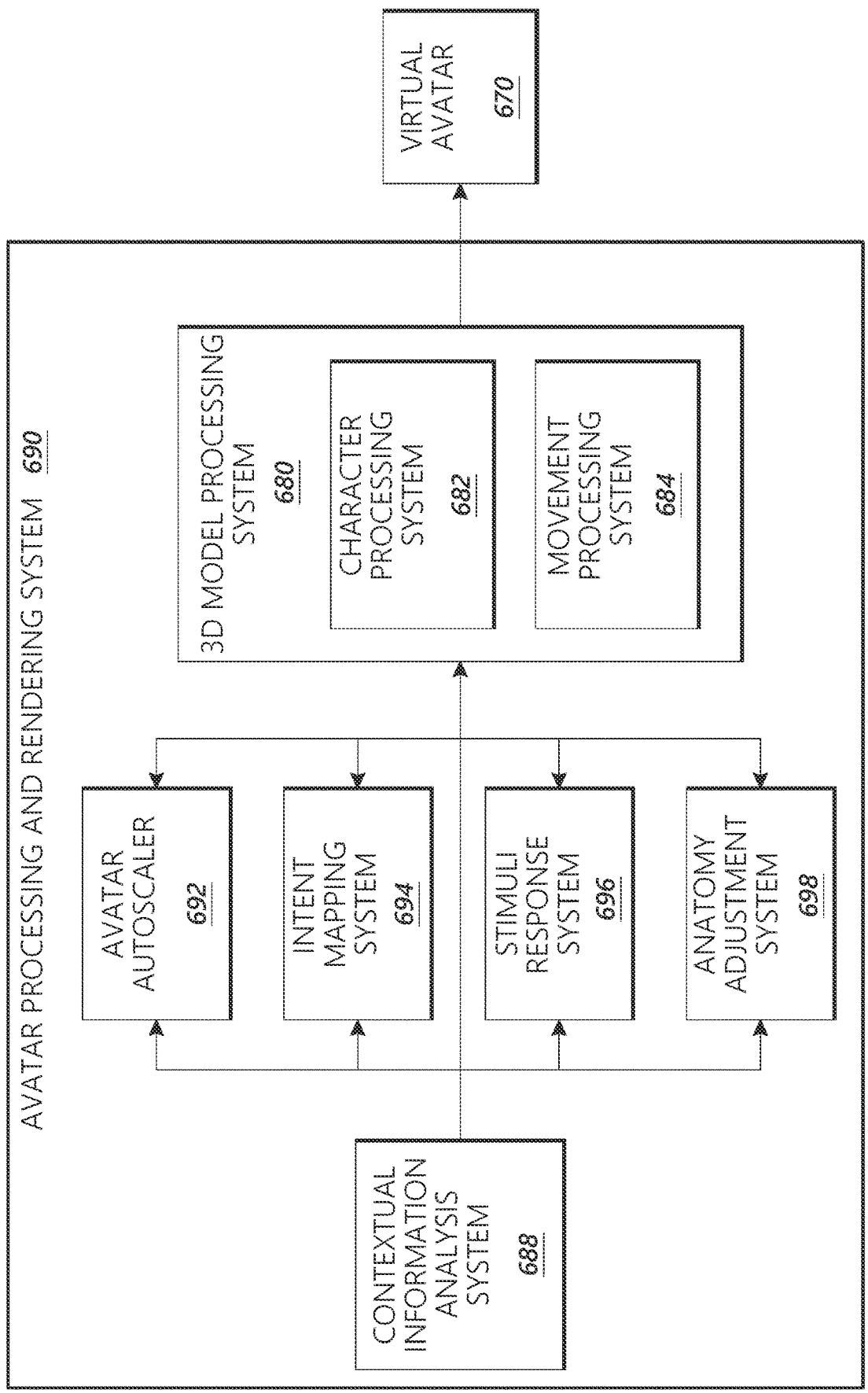
FIG. 6B illustrates example components of an avatar processing and rendering system.

FIG. 6B illustrates an example avatar processing and rendering system 690. The example avatar processing and rendering system 690 can comprise a 3D model processing system 680, a contextual information analysis system 688, an avatar autoscaler 692, an intent mapping system 694, an anatomy adjustment system 698, a stimuli response system 696, alone or in combination. The system 690 is intended to illustrate functionalities for avatar processing and rendering and is not intended to be limiting. For example, in certain implementations, one or more of these systems may be part of another system. For example, portions of the contextual information analysis system 688 may be part of the avatar autoscaler 692, intent mapping system 694, stimuli response system 696, or anatomy adjustment system 698, individually or in combination.

The contextual information analysis system 688 can be configured to determine environment and object information based on one or more device sensors described with reference to FIGS. 2 and 3. For example, the contextual information analysis system 688 can analyze environments and objects (including physical or virtual objects) of a user's environment or an environment in which the user's avatar is rendered, using images acquired by the outward-facing imaging system 464 of the user or the viewer of the user's avatar. The contextual information analysis system 688 can analyze such images alone or in combination with a data acquired from location data or world maps (e.g., maps 620, 710, 910) to determine the location and layout of objects in the environments. The contextual information analysis system 688 can also access biological features of the user or human in general for animating the virtual avatar 670 realistically. For example, the contextual information analysis system 688 can generate a discomfort curve which can be applied to the avatar such that a portion of the user's avatar's body (e.g., the head) is not at an uncomfortable (or unrealistic) position with respect to the other portions of the user's body (e.g., the avatar's head is not turned 270 degrees). In certain implementations, one or more object recognizers 708 (shown in FIG. 7) may be implemented as part of the contextual information analysis system 688.

The avatar autoscaler 692, the intent mapping system 694, and the stimuli response system 696, and anatomy adjustment system 698 can be configured to determine the avatar's characteristics based on contextual information. Some example characteristics of the avatar can include the size, appearance, position, orientation, movement, pose, expression, etc. The avatar autoscaler 692 can be configured to automatically scale the avatar such that the user does not have to look at the avatar at an uncomfortable pose. For example, the avatar autoscaler 692 can increase or decrease the size of the avatar to bring the avatar to the user's eye level such that the user does not need to look down at the avatar or look up at the avatar respectively. The intent mapping system 694 can determine an intent of a user's interaction and map the intent to an avatar (rather than the exact user interaction) based on the environment that the avatar is rendered in. For example, an intent of a first user may be to communicate with a second user in a telepresence session (see, e.g., FIG. 9B). Typically, two people face each other when communicating. The intent mapping system 694 of the first user's wearable system can determine that such a face-to-face intent exists during the telepresence session and can cause the first user's wearable system to render the second user's avatar to be facing the first user. If the second user were to physically turn around, instead of rendering the second user's avatar in a turned position (which would cause the back of the second user's avatar to be rendered to the first user), the first user's intent mapping system 694 can continue to render the second avatar's face to the first user, which is the inferred intent of the telepresence session (e.g., face-to-face intent in this example).

The stimuli response system 696 can identify an object of interest in the environment and determine an avatar's response to the object of interest. For example, the stimuli response system 696 can identify a sound source in an avatar's environment and automatically turn the avatar to look at the sound source. The stimuli response system 696 can also determine a threshold termination condition. For example, the stimuli response system 696 can cause the avatar to go back to its original pose after the sound source disappears or after a period of time has elapsed.

The anatomy adjustment system 698 can be configured to adjust the user's pose based on biological features. For example, the anatomy adjustment system 698 can be configured to adjust relative positions between the user's head and the user's torso or between the user's upper body and lower body based on a discomfort curve.

The 3D model processing system 680 can be configured to animate and cause the display 220 to render a virtual avatar 670. The 3D model processing system 680 can include a virtual character processing system 682 and a movement processing system 684. The virtual character processing system 682 can be configured to generate and update a 3D model of a user (for creating and animating the virtual avatar). The movement processing system 684 can be configured to animate the avatar, such as, e.g., by changing the avatar's pose, by moving the avatar around in a user's environment, or by animating the avatar's facial expressions, etc. As will further be described herein, the virtual avatar can be animated using rigging techniques. In some embodiments, an avatar is represented in two parts: a surface representation (e.g., a deformable mesh) that is used to render the outward appearance of the virtual avatar and a hierarchical set of interconnected joints (e.g., a core skeleton) for animating the mesh. In some implementations, the virtual character processing system 682 can be configured to edit or generate surface representations, while the movement processing system 684 can be used to animate the avatar by moving the avatar, deforming the mesh, etc.

The avatar processing and rendering system 690 can receive digital character rig parameters generated by the neural networks described herein (e.g., a RBFNN or FFNN) and can use these parameters to, at least in part, animate the avatar. For example, the avatar processing and rendering system 690 can perform the process 1100 described with reference FIG. 11, the process 1800 described with reference to FIG. 18, or the process 2100 described with reference to FIG. 21.

Examples of Mapping a User's Environment

Figure 7:
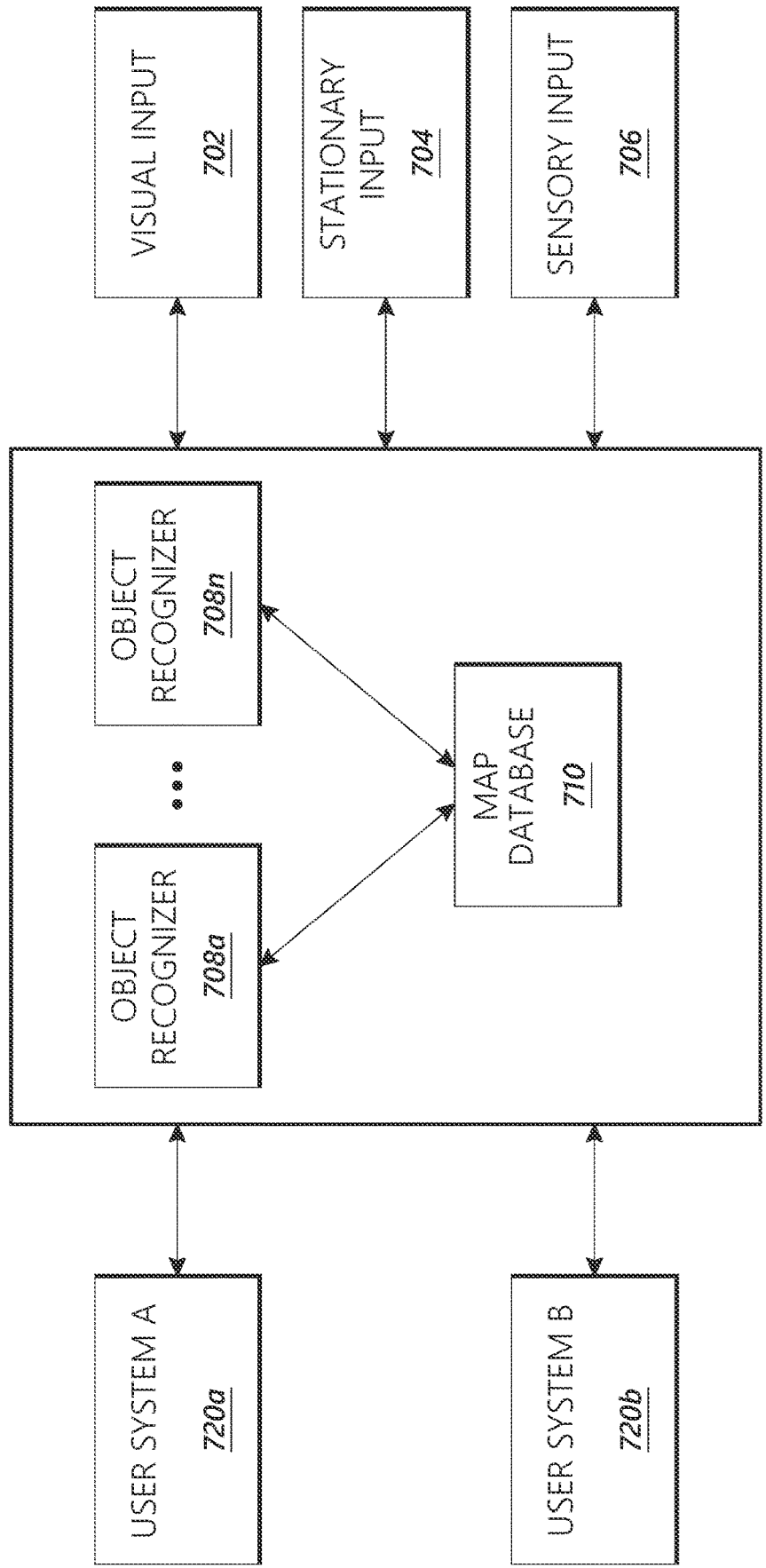
FIG. 7 is a block diagram of an example of a wearable system including various inputs into the wearable system.

FIG. 7 is a block diagram of an example of an MR environment 700. The MR environment 700 may be configured to receive input (e.g., visual input 702 from the user's wearable system, stationary input 704 such as room cameras, sensory input 706 from various sensors, gestures, totems, eye tracking, user input from the user input device 466 etc.) from one or more user wearable systems (e.g., wearable system 200 or display system 220) or stationary room systems (e.g., room cameras, etc.). The wearable systems can use various sensors (e.g., accelerometers, gyroscopes, temperature sensors, movement sensors, depth sensors, GPS sensors, inward-facing imaging system, outward-facing imaging system, etc.) to determine the location and various other attributes of the environment of the user. This information may further be supplemented with information from stationary cameras in the room that may provide images or various cues from a different point of view. The image data acquired by the cameras (such as the room cameras and/or the cameras of the outward-facing imaging system) may be reduced to a set of mapping points.

One or more object recognizers 708 can crawl through the received data (e.g., the collection of points) and recognize or map points, tag images, attach semantic information to objects with the help of a map database 710. The map database 710 may comprise various points collected over time and their corresponding objects. The various devices and the map database can be connected to each other through a network (e.g., LAN, WAN, etc.) to access the cloud.

Based on this information and collection of points in the map database, the object recognizers 708a to 708n may recognize objects in an environment. For example, the object recognizers can recognize faces, persons, windows, walls, user input devices, televisions, documents (e.g., travel tickets, driver's license, passport as described in the security examples herein), other objects in the user's environment, etc. One or more object recognizers may be specialized for object with certain characteristics. For example, the object recognizer 708a may be used to recognizer faces, while another object recognizer may be used recognize documents.

The object recognitions may be performed using a variety of computer vision techniques. For example, the wearable system can analyze the images acquired by the outward-facing imaging system 464 (shown in FIG. 4) to perform scene reconstruction, event detection, video tracking, object recognition (e.g., persons or documents), object pose estimation, facial recognition (e.g., from a person in the environment or an image on a document), learning, indexing, motion estimation, or image analysis (e.g., identifying indicia within documents such as photos, signatures, identification information, travel information, etc.), and so forth. One or more computer vision algorithms may be used to perform these tasks. Non-limiting examples of computer vision algorithms include: Scale-invariant feature transform (SIFT), speeded up robust features (SURF), oriented FAST and rotated BRIEF (ORB), binary robust invariant scalable keypoints (BRISK), fast retina keypoint (FREAK), Viola-Jones algorithm, Eigenfaces approach, Lucas-Kanade algorithm, Horn-Schunk algorithm, Mean-shift algorithm, visual simultaneous location and mapping (vSLAM) techniques, a sequential Bayesian estimator (e.g., Kalman filter, extended Kalman filter, etc.), bundle adjustment, Adaptive thresholding (and other thresholding techniques), Iterative Closest Point (ICP), Semi Global Matching (SGM), Semi Global Block Matching (SGBM), Feature Point Histograms, various machine learning algorithms (such as e.g., support vector machine, k-nearest neighbors algorithm, Naive Bayes, neural network (including convolutional or deep neural networks), or other supervised/unsupervised models, etc.), and so forth.

The object recognitions can additionally or alternatively be performed by a variety of machine learning algorithms. Once trained, the machine learning algorithm can be stored by the HMD. Some examples of machine learning algorithms can include supervised or non-supervised machine learning algorithms, including regression algorithms (such as, for example, Ordinary Least Squares Regression), instance-based algorithms (such as, for example, Learning Vector Quantization), decision tree algorithms (such as, for example, classification and regression trees), Bayesian algorithms (such as, for example, Naive Bayes), clustering algorithms (such as, for example, k-means clustering), association rule learning algorithms (such as, for example, a-priori algorithms), artificial neural network algorithms (such as, for example, Perceptron), deep learning algorithms (such as, for example, Deep Boltzmann Machine, or deep neural network), dimensionality reduction algorithms (such as, for example, Principal Component Analysis), ensemble algorithms (such as, for example, Stacked Generalization), and/or other machine learning algorithms. In some embodiments, individual models can be customized for individual data sets. For example, the wearable device can generate or store a base model. The base model may be used as a starting point to generate additional models specific to a data type (e.g., a particular user in the telepresence session), a data set (e.g., a set of additional images obtained of the user in the telepresence session), conditional situations, or other variations. In some embodiments, the wearable HMD can be configured to utilize a plurality of techniques to generate models for analysis of the aggregated data. Other techniques may include using pre-defined thresholds or data values.

Based on this information and collection of points in the map database, the object recognizers 708a to 708n may recognize objects and supplement objects with semantic information to give life to the objects. For example, if the object recognizer recognizes a set of points to be a door, the system may attach some semantic information (e.g., the door has a hinge and has a 90 degree movement about the hinge). If the object recognizer recognizes a set of points to be a mirror, the system may attach semantic information that the mirror has a reflective surface that can reflect images of objects in the room. The semantic information can include affordances of the objects as described herein. For example, the semantic information may include a normal of the object. The system can assign a vector whose direction indicates the normal of the object. Over time the map database grows as the system (which may reside locally or may be accessible through a wireless network) accumulates more data from the world. Once the objects are recognized, the information may be transmitted to one or more wearable systems. For example, the MR environment 700 may include information about a scene happening in California. The environment 700 may be transmitted to one or more users in New York. Based on data received from an FOV camera and other inputs, the object recognizers and other software components can map the points collected from the various images, recognize objects etc., such that the scene may be accurately "passed over" to a second user, who may be in a different part of the world. The environment 700 may also use a topological map for localization purposes.

Figure 8:
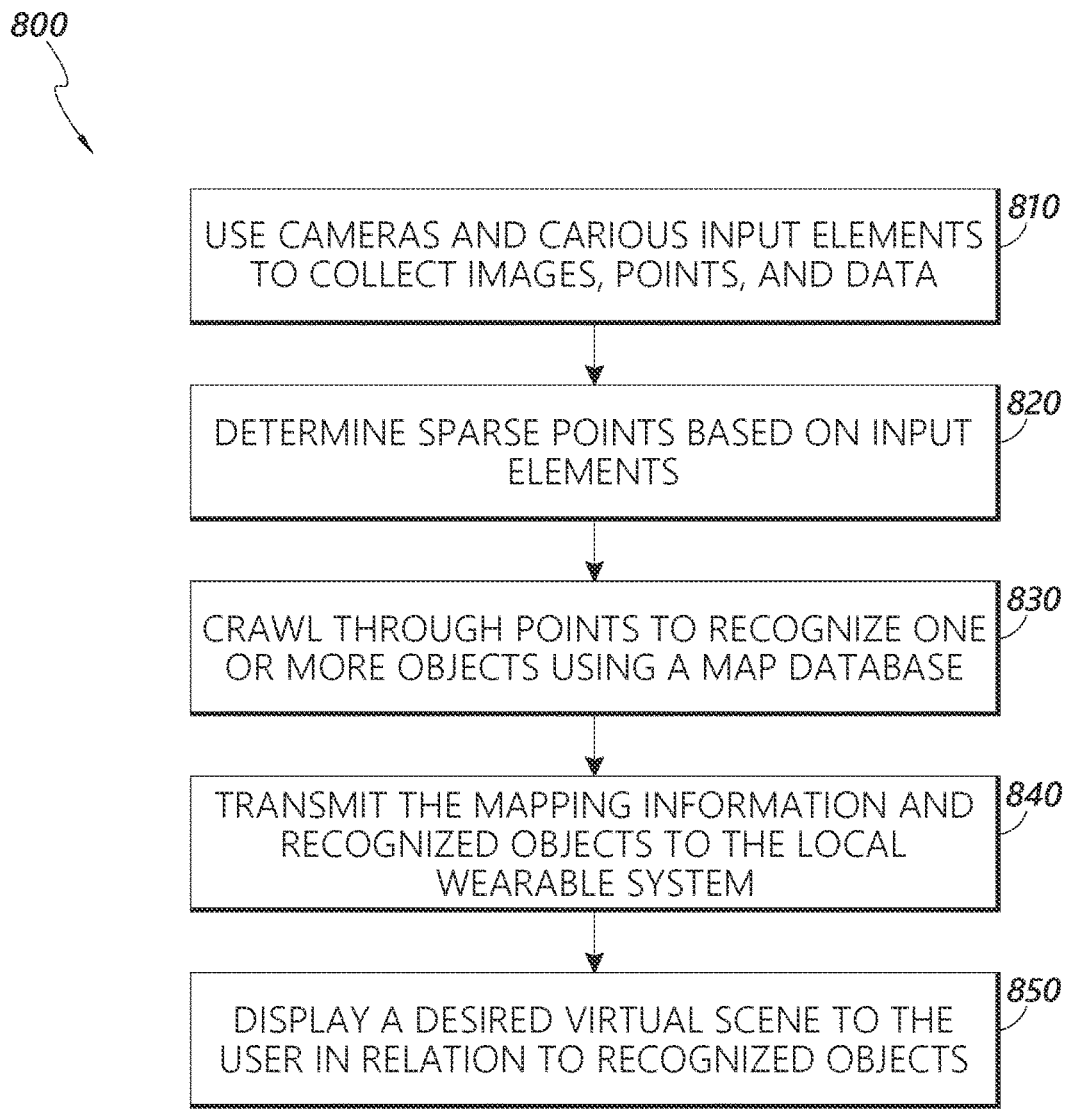
FIG. 8 is a process flow diagram of an example of a method of rendering virtual content in relation to recognized objects.

FIG. 8 is a process flow diagram of an example of a method 800 of rendering virtual content in relation to recognized objects. The method 800 describes how a virtual scene may be presented to a user of the wearable system. The user may be geographically remote from the scene. For example, the user may be in New York, but may want to view a scene that is presently going on in California, or may want to go on a walk with a friend who resides in California.

At block 810, the wearable system may receive input from the user and other users regarding the environment of the user. This may be achieved through various input devices, and knowledge already possessed in the map database. The user's FOV camera, sensors, GPS, eye tracking, etc., convey information to the system at block 810. The system may determine sparse points based on this information at block 820. The sparse points may be used in determining pose data (e.g., head pose, eye pose, body pose, or hand gestures) that can be used in displaying and understanding the orientation and position of various objects in the user's surroundings. The object recognizers 708a-708n may crawl through these collected points and recognize one or more objects using a map database at block 830. This information may then be conveyed to the user's individual wearable system at block 840, and the desired virtual scene may be accordingly displayed to the user at block 850. For example, the desired virtual scene (e.g., user in CA) may be displayed at the appropriate orientation, position, etc., in relation to the various objects and other surroundings of the user in New York.

Example Communications among Multiple Wearable Systems

Figure 9A:
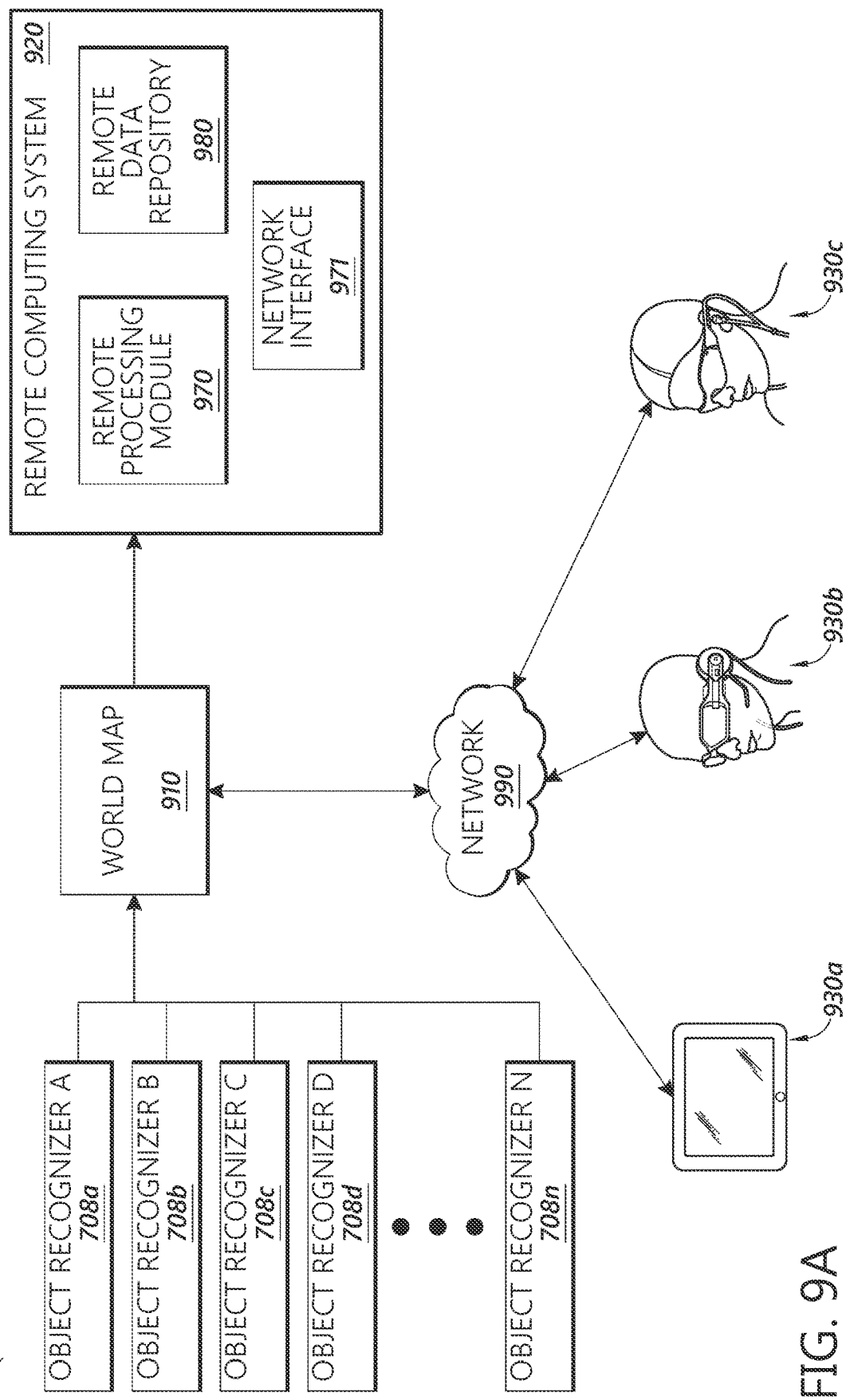
FIG. 9A schematically illustrates an overall system view depicting multiple wearable systems interacting with each other.

FIG. 9A schematically illustrates an overall system view depicting multiple user devices interacting with each other. The computing environment 900 includes user devices 930a, 930b, 930c. The user devices 930a, 930b, and 930c can communicate with each other through a network 990. The user devices 930a-930c can each include a network interface to communicate via the network 990 with a remote computing system 920 (which may also include a network interface 971). The network 990 may be a LAN, WAN, peer-to-peer network, radio, Bluetooth, or any other network. The computing environment 900 can also include one or more remote computing systems 920. The remote computing system 920 may include server computer systems that are clustered and located at different geographic locations. The user devices 930a, 930b, and 930c may communicate with the remote computing system 920 via the network 990.

The remote computing system 920 may include a remote data repository 980 which can maintain information about a specific user's physical and/or virtual worlds. Data storage 980 can store information related to users, users' environment (e.g., world maps of the user's environment), or configurations of avatars of the users. The remote data repository may be an embodiment of the remote data repository 280 shown in FIG. 2. The remote computing system 920 may also include a remote processing module 970. The remote processing module 970 may be an embodiment of the remote processing module 270 shown in FIG. 2. The remote processing module 970 may include one or more processors which can communicate with the user devices (930a, 930b, 930c) and the remote data repository 980. The processors can process information obtained from user devices and other sources. In some implementations, at least a portion of the processing or storage can be provided by the local processing and data module 260 (as shown in FIG. 2). The remote computing system 920 may enable a given user to share information about the specific user's own physical and/or virtual worlds with another user.

The user device may be a wearable device (such as an HMD or an ARD), a computer, a mobile device, or any other devices alone or in combination. For example, the user devices 930b and 930c may be an embodiment of the wearable system 200 shown in FIG. 2 (or the wearable system 400 shown in FIG. 4) which can be configured to present AR/VR/MR content.

One or more of the user devices can be used with the user input device 466 shown in FIG. 4. A user device can obtain information about the user and the user's environment (e.g., using the outward-facing imaging system 464 shown in FIG. 4). The user device and/or remote computing system 1220 can construct, update, and build a collection of images, points and other information using the information obtained from the user devices. For example, the user device may process raw information acquired and send the processed information to the remote computing system 1220 for further processing. The user device may also send the raw information to the remote computing system 1220 for processing. The user device may receive the processed information from the remote computing system 1220 and provide final processing before projecting to the user. The user device may also process the information obtained and pass the processed information to other user devices. The user device may communicate with the remote data repository 1280 while processing acquired information. Multiple user devices and/or multiple server computer systems may participate in the construction and/or processing of acquired images.

The information on the physical worlds may be developed over time and may be based on the information collected by different user devices. Models of virtual worlds may also be developed over time and be based on the inputs of different users. Such information and models can sometimes be referred to herein as a world map or a world model. As described with reference to FIGS. 6 and 7, information acquired by the user devices may be used to construct a world map 910. The world map 910 may include at least a portion of the map 620 described in FIG. 6A. Various object recognizers (e.g. 708a, 708b, 708c ... 708n) may be used to recognize objects and tag images, as well as to attach semantic information to the objects. These object recognizers are also described in FIG. 7.

The remote data repository 980 can be used to store data and to facilitate the construction of the world map 910. The user device can constantly update information about the user's environment and receive information about the world map 910. The world map 910 may be created by the user or by someone else. As discussed herein, user devices (e.g. 930a, 930b, 930c) and remote computing system 920, alone or in combination, may construct and/or update the world map 910. For example, a user device may be in communication with the remote processing module 970 and the remote data repository 980. The user device may acquire and/or process information about the user and the user's environment. The remote processing module 970 may be in communication with the remote data repository 980 and user devices (e.g. 930a, 930b, 930c) to process information about the user and the user's environment. The remote computing system 920 can modify the information acquired by the user devices (e.g. 930a, 930b, 930c), such as, e.g. selectively cropping a user's image, modifying the user's background, adding virtual objects to the user's environment, annotating a user's speech with auxiliary information, etc. The remote computing system 920 can send the processed information to the same and/or different user devices.

Examples of a Telepresence Session

FIG. 9B depicts an example where two users of respective wearable systems are conducting a telepresence session. Two users (named Alice 912 and Bob 914 in this example) are shown in this figure. The two users are wearing their respective wearable devices 902 and 904 which can include an HMD described with reference to FIG. 2 (e.g., the display device 220 of the system 200) for representing a virtual avatar of the other user in the telepresence session. The two users can conduct a telepresence session using the wearable device. Note that the vertical line in FIG. 9B separating the two users is intended to illustrate that Alice 912 and Bob 914 may (but need not) be in two different locations while they communicate via telepresence (e.g., Alice may be inside her office in Atlanta while Bob is outdoors in Boston).

As described with reference to FIG. 9A, the wearable devices 902 and 904 may be in communication with each other or with other user devices and computer systems. For example, Alice's wearable device 902 may be in communication with Bob's wearable device 904, e.g., via the network 990 (shown in FIG. 9A). The wearable devices 902 and 904 can track the users' environments and movements in the environments (e.g., via the respective outward-facing imaging system 464, or one or more location sensors) and speech (e.g., via the respective audio sensor 232). The wearable devices 902 and 904 can also track the users' eye movements or gaze based on data acquired by the inward-facing imaging system 462. In some situations, the wearable device can also capture or track a user's facial expressions or other body movements (e.g., arm or leg movements) where a user is near a reflective surface and the outward-facing imaging system 464 can obtain reflected images of the user to observe the user's facial expressions or other body movements.

A wearable device can use information acquired of a first user and the environment to animate a virtual avatar that will be rendered by a second user's wearable device to create a tangible sense of presence of the first user in the second user's environment. For example, the wearable devices 902 and 904, the remote computing system 920, alone or in combination, may process Alice's images or movements for presentation by Bob's wearable device 904 or may process Bob's images or movements for presentation by Alice's wearable device 902. As further described herein, the avatars can be rendered based on contextual information such as, e.g., a user's intent, an environment of the user or an environment in which the avatar is rendered, or other biological features of a human.

Although the examples only refer to two users, the techniques described herein should not be limited to two users. Multiple users (e.g., two, three, four, five, six, or more) using wearables (or other telepresence devices) may participate in a telepresence session. A particular user's wearable device can present to that particular user the avatars of the other users during the telepresence session. Further, while the examples in this figure show users as standing in an environment, the users are not required to stand. Any of the users may stand, sit, kneel, lie down, walk or run, or be in any position or movement during a telepresence session. The user may also be in a physical environment other than described in examples herein. The users may be in separate environments or may be in the same environment while conducting the telepresence session. Not all users are required to wear their respective HMDs in the telepresence session. For example, Alice 912 may use other image acquisition and display devices such as a webcam and computer screen while Bob 914 wears the wearable device 904.

Examples of a Virtual Avatar

Figure 10:
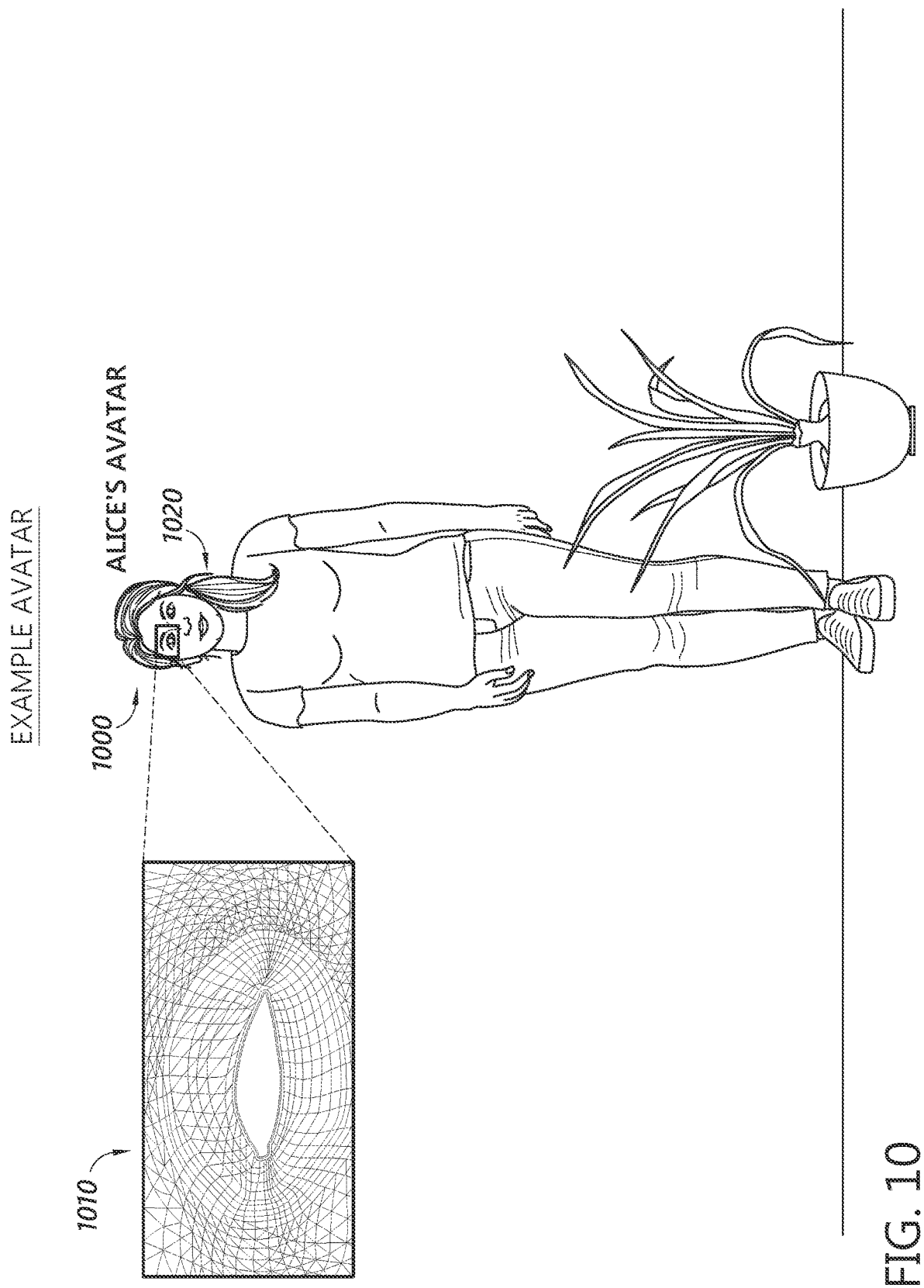
FIG. 10 illustrates an example of an avatar as perceived by a user of a wearable system.

FIG. 10 illustrates an example of an avatar as perceived by a user of a wearable system. The example avatar 1000 shown in FIG. 10 can be an avatar of Alice 912 (shown in FIG. 9B) standing behind a physical plant in a room. An avatar can include various characteristics, such as for example, size, appearance (e.g., skin color, complexion, hair style, clothes, facial features, such as wrinkles, moles, blemishes, pimples, dimples, etc.), position, orientation, movement, pose, expression, etc. These characteristics may be based on the user associated with the avatar (e.g., the avatar 1000 of Alice may have some or all characteristics of the actual person Alice 912). As further described herein, the avatar 1000 can be animated based on contextual information, which can include adjustments to one or more of the characteristics of the avatar 1000. Although generally described herein as representing the physical appearance of the person (e.g., Alice), this is for illustration and not limitation. Alice's avatar could represent the appearance of another real or fictional human being besides Alice, a personified object, a creature, or any other real or fictitious representation. Further, the plant in FIG. 10 need not be physical, but could be a virtual representation of a plant that is presented to the user by the wearable system. Also, additional or different virtual content than shown in FIG. 10 could be presented to the user.

Examples of Rigging Systems for Virtual Characters

An animated virtual character, such as a human avatar, can be wholly or partially represented in computer graphics as a polygon mesh. A polygon mesh, or simply "mesh" for short, is a collection of points in a modeled three-dimensional space. The mesh can form a polyhedral object whose surfaces define the body or shape of the virtual character (or a portion thereof). While meshes can include any number of points (within practical limits which may be imposed by available computing power), finer meshes with more points are generally able to portray more realistic virtual characters with finer details that may closely approximate real life people, animals, objects, etc. FIG. 10 shows an example of a mesh 1010 around an eye of the avatar 1000.

Each point in the mesh can be defined by a coordinate in the modeled three-dimensional space. The modeled three-dimensional space can be, for example, a Cartesian space addressed by (x, y, z) coordinates. The points in the mesh are the vertices of the polygons which make up the polyhedral object. Each polygon represents a surface, or face, of the polyhedral object and is defined by an ordered set of vertices, with the sides of each polygon being straight line edges connecting the ordered set of vertices. In some cases, the polygon vertices in a mesh may differ from geometric polygons in that they are not necessarily coplanar in 3D graphics. In addition, the vertices of a polygon in a mesh may be collinear, in which case the polygon has zero area (referred to as a degenerate polygon).

In some embodiments, a mesh is made up of three-vertex polygons (e.g., triangles or "tris" for short) or four-vertex polygons (e.g., quadrilaterals or "quads" for short). However, higher-order polygons can also be used in some meshes. Meshes are typically quad-based in direct content creation (DCC) applications (e.g., applications such as Maya (available from Autodesk, Inc.) or Houdini (available from Side Effects Software Inc.) which are primarily designed for creating and manipulating 3D computer graphics), whereas meshes are typically tri-based in real-time applications.

To animate a virtual character, its mesh can be deformed by moving some or all of its vertices to new positions in space at various instants in time. The deformations can represent both large-scale movements (e.g., movement of limbs) and fine movements (e.g., facial movements). These and other deformations can be based on real-world models (e.g., photogrammetric scans of real humans performing body movements, articulations, facial contortions, expressions, etc.), art-directed development (which may be based on real-world sampling), combinations of the same, or other techniques. In the early days of computer graphics, mesh deformations could be accomplished manually by independently setting new positions for the vertices, but given the size and complexity of modern meshes it is typically desirable to produce deformations using automated systems and processes. The control systems, processes, and techniques for producing these deformations are referred to as rigging, or simply "the rig." The example avatar processing and rendering system 690 of FIG. 6B includes a 3D model processing system 680 which can implement rigging.

The rigging for a virtual character can use skeletal systems to assist with mesh deformations. A skeletal system includes a collection of joints which correspond to articulation of at least part of the mesh. In the context of rigging, joints are sometimes also referred to as "bones" despite the difference between these terms when used in the anatomical sense. Joints in a skeletal system can move, or otherwise change, with respect to one another according to transforms which can be applied to the joints. The transforms can include translations or rotations in space, as well as other operations. The joints can be assigned hierarchical relationships (e.g., parent-child relationships) with respect to one another. These hierarchical relationships can allow one joint to inherit transforms or other characteristics from another joint. For example, a child joint in a skeletal system can inherit a transform assigned to its parent joint so as to cause movement in the child joint corresponding to movement in the parent joint.

A skeletal system for a virtual character can be defined with joints at appropriate positions (e.g. anatomical references), and with appropriate local axes of rotation, degrees of freedom, etc., to allow for a desired set of mesh deformations to be carried out Once a skeletal system has been defined for a virtual character, each joint can be assigned, in a process called "skinning," an amount of influence over the various vertices in the mesh. This can be done by assigning a weight value to each vertex for each joint in the skeletal system. When a transform is applied to any given joint, the vertices under its influence can be moved, or otherwise altered, automatically based on that joint transform by amounts which can be dependent upon their respective weight values.

A rig can include multiple skeletal systems. One type of skeletal system is a core skeleton (also referred to as a low-order skeleton) which can be used to control large-scale movements of the virtual character. In the case of a human avatar, for example, the core skeleton might resemble the anatomical skeleton of a human. Although the core skeleton for rigging purposes may not map exactly to an anatomically-correct skeleton, it may have a sub-set of joints in analogous locations with analogous orientations and movement properties.

As briefly mentioned above, a skeletal system of joints can be hierarchical with, for example, parent-child relationships among joints. When a transform (e.g., a change in position and/or orientation) is applied to a particular joint in the skeletal system, the same transform can be applied to all other lower-level joints within the same hierarchy. In the case of a rig for a human avatar, for example, the core skeleton may include separate joints for the avatar's shoulder, elbow, and wrist. Among these, the shoulder joint may be assigned to the highest level in the hierarchy, while the elbow joint can be assigned as a child of the shoulder joint, and the wrist joint can be assigned as a child of the elbow joint. Accordingly, when a particular translation and/or rotation transform is applied to the shoulder joint, the same transform can also be applied to the elbow joint and the wrist joint such that they are translated and/or rotated in the same way as the shoulder.

Despite the connotations of its name, a skeletal system in a rig need not necessarily represent an anatomical skeleton. In rigging, skeletal systems can represent a wide variety of hierarchies used to control deformations of the mesh. For example, hair can be represented as a series of joints in a hierarchical chain; skin motions due to an avatar's facial contortions (which may represent expressions such as smiling, frowning, laughing, speaking, blinking, etc.) can be represented by a series of facial joints controlled by a facial rig; muscle deformation can be modeled by joints; and motion of clothing can be represented by a grid of joints.

The rig for a virtual character can include multiple skeletal systems, some of which may drive the movement of others. A lower-order skeletal system is one which drives one or more higher-order skeletal systems. Conversely, higher-order skeletal systems are ones which are driven or controlled by a lower-order skeletal system. For example, whereas the movements of the core skeleton of a character might be controlled manually by an animator, the core skeleton can in turn drive or control the movements of a higher-order skeletal system. For example, higher-order helper joints—which may not have anatomical analogs in a physical skeleton—can be provided to improve the mesh deformations which result from movements of the core skeleton. The transforms applied to these and other joints in higher-order skeletal systems may be derived algorithmically from the transforms applied to the lower-order skeleton. Higher-order skeletons can represent, for example, muscles, skin, fat, clothing, hair, or any other skeletal system which does not require direct animation control. In general, in some embodiments, a lower-order skeletal system may represent large scale movement of a digital character, and a higher-order skeletal system may represent small scale movement of a digital character.

As already discussed, transforms can be applied to joints in skeletal systems in order to carry out mesh deformations. In the context of rigging, transforms include functions which accept one or more given points in 3D space and produce an output of one or more new 3D points. For example, a transform can accept one or more 3D points which define a joint and can output one or more new 3D points which specify the transformed joint. Joint transforms can include, for example, a translation component, a rotation component, and a scale component.

A translation is a transform which moves a set of one or more specified points in the modeled 3D space by a specified amount with no change in the orientation or size of the set of points. A rotation is a transform which rotates a set of one or more specified points in the modeled 3D space about a specified axis by a specified amount (e.g., rotate every point in the mesh 45 degrees about the z-axis). An affine transform (or 6 degree of freedom (DOF) transform) is one which includes translation(s) and rotation(s). Application of an affine transform can be thought of as moving a set of one or more points in space without changing its size, though the orientation can change.

Meanwhile, a scale transform is one which modifies one or more specified points in the modeled 3D space by scaling their respective coordinates by a specified value. This changes the size and/or shape of the transformed set of points. A uniform scale transform scales each coordinate by the same amount, whereas a non-uniform scale transform can scale the (x, y, z) coordinates of the specified points independently. A non-uniform scale transform can be used, for example, to provide squashing and stretching effects, such as those which may result from muscular action. Yet another type of transform is a shear transform. A shear transform is one which modifies a set of one or more specified points in the modeled 3D space by translating a coordinate of the points by different amounts based on the distance of that coordinate from an axis.

When a transform is applied to a joint to cause it to move, the vertices under the influence of that joint are also moved. This results in deformations of the mesh. As discussed above, the process of assigning weights to quantify the influence each joint has over each vertex is called skinning (or sometimes "weight painting" or "skin weighting"). The weights are typically values between 0 (meaning no influence) and 1 (meaning complete influence). Some vertices in the mesh may be influenced only by a single joint. In that case those vertices are assigned weight values of 1 for that joint, and their positions are changed based on transforms assigned to that specific joint but no others. Other vertices in the mesh may be influenced by multiple joints. In that case, separate weights between 0 and 1 are assigned to those vertices for each of the influencing joints, with the sum of the weights for each vertex equaling 1. The positions of these vertices are changed based on transforms assigned to all of their influencing joints. For example, if a digital character raises its arm, only two (clavicle and shoulder joints) of its 50 total lower-order bones/joints (foot, leg, finger joints, etc.) may have a non-zero weight. The clavicle may have a larger weight (e.g. 0.7) than the shoulder weight (e.g. 0.3) to ensure the relatively small clavicle movement sufficiently deforms the vertices that are assigned to both the clavicle and shoulder.

Making weight assignments for all of the vertices in a mesh can be extremely labor intensive, especially as the number of joints increases. Balancing the weights to achieve desired mesh deformations in response to transforms applied to the joints can be quite difficult for even highly trained artists. In the case of real-time applications, the task can be complicated further by the fact that many real-time systems also enforce limits on the number of joints (generally 8 or fewer) which can be weighted to a specific vertex. Such limits are typically imposed for the sake of efficiency in the graphics processing unit (GPU).

The term skinning also refers to the process of actually deforming the mesh, using the assigned weights, based on transforms applied to the joints in a skeletal system. For example, a series of core skeleton joint transforms may be specified by an animator to produce a desired character movement (e.g., a running movement or a dance step). When transforms are applied to one or more of the joints, new positions are calculated for the vertices under the influence of the transformed joints. The new position for any given vertex is typically computed as a weighted average of all the joint transforms which influence that particular vertex. There are many algorithms used for computing this weighted average, but the most common, and the one used in most real-time applications due to its simplicity and ease of control, is linear blend skinning (LBS). In linear blend skinning, a new position for each vertex is calculated using each joint transform for which that vertex has a non-zero weight. Then, the new vertex coordinates resulting from each of these joint transforms are averaged in proportion to the respective weights assigned to that vertex for each of the joints. There are well known limitations to LBS in practice, and much of the work in making high-quality rigs is devoted to finding and overcoming these limitations. Many helper joint systems are designed specifically for this purpose.

In addition to skinning, "blendshapes" can also be used in rigging to produce mesh deformations. A blendshape (sometimes also called a "morph target" or just a "shape") is a deformation applied to a set of vertices in the mesh where each vertex in the set is moved a specified amount in a specified direction based upon a weight. Each vertex in the set may have its own custom motion for a specific blendshape, and moving the vertices in the set simultaneously will generate the desired shape. The custom motion for each vertex in a blendshape can be specified by a "delta," which is a vector representing the amount and direction of XYZ motion applied to that vertex. Blendshapes can be used to produce, for example, facial deformations to move the eyes, lips, brows, nose, dimples, etc., just to name a few possibilities. The blendshape may be created by any method that comprises defining a neutral pose as zero and a target pose as one, for a set of vertices, where the blendshape weight moves the set of vertices the weight, or fraction, amount between the neutral and target pose. Skinning and blendshapes both require a weight and they both deform a mesh, but skinning and blendshapes each have their own separate weights. Generally, blendshapes may be built on top of skinning for additional mesh deformation.

Blendshapes are useful for deforming the mesh in an art-directable way. They offer a great deal of control, as the exact shape can be sculpted or captured from a scan of a model. But the benefits of blendshapes come at the cost of having to store the deltas for all the vertices in the blendshape. For animated characters with fine meshes and many blendshapes, the amount of delta data can be significant.

Each blendshape can be applied to a specified degree by using blendshape weights. These weights typically range from 0 (where the blendshape is not applied at all) to 1 (where the blendshape is fully active). For example, a blendshape to move a character's eyes can be applied with a small weight to move the eyes a small amount, or it can be applied with a large weight to create a larger eye movement.

The rig may apply multiple blendshapes in combinations with one another to achieve a desired complex deformation. For example, to produce a smile, the rig may apply blendshapes for lip corner pull, raising the upper lip, and lowering the lower lip, as well as moving the eyes, brows, nose, and dimples. The desired shape from combining two or more blendshapes is known as a combination shape (or simply a "combo").

One problem that can result from applying two blendshapes in combination is that the blendshapes may operate on some of the same vertices. When both blendshapes are active, the result is called a double transform or "going off-model." The solution to this is typically a corrective blendshape. A corrective blendshape is a special blendshape which represents a desired deformation with respect to a currently applied deformation rather than representing a desired deformation with respect to the neutral. Corrective blendshapes (or just "correctives") can be applied based upon the weights of the blendshapes they are correcting. For example, the weight for the corrective blendshape can be made proportionate to the weights of the underlying blendshapes which trigger application of the corrective blendshape.

Corrective blendshapes can also be used to correct skinning anomalies or to improve the quality of a deformation. For example, a joint may represent the motion of a specific muscle, but as a single transform it cannot represent all the non-linear behaviors of the skin, fat, and muscle. Applying a corrective, or a series of correctives, as the muscle activates can result in more pleasing and convincing deformations.

Rigs are built in layers, with lower, simpler layers often driving higher-order layers. This applies to both skeletal systems and blendshape deformations. For example, as already mentioned, the rigging for an animated virtual character may include higher-order skeletal systems which are controlled by lower-order skeletal systems. There are many ways to control a higher-order skeleton or a blendshape based upon a lower-order skeleton, including constraints, logic systems, and pose-based deformation.

A constraint is typically a system where a particular object or joint transform controls one or more components of a transform applied to another joint or object. There are many different types of constraints. For example, aim constraints change the rotation of the target transform to point in specific directions or at specific objects. Parent constraints act as virtual parent-child relationships between pairs of transforms. Position constraints constrain a transform to specific points or a specific object. Orientation constraints constrain a transform to a specific rotation of an object.

Logic systems are systems of mathematical equations which produce some outputs given a set of inputs. These are specified, not learned. For example, a blendshape value might be defined as the product of two other blendshapes (this is an example of a corrective shape known as a combination or combo shape).

Pose-based deformations can also be used to control higher-order skeletal systems or blendshapes. The pose of a skeletal system is defined by the collection of transforms (e.g., rotation(s) and translation(s)) for all the joints in that skeletal system. Poses can also be defined for subsets of the joints in a skeletal system. For example, an arm pose could be defined by the transforms applied to the shoulder, elbow, and wrist joints. A pose space deformer (PSD) is a system used to determine a deformation output for a particular pose based on one or more "distances" between that pose and a defined pose. These distances can be metrics which characterize how different one of the poses is from the other. A PSD can include a pose interpolation node which, for example, accepts a set of joint rotations (defining a pose) as input parameters and in turn outputs normalized per-pose weights to drive a deformer, such as a blendshape. The pose interpolation node can be implemented in a variety of ways, including with radial basis functions (RBFs). RBFs can perform a machine-learned mathematical approximation of a function. RBFs can be trained using a set of inputs and their associated expected outputs. The training data could be, for example, multiple sets of joint transforms (which define particular poses) and the corresponding blendshapes to be applied in response to those poses. Once the function is learned, new inputs (e.g., poses) can be given and their expected outputs can be computed efficiently. RBFs are a subtype of artificial neural networks. RBFs can be used to drive higher-level components of a rig based upon the state of lower-level components. For example, the pose of a core skeleton can drive helper joints and correctives at higher levels.

These control systems can be chained together to perform complex behaviors. As an example, an eye rig could contain two "look around" values for horizontal and vertical rotation. These values can be passed through some logic to determine the exact rotation of an eye joint transform, which might in turn be used as an input to an RBF which controls blendshapes that change the shape of the eyelid to match the position of the eye. The activation values of these shapes might be used to drive other components of a facial expression using additional logic, and so on.

The goal of rigging systems is typically to provide a mechanism to produce pleasing, high-fidelity deformations based on simple, human-understandable control systems. In the case of real-time applications, the goal is typically to provide rigging systems which are simple enough to run in real-time on, for example, a VR/AR/MR system 200, while making as few compromises to the final quality as possible. In some embodiments, the 3D model processing system 680 executes a rigging system to animate an avatar in a mixed reality environment 100 in real-time to be interactive (with users of the VR/AR/MR system) and to provide appropriate, contextual avatar behavior (e.g., intent-based behavior) in the user's environment.

NN Method Overview

Figure 11:
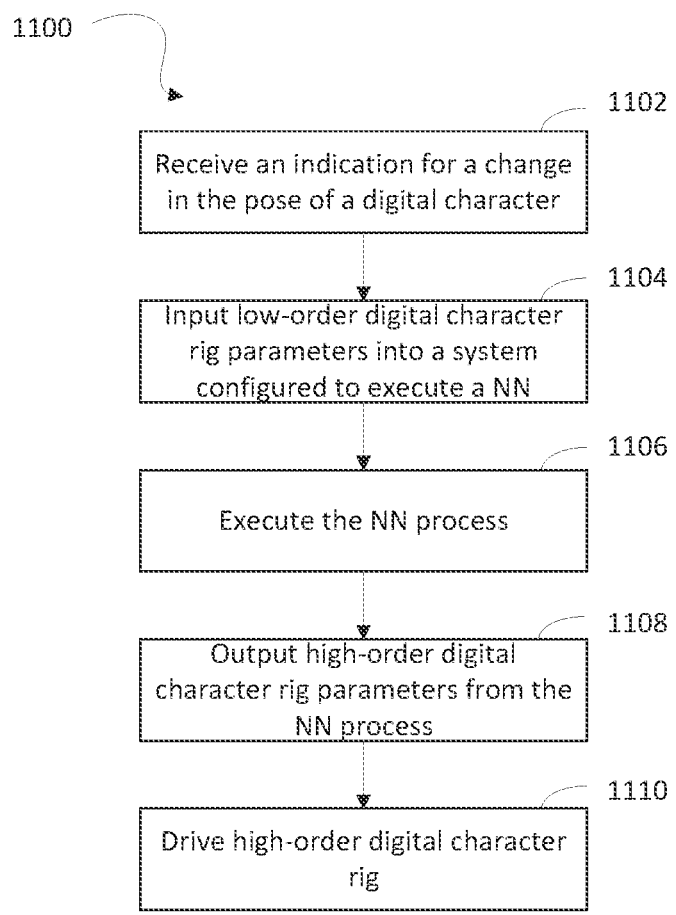
FIG. 11 illustrates an example overview of a process of driving a digital character rig, according to some embodiments.

FIG. 11 illustrates an example overview of a process 1100 of driving a digital character rig using the system and methods described herein. The process 1100 can be performed by a hardware processor associated with the wearable system 200 such as, for example, the local processing and data module 260, the remote processing module 270, the remote computing system 920, or a combination thereof.

As described above, a digital character is represented by a digital character rig. In some embodiments, an avatar is represented by a low-order digital character rig. The avatar could be an avatar of a user wearing a wearable device, such as 902 or 904 described in FIG. 9B. The user could be in an avatar chat with another user of the wearable device, where a first user, Alice for example, sees the virtual, digital avatar of a second user, Bob for example. In one example, Alice and Bob could be having a virtual dance party where the avatars are dancing to the YMCA song. The avatars could begin the dance session in a neutral, or A-pose, similar to that shown in FIG. 9B, and then move to form the letter Y with their arms, thus requesting a new rig pose.

The system receives the indication for a change in the pose of the digital character 1102 (e.g. a new dance pose). The low-order digital character rig parameters associated with the dance pose are fed into the NN 1104. The NN process executes 1106 on a system configured to execute a NN and then outputs high-order digital character rig parameters 1108 representing the new dance pose. The output may then be used to drive a high-order digital character rig 1110, which in this example, could enable Alice and Bob's avatar to form the letter Y. For example, the wearable display system 200 can use the digital character rig parameters to render the avatar by the display 220 to the user 210 of the system 200.

Input and Output

Figure 12A:
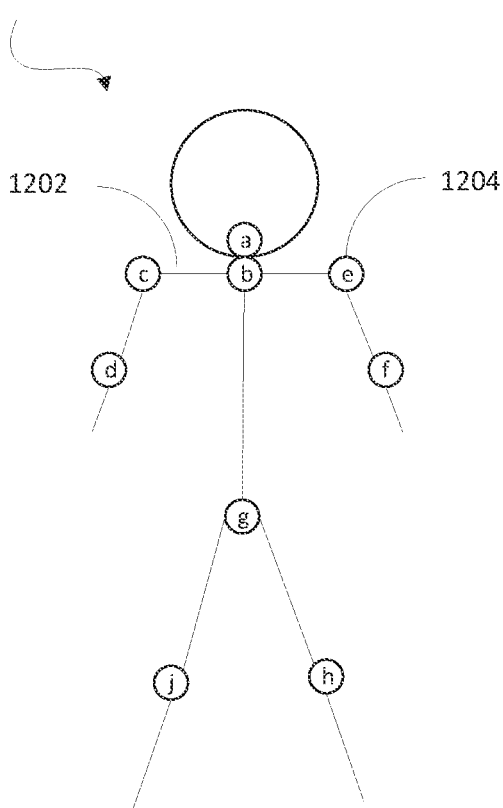
FIG. 12A illustrates an example low-order digital character rig with rig parameters, according to some embodiments.
Figure 12B:
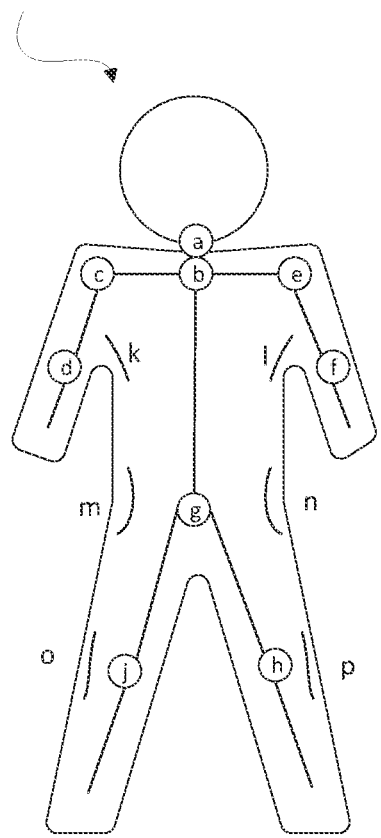
FIG. 12B illustrates an example high-order digital character rig with rig parameters, according to some embodiments.

FIG. 12A illustrates an example low-order digital character rig that would provide parameters for input at 1104 in FIG. 11, and FIG. 12B illustrates an example high-order digital character rig as described at 1110 in FIG. 11. As described above, a low-order skeleton 1200A may represent a simplified version of a skeleton that looks similar to an anatomical skeleton. The bones and joints are roughly located in analogous positions as an anatomical skeleton. For example, the line between c and b 1202 could represent the clavicle and e 1204 could represent a shoulder joint.

The low-order skeleton in FIG. 12A has nine input parameters represented by nine joints/bones, labeled a-j. The nine input parameters are shown for illustration purposes only and should not limit the scope of this invention. In practice, fewer or more input parameters could be used, ranging from 1, 2, 5, 10, 100, to 1000 or more and may depend on the number of body parts that need to move at least semi-independently from other body parts (and hence may be dependent on the particular digital character being manipulated). The input parameters could be joints, bones, blendshapes, and/or any other method of representing a low-order skeleton.

The high-order skeleton 1200B, may represent ligaments, tendons, and/or additional bones that could be added onto the low-order skeleton, as described above. This enables the deformations to appear more realistic and lifelike, with better muscle tone and overall shape. The high-order skeleton in FIG. 12B has six high-order output parameters, k-p. Six high-order output parameters were used for illustration purposes only and should not limit the scope of this invention. In practice, fewer or more input parameters could be used, ranging from 1, 5, 10, 100 to 1000, or more. The output parameters could be joints, bones, high-order correctives, and/or any other method of representing a high-order skeleton.

In alternate embodiments, the inputs and outputs could both represent a high-order skeleton representation or they could both represent a low-order skeleton representation. In some example embodiments, the methods and systems herein function as a way to interpolate between known training or sample poses.

In practice, a given bone can have multiple linear components (translation in x, y, z, bone length, scale, and other things), but for ease of illustration the disclosed embodiments are described with linear components represented by a single value. Additionally, each requested digital character pose 1104 may not have an angular and/or linear component for each parameter, depending on the context. For example, if the requested digital character pose 1104 is substantially the same as the neutral pose, most of the values would be zero, with only the set of joints offset from neutral having a non-zero value.

In some embodiments, the input is low-order digital character rig parameters and the output is high-order digital character rig parameters. Starting with low-order inputs may be beneficial to the broader system within which this invention exists. Typically low-order rig parameters are easier and faster to generate, when compared to high-order rig parameters, because the high-order rig parameters are calculated from the low-order rig parameters. Embodiments described herein function regardless of whether an input or output is high or low order. Starting with a low-order input but having a high-order output may provide the additional benefit of a faster processing speed, thus, in some embodiments, enabling real-time performance.

Figure 13A:
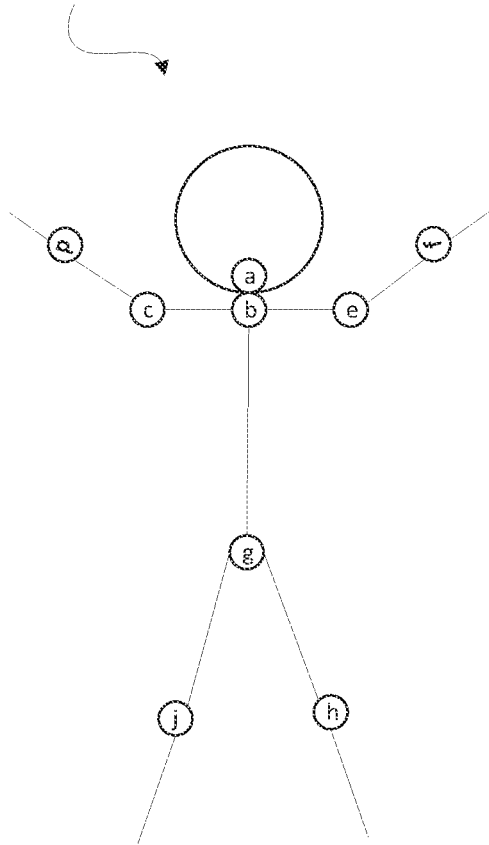
FIG. 13A illustrates an example pose of a low-order digital character, according to some embodiments.
Figure 13B:
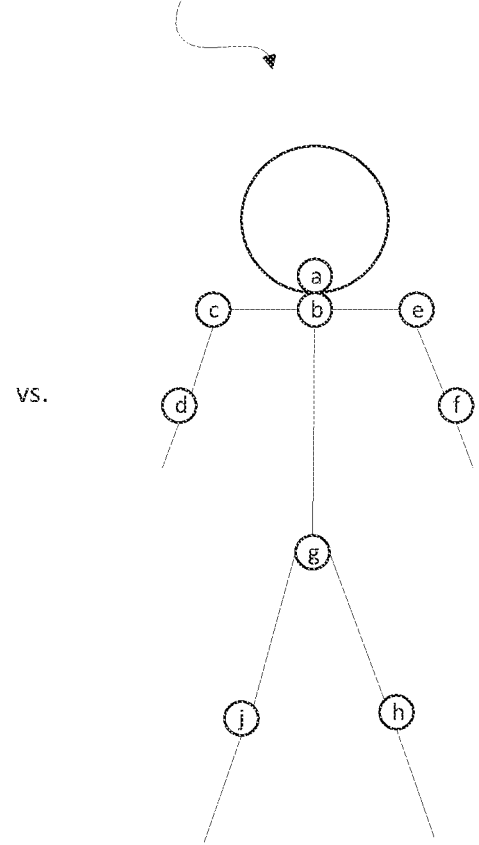
FIG. 13B illustrates an example of a neutral pose for a digital character, according to some embodiments.

FIGS. 13A-13B further illustrate and define poses for a digital character rig. It is still true that the input pose represents the values of a set of joints, blendshapes, and/or bones for a given pose, but in some embodiments, the pose may be described relative to a neutral position. The neutral position can be any pose, but the A-pose (as shown in FIG. 12A-12B) or T-pose are commonly used. In practice, the input pose fed into the NN may be the difference between the pose 1300A and the chosen neutral pose 1300B. The input pose 1300A may be an avatar dancing to the YMCA and thus forming the letter Y, as referenced with respect to FIG. 11. Thus the input pose may represent the relative translation and rotation of the pose relative to a neutral pose.

In some embodiments, the low-order character rig 1300A may be represented by nine input parameters. Those nine input parameters may each have an angular and a linear component, giving a total of 18 parameters describing the input pose. The angular parameters may be represented in SO(3) angular space as a vector comprising four values (x, y, z, w). The linear parameter may use the simplifying assumption that the linear component can be represented by one value. This means, that in some embodiments, there could be 9 linear input parameters+9 angular parameters*4 (x, y, z, w)=45 numbers representing the input pose of a digital character relative to a neutral pose.

In some embodiments, the input pose is not relative to a neutral position, and can instead be relative to a fixed coordinate system, or any other suitable reference system.

RBFNN Contents

A first exemplary embodiment of a neural network configured to interpolate one or more digital character poses, is a RBFNN configured to separate the linear and angular components, as described in further detail below.

Figure 14:
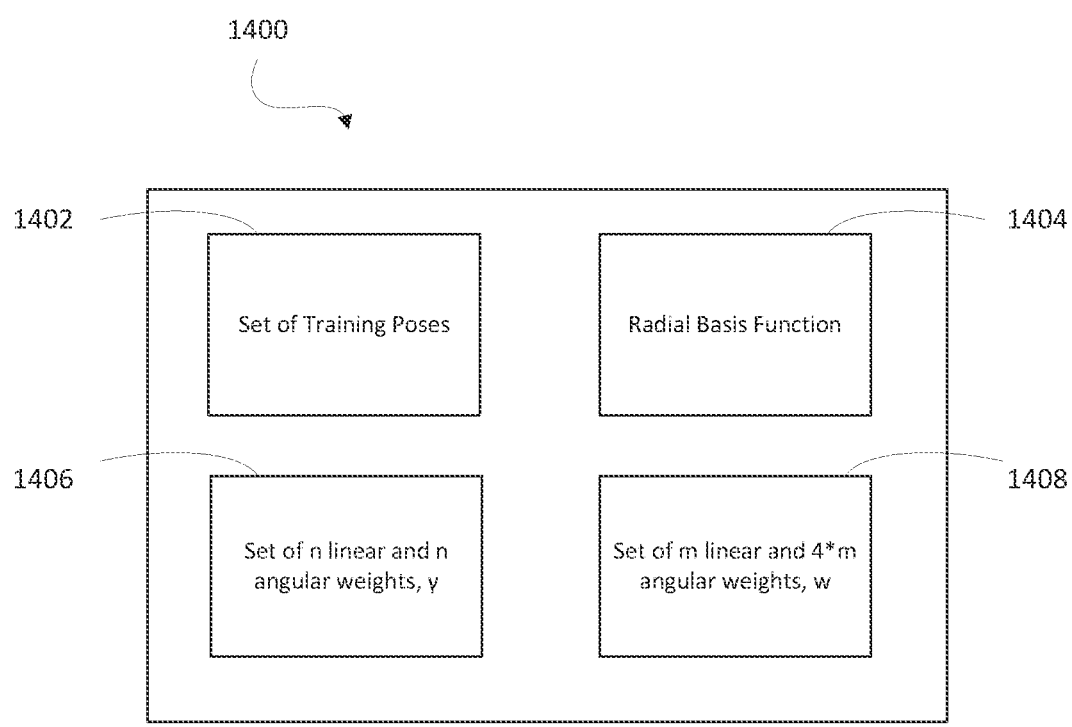
FIG. 14 illustrates various components contained within each sample node within the RBFNN, according to some embodiments.

FIG. 14 illustrates various components contained within each sample node 1400 within the RBFNN 1604 (described with reference to FIG. 16). Four main components, a set of training poses 1402, a radial basis function 1404, a set of distance weights, γ, 1406, and a set of basis weights, w, 1408, will be described, although some embodiments may contain more or fewer components.

In some embodiments, each sample node may contain a set of training poses 1402. These training poses may be used for any type of NN, and is not limited to RBFNNs. These training poses represent a set of poses of a digital character across a pose space. The training poses may be organized as a set of static poses taken from a desired animation sequence, or they may be individual poses. For example, some of the training poses may represent a leg raise. The first pose could be both the left and right legs together and straight down. The second, third, and fourth poses could be the right leg lifting at 20 degrees, then 60 degrees, then 90 degrees. There could be one series of training poses where the leg moves through those angles with a straight leg, and a different series with the leg lifted at the previously mentioned angles with a bend in the knee. The process could be repeated for the left leg as well. Any number of training poses may be selected and used, and does not limit the scope of this invention. As mentioned above, ideally the fewer the number of training poses required, the better, to reduce the amount of time and effort required to gather inputs, and train and run the NN. In contexts where the system needs to run in real-time, it is important to minimize the number of training poses. However, that needs to be balanced with the recognition that if too few training poses are used, the system may not interpolate poses as accurately.

Figure 15A:
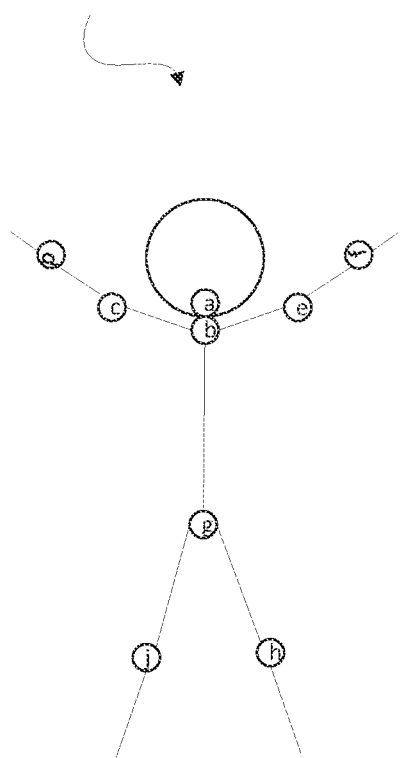
FIGS. 15A-15C illustrate three potential training poses that may represent various poses within a sequence of poses of a person bending their arms, according to some embodiments.
Figure 15B:
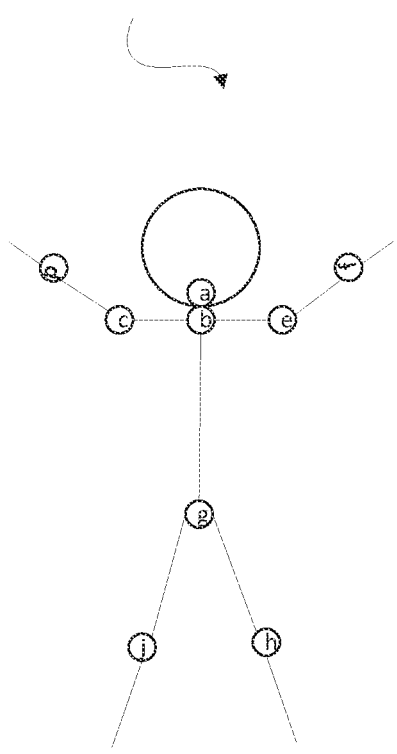
Figure 15C:
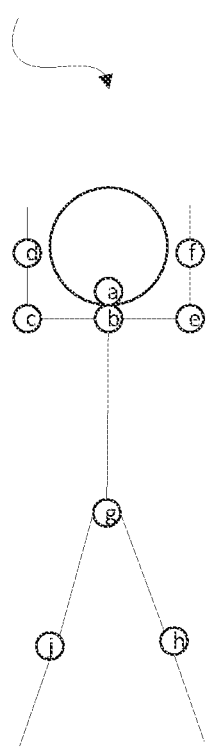

FIGS. 15A-15C illustrates three potential training poses that could be used. FIGS. 15A-15C could represent various poses within a sequence of poses where a person is bending their arms.

In some embodiments, each sample node may contain a radial basis function, 1404. This function is the same for every sample node (one sample node is created per training pose, for each RBF). This is composed of a distance function, and a basis function which is applied to the output of the distance function. This function composition is the standard RBF formulation. However, distance functions in RBFs are typically simple functions such as the Euclidean norm. This is possible since inputs are typically of the same type. However, inputs for digital character rigs have multiple types, and include parameters in both linear and angular space.

In some embodiments, each sample node may contain a set of distance weights, γ, 1406. For n inputs (low-order joints, bones, blendshapes, etc.), there are n linear and n angular distance weights, for a total of 2*n distance weights. These distance weights are used in the RBF distance function, as will be discussed below, and are user assigned, partially user assigned, and/or calculated during training. These distance weights are needed due to the multiple input types and the need to compose inputs of differing types together. One example input type is the ankle joint type and a second input type is the knee joint. The knee joint has a greater range of movement than the ankle joint does. If a digital character needs to move their lower body, say to kick a ball, this set of distance weights would help ensure the smaller ankle movement is not subsumed as a rounding error compared to the larger knee joint movement. More or fewer weights may be used, to match the form of the input. As mentioned previously, one simplifying assumption is to assume that the linear parameters only have one value (as opposed to the angular parameters having four values). In alternate embodiments, if the system is instead set up with linear parameters composed of three values, an equal number of distance weights would be required-one per input parameter value. Alternate embodiments may have any number of values representing each linear input and each angular input, and may have an equal number of distance weights corresponding to each input parameter value.

In some embodiments, each sample node may contain a set of basis weights, w, 1408. For m outputs (high-order joints, bones, high order correctives, etc.), there may be m linear and 4*m angular basis weight values. In some embodiments of the systems and methods of the present invention, four values may be computed for each angular output, so there are multiple basis weights for each angular output that drives the digital character rig. These basis weights are calculated during the training phase of the network and are fixed during evaluation (e.g., the use phase of the RBFNN, as opposed to the training phase). The basis weight calculation is done using standard techniques of RBFNNs. With a typical RBFNN, each output is considered independent and there are as many basis weights as outputs. Because some of our outputs are angular, requiring more than a single real number (e.g. four values that may represent x, y, z, w), we have multiple basis weights for each output and perform an extra step, as described further below, to compose these values into angular outputs. Any number of outputs may be calculated. In some embodiments, 1, 5, 10, 100, or 1000, or more output parameters may be calculated. Regardless of the number of outputs provided by the RBFNN system, there may be one basis weight, w, per output.

Figure 16:
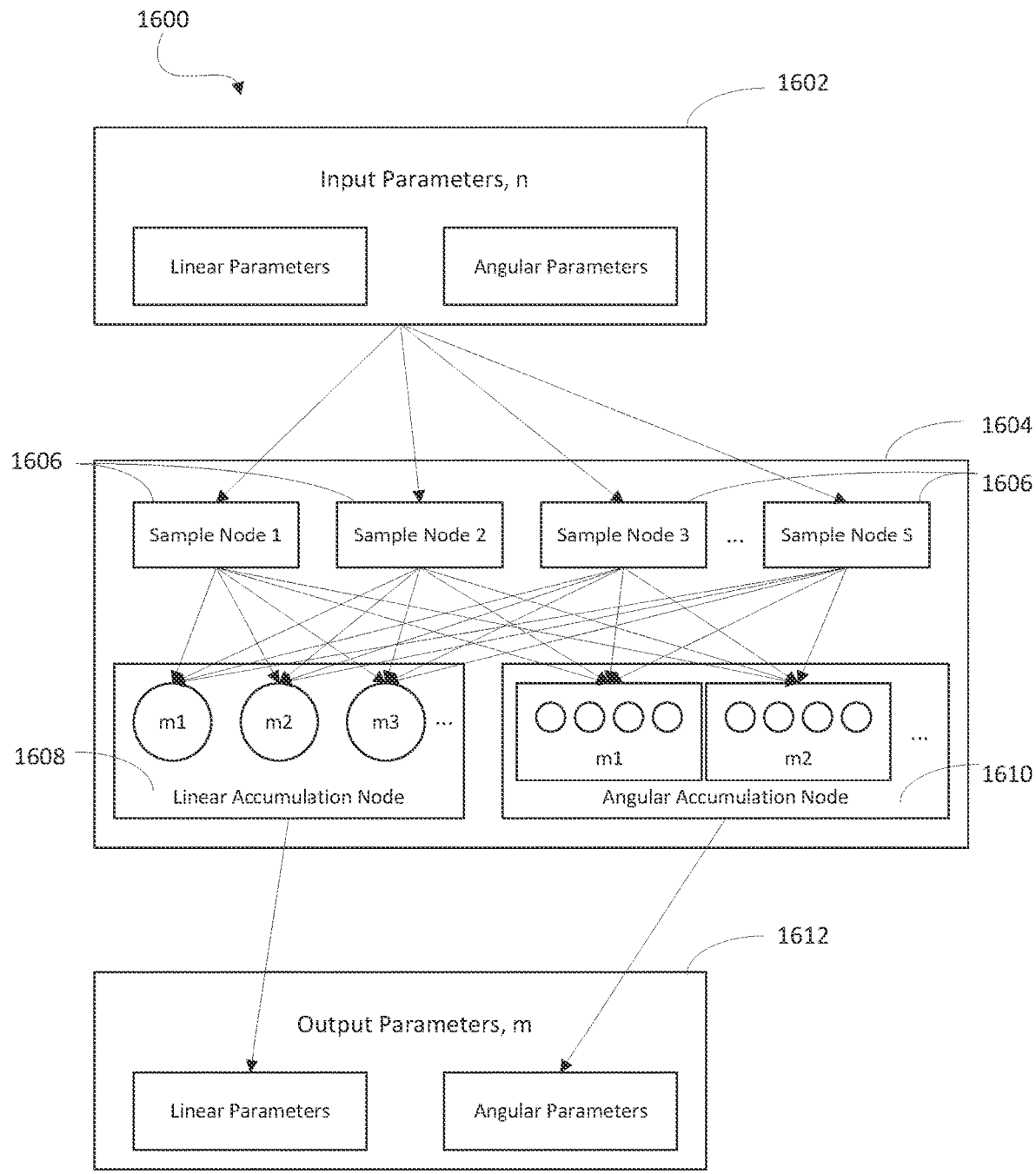
FIG. 16 illustrates a system diagram for interpolating an output pose of a digital character from a RBFNN, with exemplary data that is communicated within the system, according to some embodiments.

Diagram of a System for Interpolating an Output Pose of a Digital Character from a RBFNN FIG. 16 is a diagram of a system for interpolating an output pose of a digital character from a RBFNN, with exemplary data that is communicated within the system. The diagram 1600 begins at 1602 where a new pose for a digital character rig is represented by n input parameters. The new pose may be an avatar making the Y in the YMCA dance sequence. In some embodiments, the input pose may be represented as the linear and angular differences between a neutral reference pose. In some embodiments, the linear parameters may be represented by a single real number and the angular parameters may be represented by any suitable angular quantity, such as an Euler angle, rotation matrix, axis-angle, quaternion, etc. The inputs may be separated into a set of linear and angular components, either prior to being received by the system, or as a step within the system, as long as the data that is fed into the RBFNN is separated into linear and angular groups. For n inputs, there are n linear and n angular parameters, for a total of 2*n input parameters that represent the pose. Each parameter may be composed of one or more values, such as each angular parameter comprising four values, and each linear parameter comprising one value. Each parameter may comprise more or fewer than in the example provided here, and should not be interpreted as limiting the scope of this invention. The separated linear and angular input parameters are passed to the RBFNN 1604, and are input to each of the sample nodes 1606. There is one sample node per training pose. One point of novelty thus far is in separating the angular from the linear parameter. All of the input parameters (the separated linear and angular parameters) are passed to all of the sample nodes.

Each sample node 1606 may contain the four components 1402, 1404, 1406, 1408 specified in the node 1400 described with reference to FIG. 14, but may contain more or fewer components.

The sample nodes 1606 may each compute a set of distances, one for each input value. For linear inputs, the distance is the Euclidean distance between the input value and the corresponding value from each training (e.g., sample) pose contained within the RBFNN. In alternate embodiments, any other suitable linear distance equation may be used. For angular inputs, the distance may be the angular distance calculated in SO(3) space. Typically, RBFNNs only have linear inputs and only use Euclidean norms.

The sample nodes 1606 may also each calculate a final distance that takes into account data of different types. The final distance, which is a single real number, is computed as a weighted Euclidean norm using the weight, γ, 1406 as described above. This weight is a point of novelty and is not found in typical RBFNNs.

The sample nodes 1606 may each calculate the basis value. This value is at least partially calculated from the final distance, is the output of the basis function, and is standard to all RBFNNs. Generally, a radial basis function is a network of radial functions. This class of functions has been shown to be useful in approximating general, unknown functions with the appropriate choice of distance and radial function. A radial function is a function whose value is defined based upon its distance from the origin, although a reference point other than the origin may be used, where the distance is typically defined to be the Euclidean distance. The radial basis function may be the sum over multiple radial functions.

The sample nodes 1606 may also each calculate a basis value weighted by w. This is the output of the sample nodes 1606. The basis value may be multiplied by each of the w basis weights and passed to the corresponding accumulation node, 1608 or 1610. There may be two accumulation nodes, one for linear outputs 1608 and one for angular outputs 1610. Linear outputs may be calculated as a sum of weighted values passed from each sample. Each sample node passes four values to each angular accumulation node (a single real number value is represented by a circle in FIG. 16). These values may be accumulated in the same way as linear outputs, resulting in four sums. The first three sums may be used as the x, y, z components of a rotational axis vector. This rotational axis vector may be scaled to unit length. The fourth and final value may be used as an angular rotation value around the rotational axis, providing a common angle-axis representation of a 3D rotation, which may be output to the corresponding joint, bone, high order corrective, or other high-order rig representation as an angular output. Finally, all outputs 1612 are passed to external systems to drive the digital character.

Example Training of RBFNN

Figure 17:
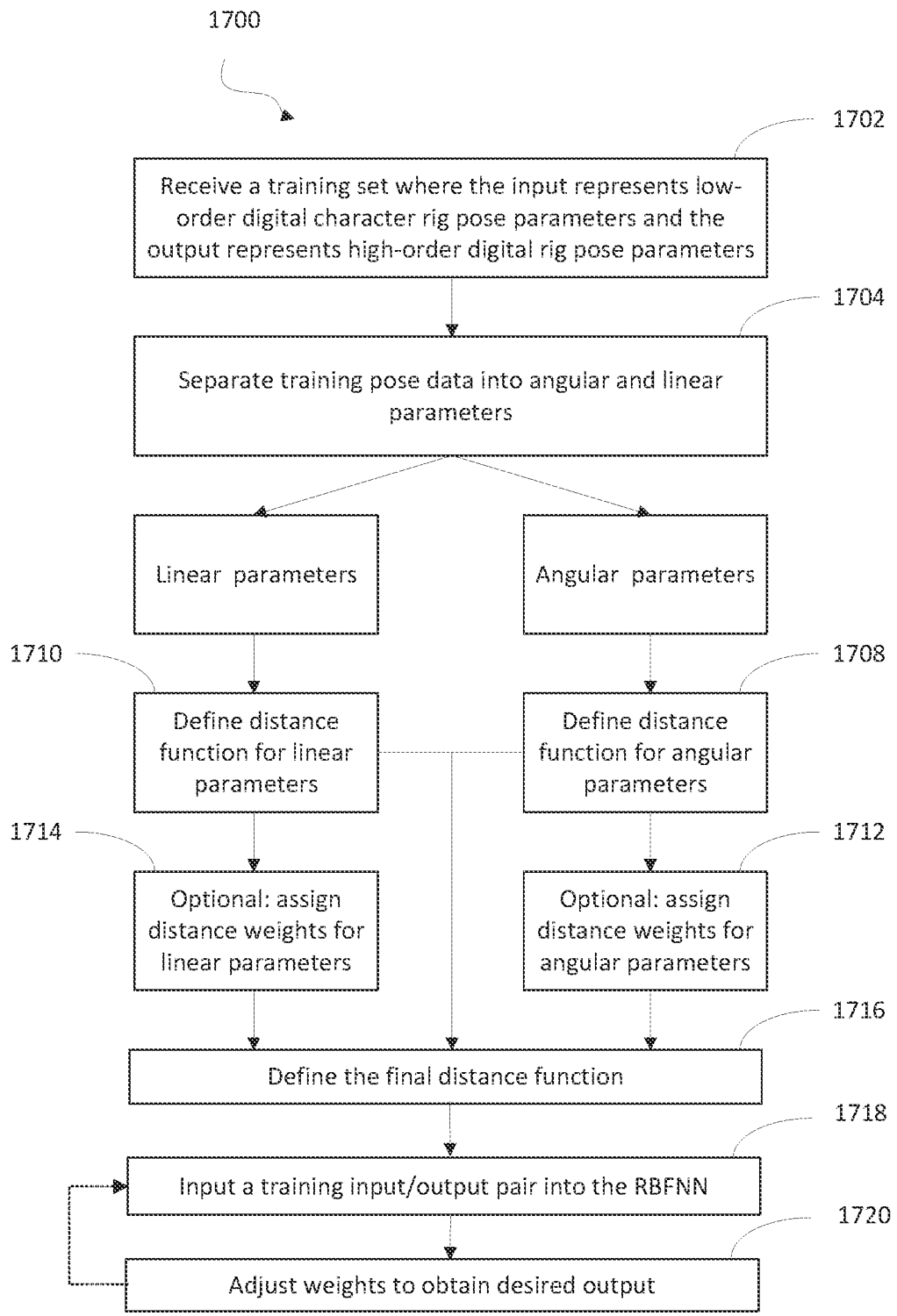
FIG. 17 illustrates an example process for training the RBFNN, according to some embodiments.

FIG. 17 illustrates an example process for training the RBFNN disclosed herein. Process 1700 illustrates the process for training a RBFNN in the context of a digital character rig, however it should be understood that other contexts are possible. Contexts that benefit the most from the invention disclosed herein are those that are composed of two or more different types of data, and/or comprise angular inputs, as will be disclosed further below. The process 1700 can be performed by a hardware processor suitable for training NNs. In some embodiments, the training can be performed by the remote processing module 270 or the remote computing system 920. The trained RBFNN can be communicated to the wearable system 200 via the network 990. In some embodiments, the wearable system 200 can acquire additional training data and the RBFNN can be further trained by, for example, the local processing and data module 260, the remote processing module 270, or the remote computing system 920, which may help personalize the RBFNN to the specific poses or digital characters viewed by the user 210 of the wearable system 200.

At block 1702, a training set of digital character poses is received, where the input may represent low-order digital character rig pose parameters and the output may represent high-order digital rig pose parameters. As mentioned above, alternative embodiments may use other input/output training data sets, such as input and output both representing high-order digital character rigs, or input and output both representing low-order digital character rigs. In alternate embodiments, the input data may not represent a digital character rig, but may still have inputs that are composed of more than one type, and/or comprise angular data.

At block 1704, the training data is separated into angular and linear parameters. As mentioned above, angular and linear parameters are separated in order to improve interpolation results. When angular parameters are interpolated using linear equations or treatments, undesirable outputs can occur, such as gimbal locking, rapid flipping, and/or changing of sign or areas where a single angular rotation can be represented multiple ways. In alternate embodiments, training data may be separated into two or more sub-sets of data, as long as the sub-sets of data may benefit from subsequent special treatment, for example with unique distance calculations for each sub-set, as will be described below. The angular and linear data may be separated using any suitable method. For example, a script, computer program, or other piece of code may be created that can recognize the form of angular data (e.g., a vector containing four elements) and the form of linear data (e.g. a single value), and automatically group the data by format of input data. Alternatively, the input data may be pre-tagged from the input data source, so the system can simply read the tags and manipulate the input data according to pre-defined methods. In some embodiments, the format of the input data defines the desired format of the output data, and any number of pre or post processing steps may be added in order to manipulate the data to match the desired data format.

At blocks 1708 and 1710, the distance functions of the RBFNN may be defined. Block 1710 may define the distance function for linear parameters. This is generally defined as the Euclidian norm although other distance functions are possible, and may be written as $\Delta(q1,q2)=\|q1-q2\|$, or may alternatively (more commonly) be written as $\Psi(x)=\Psi(\|x\|)$ where $\Psi$ is a radial function when the distance is defined relative to an origin, or may alternatively be written as $\Psi(x)=\Psi(\|x-c\|)$ when the distance is defined relative to a point other than an origin. The linear distance function may alternatively be generalized using any distance function, $\Delta$, as $\Psi(x)=\Psi(\Delta(x, c))$. Block 1708 may define the distance function for angular parameters. The angular distance between two rotations may be in the range of 0-180 degrees or 0-$\pi$ radians. The distance between two angles may be defined by $\Delta(q1,q2)=\mathrm{acos}(2<q1,q2>^2-1)$ where q1 and q2 may be angles represented as quaternions and $<q1,q2>$ denotes the inner product of the corresponding quaternions, e.g., q1=[x1, y1, z1, w1] and q2=[x2, y2, z2, w2] and $<q1,q2>=x1x2+y1y2+z1z2+w1w2$. In this embodiment, the distance metric is symmetric, and $\Delta(q1,q2)+\Delta(q2,q3)\neq\Delta(q1,q3)$, which may be the mathematical representation of the arm raising example described earlier demonstrating how both arms were in the target position of being raised in front of the user but the hands were oriented differently because a different set of translations/rotations were done on each arm. Although blocks 1708 and 1710 specify angular and linear distance functions, alternate embodiments may utilize other functions that are better suited to the type of data being manipulated.

Blocks 1712 and 1714 are optional steps in process 1700, and illustrate the step of assigning distance weights, $\gamma$, for linear and angular parameters. As mentioned above with reference to FIG. 14, 1406, for n inputs (low-order joints, bones, blendshapes, etc.), there are n linear and n angular distance weights, $\gamma$, for a total of 2*n distance weights. These distance weights are used in the RBF distance function to calculate the final distance function and are user assigned, partially user assigned, and/or calculated during training. These distance weights are needed due to the multiple input types and the need to compose inputs of differing types together. One example input type is the clavicle type and a second input type is the shoulder joint type. The shoulder joint has a greater range of movement than the clavicle does so the $\gamma$ set of distance weights may help ensure the smaller clavicle movement isn't negligible when compared to the larger shoulder joint movement.

At block 1716, the final distance function may be defined as the weighted, $\gamma$, Euclidean norm of each distance that will be output from the equations defined at blocks 1708 and 1710.

At block 1718, the training input/output set is input into the RBFNN.

At block 1720, the RBFNN adjusts a set of basis weights, w, in order to match the calculated output from the RBFNN to the known output from the training set when the corresponding inputs are used. The basis weights, w, are automatically calculated by the RBFNN and are only adjusted during the training phase. As mentioned above with respect to 1408, for m outputs (high-order joints, bones, high order correctives, etc.), there may be m linear and 4*m angular weight values. In some systems and methods of the present invention four values for each angular output are computed, so there are multiple basis weights for each angular output that drives the digital character rig. The basis weight calculation is done using standard techniques of RBFNNs.

After block 1720, the RBFNN is fixed (e.g., after all of the training input/output pairs within the training set have been input into the RBFNN). This means the basis weights, w, are no longer allowed to vary, and are now considered fixed values, unless additional training data is provided. The RBFNN is now ready to interpolate new outputs from new inputs. In some embodiments, this may mean that a new high-order pose for a digital character may be interpolated based on a low-order digital character input pose, such as when an avatar forms a Y while dancing to the YMCA song.

Example Process of Use of a Trained RBFNN

Figure 18:
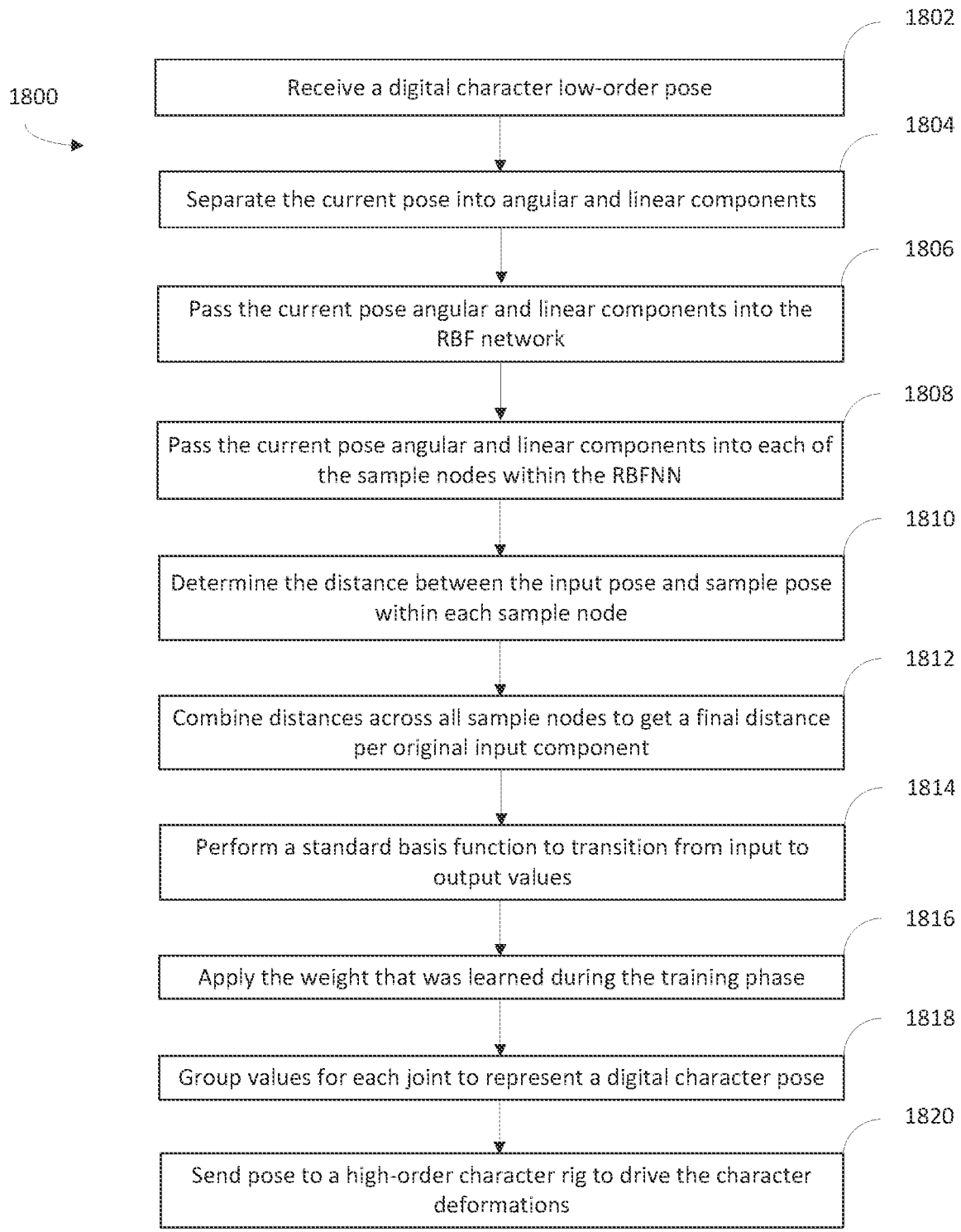
FIG. 18 illustrates an example process of using a trained RBFNN to interpolate a new pose for a digital character, according to some embodiments.

FIG. 18 illustrates an example process 1800 of using a trained RBFNN to interpolate a new pose for a digital character. The process 1800 can be performed by a hardware processor associated with the wearable system 200 such as, for example, the local processing and data module 260, the remote processing module 270, the remote computing system 920, or a combination thereof.

At block 1802, the RBFNN system receives a low-order pose for a digital character represented by a digital character rig defined by joints, bones, blendshapes, or other methods of describing a digital character rig. As mentioned above with respect to FIG. 13, these inputs may have an angular parameter and a linear parameter, and each angular or linear parameter may contain one or more values. As mentioned above with respect to FIG. 11, the current low-order pose may be a person forming the letter Y with his/her arms while dancing to the YMCA song.

At block 1804, the current pose is separated into angular and linear parameters. At block 1806, all of the input parameters are passed into the RBFNN, which passes the inputs into each of the sample nodes at block 1808.

At block 1810, each sample node determines the distance between the input pose and sample pose. This means there may be a total of (n+n*4)*S values calculated, where the two is because there are two types of calculations (e.g., one for linear and one for angular), n is the number of inputs (joints, bones, blendshapes, etc.), and S is the number of samples contained within the RBFNN. For the specific example of FIGS. 13A-13B and FIG. 16, this would mean there are (9+9*4)*3=135 distance values calculated at block 1810.

At block 1812, a final distance is calculated by doing a weighted Euclidean norm as discussed above in 1716, utilizing the distance weights, γ. This means that all corresponding distances for a single joint across all training poses (e.g., sample nodes) are combined into a single distance metric. With respect to the FIG. 13 example, that means we may have nine linear and nine angular values, one linear and one angular value per joint a-j.

At block 1814, a standard basis function is applied to the output from block 1812. This step transitions the values from input values relative to n, to output values relative to m. The standard basis function could be one of many options such as the Gaussian basis function, the cubic basis function, the multiquadratic basis function, or the inverse multiquadratic basis function. At this stage in the process, relative to the FIG. 13 example, there may be six linear and 4*6=24 angular independent outputs. More broadly, there may be 5*m independent values for each output parameter (joint, bone, high order corrective, etc.).

At block 1816, the basis weight, w, that was learned during RBFNN training phase may be applied to the output from block 1814.

At block 1818, values are grouped according to output type and joint. For example, angular values may be combined into vectors representing SO(3) space where the vector comprises four values=[x, y, z, w]. Optionally, linear and angular outputs for a single joint may be paired.

At block 1820, the interpolated high-order digital character pose is sent to a high-order character rig to drive the character deformations. In the example from FIG. 11, this means the digital character is rendered in the pose of Y shaped arms while dancing to the YMCA song. This process may be repeated over and over again to create an animation for the digital character. Subsequent loops of process 1800 may show the digital character transitioning from arms in the shape of a Y, to arms in the shape of an M, to arms in the shape of a C, and then arms in the shape of an A.

Diagram of a System for Interpolating an Output Pose of a Digital Character from a FFNN A second exemplary embodiment of a neural network configured to interpolate one or more digital character poses, is a feed forward neural network (FFNN) configured to separate the linear and angular components, as described in further detail below.

Figure 19:
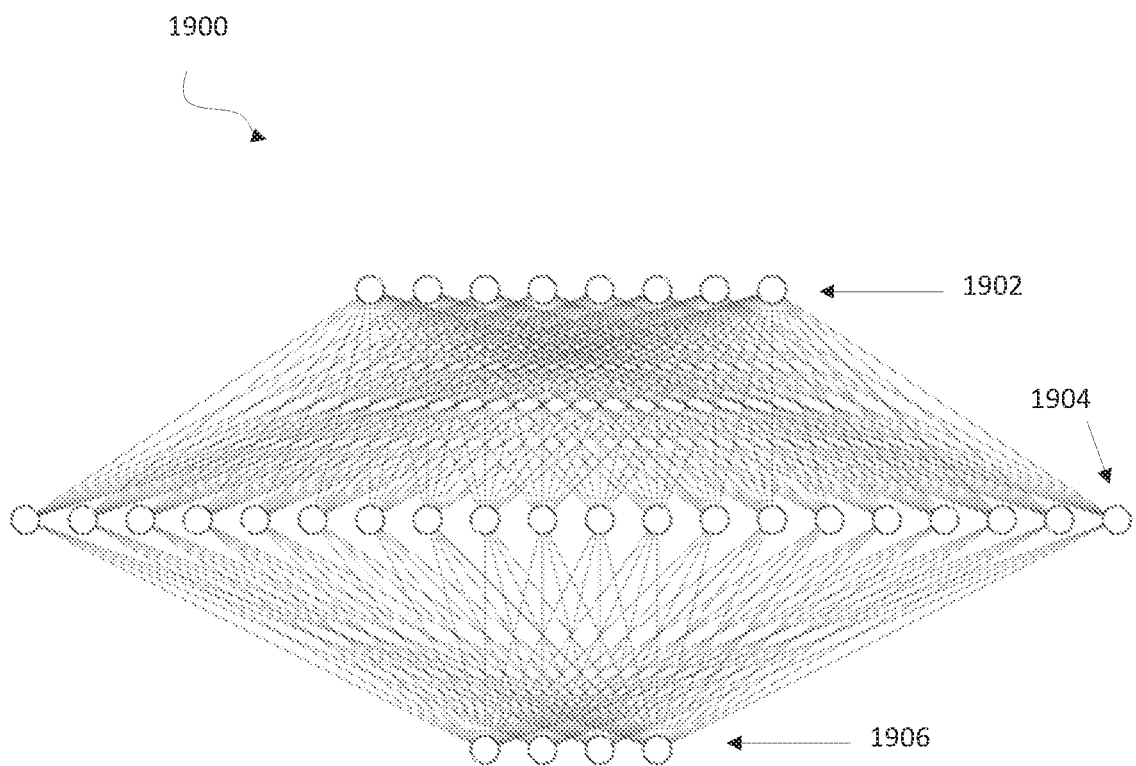
FIG. 19 illustrates a system diagram for interpolating an output pose of a digital character from a FFNN, according to some embodiments of the present invention.

FIG. 19 illustrates a portion of a FFNN architecture 1900 for interpolating an output pose of a digital character, according to some embodiments of the present invention. As mentioned above, the relationships between the driver joints (e.g., low order skeleton) and the helper joints (e.g., high order skeleton) may be complex, but may be solved by utilizing a NN. In some embodiments, a multilayer FFNN may be used, and may require significantly fewer parameters in order to solve for one or more outputs. This may lead to reduced compute time, such as from 4.5 ms per frame for a RBFNN embodiment to 0.9 ms per frame for a FFNN embodiment, which may result in significant performance improvements, especially on compute limited devices. In some embodiments, the FFNN may be trained separately for each component of motion. Three example components of motion may be rotation, translation, and scale. In some embodiments, input data to the FFNN may be preprocessed such that the positional parameters (e.g., translation, scale) may be scaled to unit range (e.g., between 0 to 1). In some embodiments, rotation parameters may be converted from Euler angles used in the animation authoring system (e.g., DCC system) to unit quaternions.

In some embodiments, the FFNN may be a fully connected network with a single hidden layer, using rectified linear unit (ReLU) activation functions. In some embodiments, the hidden layer may be incorporated as a resnet block. In some embodiments, the number of hidden dimensions to use may best be discovered by hyperparameter tuning. In some embodiments, the number of hidden dimensions to use may be determined using the following equation:

$$10*\max(\text{Number of Drivers}, \text{Number of Helpers})$$

As an example, the calf system of the digital character's rig may include the knee and foot joints, which together drive a single joint positioned mid-calf. The calf joint may deform the digital character's calf as the digital character's leg moves. In this example, the knee and foot joints are the driver joints (alternatively called drivers) and the mid-calf joint is the helper joint (alternatively called helper). Each driver may provide three translation parameters, X, Y, Z, to the NN and may need three translations for a single helper joint. So for the calf example, the input layer would have six neurons (three parameters times two driver joints), the hidden layer would have twenty neurons (ten times two drivers), and the output layer would have three neurons (three parameters times one helper joint). In some embodiments, the scale network architecture may be identical because scale may also have three parameters, X, Y, Z. In some embodiments, each rotation, which may be a quaternion rotation, may have four elements, and thus the input layer 1902 of the rotation network architecture 1900 may have eight neurons, the hidden layer 1904 may have twenty neurons, and the output layer 1906 may have four neurons.

In some embodiments, the FFNN system may be able to achieve the same results as a much larger RBFNN system. Analogous to the RBFNN, the FFNN may have an input layer 1902 that may accept the control parameters from the driver joints. The output layer may produce the values the helper joints may be set to.

Example Training of NNs

Figure 20:
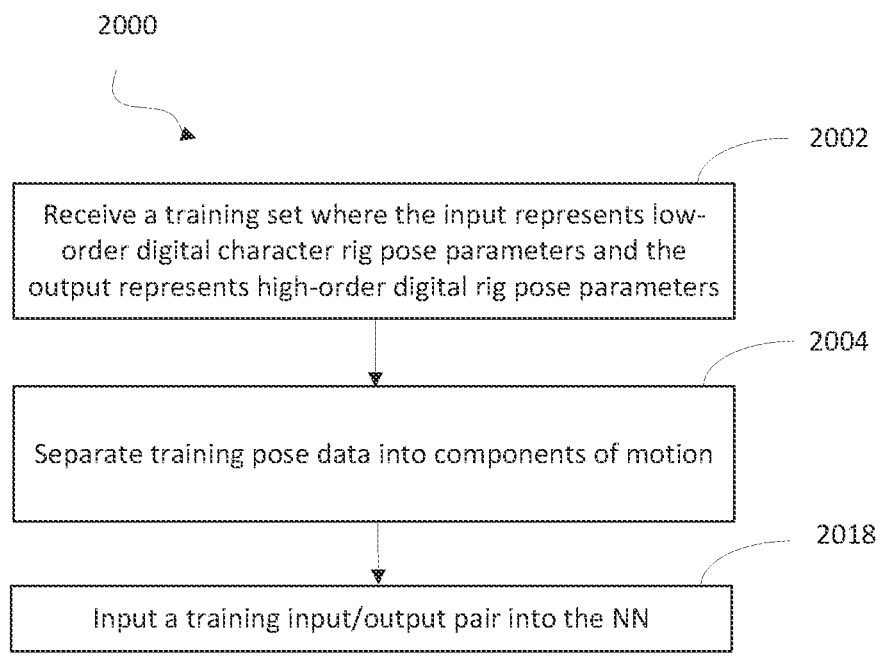
FIG. 20 illustrates an example process for training a NN, according to at least some embodiments of the present invention.

FIG. 20 illustrates an example process for training the NNs disclosed herein. Process 2000 illustrates the process for training a NN in the context of a digital character rig, however it should be understood that other contexts are possible. Contexts that benefit the most from the invention disclosed herein are those that are composed of two or more different types of data, and/or comprise angular inputs, as discussed above. The process 2000 can be performed by a hardware processor suitable for training NNs. In some embodiments, the training can be performed by the remote processing module 270 or the remote computing system 920. The trained NN can be communicated to the wearable system 200 via the network 990. In some embodiments, the wearable system 200 can acquire additional training data and the NN can be further trained by, for example, the local processing and data module 260, the remote processing module 270, or the remote computing system 920, which may help personalize the NN to the specific poses or digital characters viewed by the user 210 of the wearable system 200.

At block 2002, a training set of digital character poses is received, where the input may represent low-order digital character rig pose parameters and the output may represent high-order digital rig pose parameters. As mentioned above, alternative embodiments may use other input/output training data sets, such as input and output both representing high-order digital character rigs, or input and output both representing low-order digital character rigs. In alternate embodiments, the input data may not represent a digital character rig, but may still have inputs that are composed of more than one type, and/or comprise angular data.

At block 2004, the training data is separated into each component of motion. In some embodiments, the separation may be into angular and linear parameters. In some embodiments, the separation may be into rotation, translation, and/or scale components. As mentioned above, the parameters/components are separated in order to improve interpolation results. When angular parameters are interpolated using linear equations or treatments, undesirable outputs can occur, such as gimbal locking, rapid flipping, and/or changing of sign or areas where a single angular rotation can be represented multiple ways. In alternate embodiments, training data may be separated into two or more sub-sets of data, as long as the sub-sets of data may benefit from subsequent special treatment, for example with unique distance calculations for each sub-set, as will be described below. The parameters/components may be separated using any suitable method. For example, a script, computer program, or other piece of code may be created that can recognize the form of angular data (e.g., a vector containing four elements) and the form of linear data (e.g., a single value), and automatically group the data by format of input data. Alternatively, the input data may be pre-tagged from the input data source, so the system can simply read the tags and manipulate the input data according to pre-defined methods. In some embodiments, the format of the input data defines the desired format of the output data, and any number of pre or post processing steps may be added in order to manipulate the data to match the desired data format.

At block 2018, the training input/output set is input into the NN.

After block 2018, the NN is fixed (e.g., after all of the training input/output pairs within the training set have been input into the NN) and the training phase may be completed. The NN is now ready to interpolate new outputs from new inputs. In some embodiments, this may mean that a new high-order pose for a digital character may be interpolated based on a low-order digital character input pose, such as when an avatar forms a Y while dancing to the YMCA song.

Example Process of Use of a Trained NN

Figure 21:
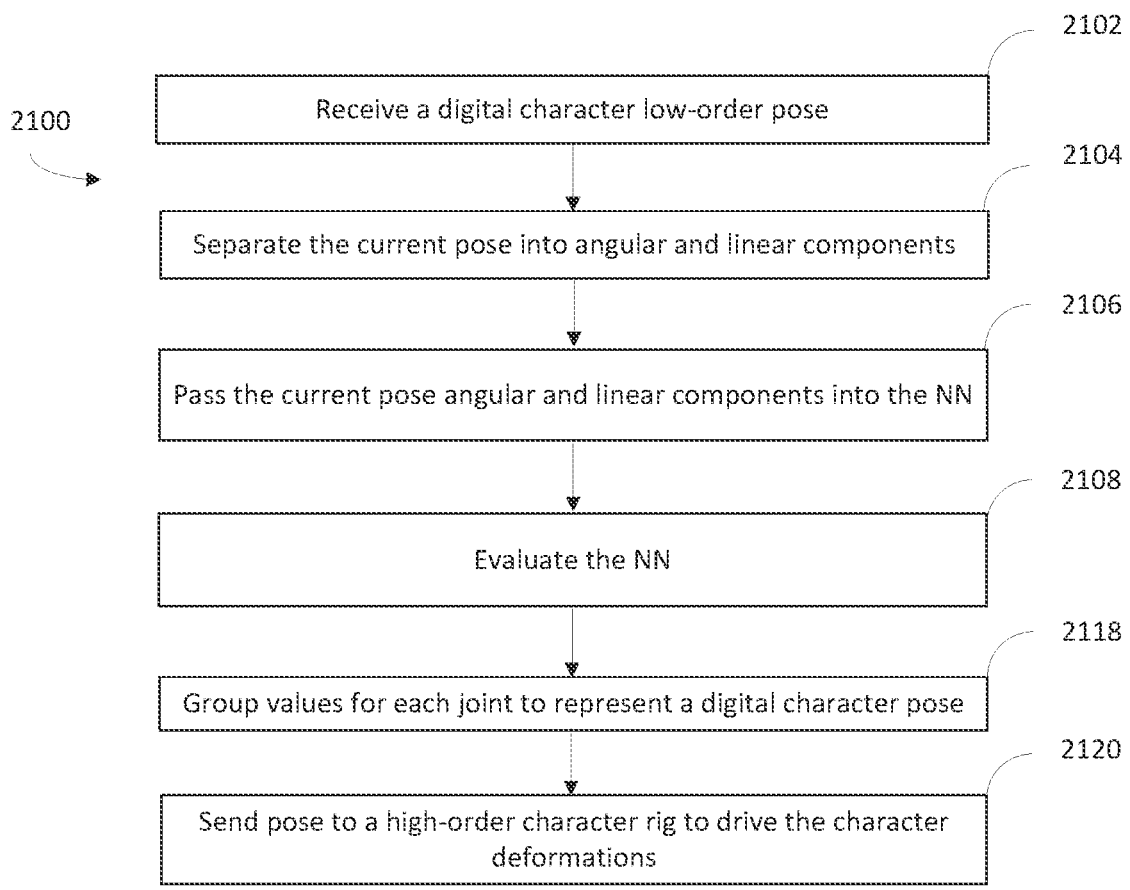
FIG. 21 illustrates an example process for using a NN, according to at least some embodiments of the present invention.

FIG. 21 illustrates an example process 2100 of using a trained NN to interpolate a new pose for a digital character. In some embodiments, the NN may be a FFNN or a RBFNN. The process 2100 can be performed by a hardware processor associated with the wearable system 200 such as, for example, the local processing and data module 260, the remote processing module 270, the remote computing system 920, or a combination thereof.

At block 2102, the NN system receives a low-order pose for a digital character represented by a digital character rig defined by joints, bones, blendshapes, or other methods of describing a digital character rig. As mentioned above with respect to FIG. 13, these inputs may have an angular parameter and a linear parameter, and each angular or linear parameter may contain one or more values. As mentioned above with respect to FIG. 11, the current low-order pose may be a person forming the letter Y with his/her arms while dancing to the YMCA song.

step 2104, the current pose may be separated into angular and linear parameters, into components of motion, or any other suitable method of separation. At block 2106, all of the input parameters may be passed into the NN, and the NN may then execute at step 2108.

At step 2018, values may be grouped according to output type and joint. In some embodiments, the angular and linear outputs may be combined to represent the motion for a single joint. In some embodiments, the components of motion may be combined to represent the rotation, translation, and/or scale motion of a single joint.

At step 2020, the interpolated high-order digital character pose may be sent to a high-order character rig to drive the character deformations. In the example from FIG. 11, this means the digital character is rendered in the pose of Y shaped arms while dancing to the YMCA song. This process may be repeated over and over again to create an animation for the digital character. Subsequent loops of process 2000 may show the digital character transitioning from arms in the shape of a Y, to arms in the shape of an M, to arms in the shape of a C, and then arms in the shape of an A.

Realtime Portability

The rigging for a virtual character can involve control systems for automated control of rigging elements (e.g., higher-order rigging elements) based on various inputs, and may comprise a RBFNN, FFNN, or other NN system. In some embodiments, there are multiple, interleaved layers of control systems in the rigging for a particular virtual character. In the context of this disclosure, a rigging control system includes a set of one or more rules (e.g., logical rules, mathematical rules, etc.) which determines an output for controlling (e.g., regulating, adjusting, specifying, selecting, invoking, or otherwise impacting) a rigging element, such as a high-order skeletal system or a high-order blendshape, based on an input associated with a low-order rigging element or other source. Since rigging control systems can be very complex, various tools have been created for authoring and implementing them. These tools typically utilize application-specific rigging control protocols. A particular rigging control protocol may include an application-specific set of data formats, data structures, functions, computational units (e.g., nodes, classes, etc.) and/or programming languages. When different applications use different rigging control protocols, it is not possible to directly transfer a rigging control system which has been authored in one application and then execute it in another application.

Digital content creation (DCC) applications are often used for developing the rigging, including rigging control systems, for virtual characters. One example of such a DCC application is Autodesk Maya®. A DCC application can provide various tools for defining rigging elements, such as polygon meshes, skeletal systems, blendshapes, etc., and for defining control systems for performing automated control of these rigging elements. The rigging control systems are built in the DCC application using its application-specific rigging control protocol.

Although DCC applications are well-suited for creating virtual characters and their associated rigging, they are typically not well-suited for real-time display of virtual characters (including real-time execution of the associated character rigging) in a game or VR/AR/MR application, for example. Instead, real-time engines have been developed for this purpose. One example of such a real-time engine is the Unreal® Engine available from Epic Games. Real-time engines are primarily designed to display finished rigging assets and are not well-suited to authoring sophisticated rigging assets. While real-time engines can include tools for creating rigging elements and/or rigging control systems, they are usually not as robust as those which exist in DCC applications; it is significantly easier to specify, build, and test new rigging assets, including rigging control systems, in a DCC application. Thus, real-time engines typically rely on DCC applications to provide virtual characters and their associated rigging. This requires rigging assets to be transferred from a DCC application to a real-time engine.

Tools, such as the Filmbox (FBX®) format, exist for transferring meshes, blendshapes, skeletal systems, and animations between applications. However, no similar tool exists for transferring rigging control systems between applications. While meshes, blendshapes, skeletal systems, and animations can be well-defined in formats which can more easily be ported between applications, a rigging control system is typically tightly coupled to a specific application's data structures and conventions (e.g., the rigging control protocol used by the authoring application). Transferring rigging control systems from an authoring application to a real-time application therefore requires re-implementing the control systems in the real-time application environment in much the same way a software developer might re-implement an algorithm in multiple software languages to run in multiple applications and/or on multiple computing platforms. However, re-implementing the rigging control systems for a virtual character can be a very difficult, time-consuming and expensive proposition due to their complexity and the difficulty of validating parities between applications.

The NN systems and methods described above are able to overcome this challenge of transferring from a first application to a second application, while preserving high-fidelity biomechanical animation and deformations usually reserved for offline rendering. In some embodiments, once the NN is designed and used in a DCC application, such as Maya, the weights and other parameters can be serialized into any convenient data format (e.g. Yet Another Markup Language (YAML), JavaScript Object Notation (JSON), Extensible Markup Language (XML), Filmbox (FBX), etc.) so the system can be read into other applications, such as real-time engines. Only the RBF node and import logic need to be implemented in the target application, in contrast to traditional methods of porting the entire complex rigging system upon which the NN is typically based, and then running into the transfer problems described above. In other words, the processes described herein are able to transfer the complex rigging system because the training phase of creating the NN, as described in FIGS. 17 and 20, integrated the complex rigging logic into the NN. In other words, by transferring the NN, the processes are transferring the complex rigging system. Rig encapsulation and portability are also described in U.S. Patent Application No. 62/658,415, which is incorporated by reference herein in its entirety.

The NN systems and methods enable portability between applications. In some embodiments, this may be accomplished by moving the complex, layered, hierarchical, application specific rigging control system into a mathematical construct (e.g. NN), thus eliminating application specific constructs (in other words, math is a universal language that any system can be programed to understand).

Additional Aspects

1. A method comprising: receiving input data comprising at least one angular component and at least one linear component; providing the input data as input to at least one neural network (NN) that has been trained to evaluate the at least one angular component differently than the at least one linear component; and receiving output data that is generated by the at least one NN based on the different evaluation of the at least one angular component and the at least one linear component.

2. The method of aspect 1, wherein the at least one angular component is in special orthogonal group in three dimensions (SO(3)) space.

3. The method of aspect 1 or aspect 2, wherein at least one of the neural networks comprises a feed-forward neural network (FFNN).

4. The method of aspect 3, wherein the at least one FFNN is a fully connected network.

5. The method of aspect 3 or aspect 4, wherein the feed-forward neural network comprises a single hidden layer.

6. The method of aspect 4 or aspect 5, wherein the FFNN comprises rectified linear unit activation functions.

7. The method of aspect 5 or aspect 6, wherein the hidden layer is a residual NN block.

8. The method of any one of aspects 1 to 7, wherein at least one of the NNs comprises a radial basis function neural network (RBFNN).

9. The method of any one of aspects 1 to 8, wherein the input data describes a pose of a digital character.

10. The method of any one of aspects 1 to 9, wherein the input data represents a low-order skeleton of a digital character, and the output data represents a high-order skeleton of a digital character.

11. The method of any one of aspects 1 to 10, wherein the output data describes a pose of a digital character.

12. The method of any one of aspects 1 to 11, wherein one or more of the input data and the output data further comprises a third component.

13. The method of aspect 12, wherein the angular, linear, and third components are each different components of motion.

14. The method of aspect 12 or aspect 13, wherein: the at least one angular component describes a rotational motion; the at least one linear component describes a translational motion; and the third component describes scale.

15. The method of any one of aspects 12 to 14, wherein the at least one NN comprises a first FFNN that evaluates the at least one angular component and a second FFNN that evaluates the at least one linear component.

16. The method of aspect 15, wherein the at least one NN comprises a third FFNN that evaluates the third component.

17. The method of any one of aspects 1 to 16, wherein the at least one NN comprises a plurality of sample nodes, wherein each sample node corresponds to a training pose, wherein at least one of the training poses comprises at least one angular and linear component.

18. The method of any one of aspects 1 to 17, wherein the at least one NN evaluates the at least one angular component differently than the at least one linear component by evaluating the at least one angular component in SO(3) space and by evaluating the at least one linear component utilizing a Euclidean distance formula.

19. The method of any one of aspects 1 to 18, further comprising: training the one or more NNs, wherein the training comprises: receiving training data comprising training input data and training output data, wherein the training input data and the training output data represent one or more training poses, wherein at least one of the one or more training poses comprise an input angular component, an input linear component, an output angular component, and an output linear component; grouping the input angular components from each of the one or more poses into an input angular component group; grouping the input linear components from each of the one or more poses into an input linear component group; and providing the training input data as input to train the at least one NN, wherein the input angular component group is evaluated differently than the input linear component group, wherein the evaluation results in the output angular component and the output linear component.

20. The method of aspect 19, wherein the input angular component and output angular component are in SO(3) or quaternion space.

21. The method of aspect 19 or aspect 20, wherein the neural networks are a feed-forward neural network (FFNN).

22. The method of aspect 21, wherein the FFNN is a fully connected network.

23. The method of aspect 21 or aspect 22, wherein the FFNN comprises a single hidden layer.

24. The method of any one of aspects 21 to 23, wherein the FFNN comprises rectified linear unit activation functions.

25. The method of aspect 23 or aspect 24, wherein the hidden layer is a residual NN block.

26. The method of any one of aspects 19 to 25, wherein the NN is a radial basis function neural network (RBFNN).

27. The method of any one of aspects 19 to 26, wherein the training data is a pose of a digital character.

28. The method of any one of aspects 19 to 27, wherein the training data comprises a low-order pose of a digital character and a high-order pose of a digital character.

29. The method of any one of aspects 19 to 28, wherein the output angular component and the output linear component represent a pose of a digital character.

30. The method of any one of aspects 19 to 29, wherein at least one of the one or more training poses comprises a third input component and a third output component.

31. The method of aspect 30, wherein the third input component and third output component is scale.

32. The method of any one of aspects 19 to 31, wherein the input angular data and output angular data represent a rotational component of motion for a digital character.

33. The method of any one of aspects 19 to 32, wherein the input linear data and output linear data represent a translational component of motion for a digital character.

34. A system comprising: at least one processor that executes at least one neural network (NN); and memory communicatively coupled to the at least one processor, the memory storing instructions that, when executed by the at least one processor, cause the at least one processor to perform operations comprising: receiving input data comprising at least one angular component and at least one linear component; providing the input data as input to at least one neural network (NN) that has been trained to evaluate the at least one angular component differently than the at least one linear component; and receiving output data that is generated by the at least one NN based on the different evaluation of the at least one angular component and the at least one linear component.

35. The system of aspect 34, wherein the at least one angular component is in special orthogonal group in three dimensions (SO(3)) space.

36. The system of aspect 34 or aspect 35, wherein at least one of the neural networks is a feed-forward neural network (FFNN).

37. The system of aspect 36, wherein the at least one FFNN is a fully connected network.

38. The system of aspect 36 or aspect 37, wherein the FFNN comprises a single hidden layer.

39. The system of any one of aspects 36 to 38, wherein the FFNN comprises rectified linear unit activation functions.

40. The system of aspect 38 or aspect 39, wherein the hidden layer is a residual NN block.

41. The system of any one of aspects 34 to 40, wherein at least one of the NNs is a radial basis function neural network (RBFNN).

42. The system of any one of aspects 34 to 41, wherein the input data describes a pose of a digital character.

43. The system of any one of aspects 34 to 42, wherein the input data represents a low-order skeleton of a digital character, and the output data represents a high-order skeleton of a digital character.

44. The system of any one of aspects 34 to 43, wherein the output data describes a pose of a digital character.

45. The system of any one of aspects 34 to 44, wherein one or more of the input data and the output data further comprises a third component.

46. The system of aspect 45, wherein the angular, linear, and third components are each different components of motion.

47. The system of aspect 45 or aspect 46, wherein: the at least one angular component describes a rotational motion; the at least one linear component describes a translational motion; and the third component describes scale.

48. The system of any one of aspects 45 to 47, wherein the at least one NN comprises a first FFNN that evaluates the at least one angular component and a second FFNN that evaluates the at least one linear component.

49. The system of aspect 48, wherein the at least one neural network comprises a third FFNN that evaluates the third component.

50. The system of any one of aspects 34 to 49, wherein the at least one NN comprises a plurality of sample nodes, wherein each sample node corresponds to a training pose, wherein at least one of the training poses comprises at least one angular and linear component.

51. The system of any one of aspects 34 to 50, wherein the at least one NN evaluates the at least one angular component differently than the at least one linear component by evaluating the at least one angular component in SO(3) space and by evaluating the at least one linear component utilizing a Euclidean distance formula.

52. The system of any one of aspects 34 to 51, wherein the at least one processor is further programmed to: train the one or more NNs, wherein to train, the at least one processor is programmed to: receive training data comprising training input data and training output data, wherein the training input data and training output data represent one or more training poses, wherein at least one of the one or more training poses comprise an input angular component, an input linear component, an output angular component, and an output linear component; group the input angular components from each of the one or more poses into an input angular component group; group the input linear components from each of the one or more poses into an input linear component group; and provide the training input data as input to at least one neural network (NN), wherein the input angular component group is evaluated differently than the input linear component group, wherein the evaluation results in the output angular component and the output linear component.

53. The system of aspect 52, wherein the input angular component and output angular component are in SO(3) space.

54. The system of aspect 52 or aspect 53, wherein the neural networks are a feed-forward neural network.

55. The system of aspect 54, wherein the feed-forward neural network is a fully connected network.

56. The system of aspect 54 or aspect 55, wherein the feed-forward neural network comprises a single hidden layer.

57. The system of any one of aspects 54 to 56, wherein the feed-forward neural network comprises rectified linear unit activation functions.

58. The system of aspect 56 or aspect 57, wherein the hidden layer is a residual neural network block.

59. The system of any one of aspects 52 to 58, wherein the neural network is a radial basis function neural network (RBFNN).

60. The system of any one of aspects 52 to 59, wherein the training data is a pose of a digital character.

61. The system of aspect 60, wherein the training data comprises a low-order pose of a digital character and a high-order pose of a digital character.

62. The system of any one of aspects 52 to 61, wherein the output angular component and the output linear component represent a pose of a digital character.

63. The system of any one of aspects 52 to 62, wherein at least one of the one or more training poses comprises a third input component and a third output component.

64. The system of aspect 63, wherein the third input component and third output component is scale.

65. The system of any one of aspects 52 to 64, wherein the input angular data and output angular data represent a rotational component of motion for a digital character.

66. The system of any one of aspects 52 to 65, wherein the input linear data and output linear data represent a translational component of motion for a digital character.

67. A method comprising: receiving at least one input parameter to a radial basis function neural network (RBFNN); calculating a set of distances from one or more distance functions within the RBFNN; and applying a set of distance weights to the set of distances calculated from the one or more distance functions within the RBFNN, wherein the set of distance weights comprises one or more distance weights, wherein the set of weights comprises a distance weight for each input parameter to the RBFNN.

68. The method of aspect 67, wherein at least one distance weight from the set of distance weights is defined by a user.

69. The method of aspect 67 or aspect 68, wherein the at least one distance weight from the set of distance weights is defined by the RBFNN.

70. The method of any one of aspects 67 to 69, further comprising separating the input parameters into a first input data type and a second input data type.

71. The method of aspect 70, wherein the first input data type is data representing a linear parameter.

72. The method of aspect 70 or aspect 71, wherein the second input data type is data representing an angular parameter.

73. The method of any one of aspects 67 to 72, wherein the one or more distance functions comprise at least one angular distance function.

74. The method of aspect 73, wherein the angular distance function is in special orthogonal group in three dimensions (SO(3)) space.

75. The method of aspect 73 or aspect 74, wherein the angular distance function is in quaternion space.

76. The method of any one of aspects 67 to 75, wherein the one or more distance functions comprise at least one linear distance function.

77. The method of aspect 76, wherein the linear distance function is a Euclidean distance function.

78. The method of any one of aspects 67 to 77, further comprising separating the at least one input parameters into a first input data type and a second input data type.

79. The method of aspect 78, wherein the first input data type is data representing a linear parameter.

80. The method of aspect 78 or aspect 79, wherein the second input data type is data representing an angular parameter.

81. The method of aspect 80, further comprising calculating an angular distance using the second input data type and the angular distance function, and calculating a linear distance using the first input data type and linear distance function.

82. The method of any one of aspects 67 to 81, wherein the RBFNN is configured to interpolate a pose for a digital character.

83. The method of any one of aspects 67 to 82, wherein the one or more input parameters represent a low-order digital character rig.

84. The method of any one of aspects 67 to 83, wherein the RBFNN is configured to calculate output parameters that represent a high-order digital character rig.

85. The method of any one of aspects 67 to 84, wherein the RBFNN is configured to calculate a plurality of output parameters that are independent values.

86. The method of aspect 85, further comprising grouping at least two of the plurality of independent values into a combination value.

87. The method of aspect 86, wherein the combination value represents a quaternion vector comprising x, y, z, and w.

88. A system comprising: a radial basis function neural network (RBFNN) implemented on one or more computers and one or more storage devices storing instructions that are operable, when executed by the one or more computers, to cause the one or more computers to: receive at least one input parameter from a set of input parameters into the RBFNN; calculate a set of distances from one or more distance functions within the RBFNN; and apply a set of distance weights to the set of distances calculated from the one or more distances within the RBFNN, wherein the set of distance weights comprise a distance weight for each input parameter to the RBFNN.

89. The system of aspect 88, wherein at least one distance weight from the set of distance weights is defined by the user.

90. The system of aspect 88 or aspect 89, wherein at least one distance weight from the set of distance weights is defined by the RBFNN.

91. The system of any one of aspects 88 to 90, further comprising separating the input parameters into a first input data type and a second input data type.

92. The system of aspect 91, wherein the first input data type is data representing a linear parameter.

93. The system of aspect 91 or aspect 92, wherein the second input data type is data representing an angular parameter.

94. The system of any one of aspects 88 to 93, wherein the one or more distance functions comprise at least one angular distance function.

95. The system of aspect 94, wherein the angular distance function is in special orthogonal group in three dimensions (SO(3)) space.

96. The system of aspect 94 or aspect 95, wherein the angular distance function is in quaternion space.

97. The system of any one of aspects 88 to 96, wherein the one or more distance functions comprise at least one linear distance function.

98. The system of aspect 97, wherein the linear distance function is a Euclidean distance function.

99. The system of any one of aspects 88 to 98, further comprising separating the input parameters into a first input data type and a second input data type.

100. The system of aspect 99, wherein the first input data type is data representing a linear parameter.

101. The system of aspect 99 or aspect 100, wherein the second input data type is data representing an angular parameter.

102. The system of any one of aspects 99 to 101, further comprising calculating an angular distance using the second input data type and the angular distance function, and calculating a linear distance using the first input data type and linear distance function.

103. The system of any one of aspects 88 to 102, wherein the RBFNN is configured to interpolate a pose for a digital character.

104. The system of any one of aspects 88 to 103, wherein the one or more input parameters represent a low-order digital character rig.

105. The system of any one of aspects 88 to 104, wherein the RBFNN is configured to calculate output parameters that represent a high-order digital character rig.

106. The system of any one of aspects 88 to 105, wherein the RBFNN is configured to calculate a plurality of output parameters that are independent values.

107. The system of aspect 106, further comprising grouping at least two of the plurality of independent values into a combination value.

108. The system of aspect 107, wherein the combination value represents a quaternion vector comprising x, y, z, and w.

Other Considerations

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, animations or video may include many frames, with each frame having millions of pixels, and specifically programmed computer hardware is necessary to process the video data to provide a desired image processing task, neural network task, or application in a commercially reasonable amount of time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A method, comprising:
    receiving at least one input parameter to a radial basis function neural network (RBFNN);
    calculating a set of distances from one or more distance functions within the RBFNN; and
    applying a set of distance weights to the set of distances calculated from the one or more distance functions within the RBFNN;
    wherein the set of distance weights comprises one or more distance weights;
    wherein the set of weights comprises a distance weight for each input parameter to the RBFNN; and
    wherein the at least one input parameter represents a low-order digital character rig.

2. The method of claim 1, comprising defining at least one distance weight from the set of distance weights utilizing user input.

3. The method of claim 1, comprising defining at least one distance weight from the set of distance weights utilizing the RBFNN.

4. The method of claim 1, further comprising separating the input parameters into:
    a first input data type comprising data representing a linear parameter; and
    a second input data type comprising data representing an angular parameter.

5. The method of claim 1, wherein the one or more distance functions comprise at least one angular distance function.

6. The method of claim 5, wherein the angular distance function is in special orthogonal group in three dimensions (SO(3)) space.

7. The method of claim 5, wherein the angular distance function is in quaternion space.

8. The method of claim 1, wherein the one or more distance functions comprise at least one linear distance function.

9. The method of claim 8, wherein the linear distance function is a Euclidean distance function.

10. The method of claim 1, comprising interpolating a pose for a digital character utilizing the RBFNN.

11. The method of claim 1, comprising calculating a plurality of output parameters that are independent values utilizing the RBFNN.

12. The method of claim 11, further comprising grouping at least two of the plurality of independent values into a combination value.

13. The method of claim 12, wherein the combination value represents a quaternion vector comprising x, y, z, and w.

14. The method of claim 1, wherein calculating comprises calculating, utilizing the RBFNN, output parameters representing a high-order digital character rig.

15. A method, comprising:
receiving at least one input parameter to a radial basis function neural network (RBFNN);
calculating a set of distances from one or more distance functions within the RBFNN; and
applying a set of distance weights to the set of distances calculated from the one or more distance functions within the RBFNN;
wherein the set of distance weights comprises one or more distance weights; and
wherein the set of weights comprises a distance weight for each input parameter to the RBFNN,
wherein calculating comprises calculating, utilizing the RBFNN, output parameters representing a high-order digital character rig.

16. The method of claim 12, wherein the at least one input parameter represents a low-order digital character rig.

17. A system, comprising:
a radial basis function neural network (RBFNN) implemented on one or more computers and one or more storage devices storing instructions that are operable, when executed by the one or more computers, to cause the one or more computers to:
receive at least one input parameter from a set of input parameters into the RBFNN;
calculate a set of distances from one or more distance functions within the RBFNN; and
apply a set of distance weights to the set of distances calculated from the one or more distances within the RBFNN, wherein the set of distance weights comprise a distance weight for each input parameter to the RBFNN;
wherein the one or more input parameters represent a low-order digital character rig; and
wherein the RBFNN is configured to calculate output parameters that represent a high-order digital character rig.

18. The system of claim 17, wherein the at least one distance weight from the set of distance weights is defined by the RBFNN.

19. The system of claim 17, further comprising separating the input parameters into:
a first input data type comprising data representing a linear parameter; and
a second input data type comprising data representing an angular parameter.

20. The method of claim 17, wherein the RBFNN is configured to interpolate a pose for a digital character.

* * * * *

UNITED STATES PATENT AND TRADEMARK OFFICE
CERTIFICATE OF CORRECTION

PATENT NO. : 12,154,295 B2
APPLICATION NO. : 18/306461
DATED : November 26, 2024
INVENTOR(S) : Geoffrey Wedig Page 1 of 1

It is certified that error appears in the above-identified patent and that said Letters Patent is hereby corrected as shown below:

In the Claims

In Column 58, Claim 16, Line 4, delete "claim 12," and insert -- claim 15, --, therefor.

Signed and Sealed this
Thirty-first Day of December, 2024

Derrick Brent
*Acting Director of the United States Patent and Trademark Office*